(12) United States Patent
Kageyama et al.

(10) Patent No.: US 9,069,129 B2
(45) Date of Patent: Jun. 30, 2015

(54) OPTICAL BODY, OPTICAL BODY MANUFACTURING METHOD, SOLAR SHADING MEMBER, WINDOW MEMBER, INTERIOR MEMBER, AND FITTING

(75) Inventors: Masamitsu Kageyama, Miyagi (JP);
Hironori Yoshida, Miyagi (JP);
Masayuki Tanishima, Miyagi (JP);
Tsutomu Nagahama, Miyagi (JP);
Masashi Enomoto, Tokyo (JP)

(73) Assignee: DEXERIALS CORPORATION, Tokyo (JP)

( * ) Notice: Subject to any disclaimer, the term of this patent is extended or adjusted under 35 U.S.C. 154(b) by 80 days.

(21) Appl. No.: 13/084,151

(22) Filed: Apr. 11, 2011

(65) Prior Publication Data

US 2011/0267686 A1 Nov. 3, 2011

(30) Foreign Application Priority Data

Apr. 15, 2010 (JP) ................ P2010-094495

(51) Int. Cl.
*G02B 27/00* (2006.01)
*G02B 5/124* (2006.01)
(Continued)

(52) U.S. Cl.
CPC ............... *G02B 5/124* (2013.01); *G02B 5/208* (2013.01); *B60J 1/2041* (2013.01); *E06B 9/24* (2013.01); *E06B 9/386* (2013.01); *E06B 2009/2417* (2013.01)

(58) Field of Classification Search
CPC ...... G02B 1/10; G02B 19/0042; G02B 5/136; G02B 5/1809; G02B 5/1852; G02B 2006/12166; G02B 27/4244; G02B 3/0031; G02B 5/0289; G02B 5/045; G02B 6/0055; B32B 2307/416; G02F 2203/02

USPC .................. 359/350–360, 885–892
See application file for complete search history.

(56) References Cited

U.S. PATENT DOCUMENTS 3,758,193 A * 9/1973 Tung .............................. 359/359
4,486,073 A * 12/1984 Boyd ............................. 359/530
(Continued)

FOREIGN PATENT DOCUMENTS

CN 101393276 A 3/2009
EP 0816875 A1 1/1998
(Continued)

OTHER PUBLICATIONS

Japanese Patent Office, Notification of Reason(s) for Refusal mailed Mar. 4, 2014 in Japanese Patent Application No. 2010-094495 w/English-language Translation.
(Continued)

*Primary Examiner* — Derek S Chapel
(74) *Attorney, Agent, or Firm* — Oliff PLC

(57) ABSTRACT

An optical body includes a first optical layer, a second optical layer having an incident surface on which light is incident, and a reflecting layer sandwiched between the first and second optical layers, wherein the first optical layer includes a plurality of convex or concave structures formed on or in a surface thereof on which the reflecting layer is disposed, ridges of the convex structures or ridges between the concave structures adjacent to each other have tip portions projecting toward the incident surface side, the tip portions are deformed from an ideal shape, the second optical layer is transparent and has a refractive index of 1.1 or more and 1.9 or less, and the optical body selectively directionally reflects part of light entering the incident surface, which part is in a specific wavelength band, in direction other than the specular reflection direction.

22 Claims, 30 Drawing Sheets

(51) Int. Cl.
*B60J 1/20* (2006.01)
*E06B 9/24* (2006.01)
*E06B 9/386* (2006.01)
*G02B 5/20* (2006.01)

(56) References Cited

U.S. PATENT DOCUMENTS

| | | | | |
|---|---|---|---|---|
| 4,703,999 | A * | 11/1987 | Benson | 359/532 |
| 5,122,902 | A * | 6/1992 | Benson | 359/529 |
| 5,200,851 | A * | 4/1993 | Coderre et al. | 359/351 |
| 5,422,756 | A * | 6/1995 | Weber | 359/485.03 |
| 6,024,455 | A * | 2/2000 | O'Neill et al. | 359/530 |
| 6,157,486 | A * | 12/2000 | Benson et al. | 359/487.05 |
| 6,172,810 | B1 * | 1/2001 | Fleming et al. | 359/529 |
| 6,350,034 | B1 * | 2/2002 | Fleming et al. | 359/529 |
| 6,617,784 | B1 * | 9/2003 | Abe et al. | 313/506 |
| 7,297,386 | B2 * | 11/2007 | Suzuki et al. | 428/141 |
| 7,320,538 | B2 * | 1/2008 | Ko et al. | 362/606 |
| 7,475,997 | B2 * | 1/2009 | Fujiwara et al. | 359/529 |
| 7,655,301 | B2 | 2/2010 | Chonan et al. | |
| 7,667,785 | B2 * | 2/2010 | Van Gorkom et al. | 349/57 |
| 7,771,059 | B2 * | 8/2010 | Moreau | 359/530 |
| 7,842,374 | B2 * | 11/2010 | Bacon, Jr. | 428/156 |
| 8,248,691 | B2 * | 8/2012 | Wei et al. | 359/350 |
| 2001/0008679 | A1 * | 7/2001 | Smith et al. | 428/141 |
| 2008/0094689 | A1 * | 4/2008 | Van Gorkom et al. | 359/296 |
| 2009/0296202 | A1 * | 12/2009 | Wei et al. | 359/359 |
| 2010/0177380 | A1 * | 7/2010 | Nagahama et al. | 359/359 |
| 2010/0277801 | A1 | 11/2010 | Nakajima | |
| 2011/0199685 | A1 * | 8/2011 | Ito | 359/589 |
| 2011/0222145 | A1 * | 9/2011 | Ito | 359/359 |
| 2011/0310473 | A1 * | 12/2011 | Yoshida et al. | 359/360 |
| 2012/0092756 | A1 * | 4/2012 | Yoshida et al. | 359/351 |
| 2012/0097854 | A1 * | 4/2012 | Ng | 250/353 |
| 2012/0140316 | A1 * | 6/2012 | Suzuki et al. | 359/360 |
| 2012/0200710 | A1 * | 8/2012 | Nakajima et al. | 348/148 |
| 2012/0257376 | A1 * | 10/2012 | Zhou et al. | 362/97.1 |

FOREIGN PATENT DOCUMENTS

| | | |
|---|---|---|
| JP | A-09-001056 | 1/1997 |
| JP | 2002-167717 | 6/2002 |
| JP | 2005-087680 | 9/2005 |
| JP | 2006-317648 | 11/2006 |
| JP | 2007-010893 | 1/2007 |
| JP | 2008-040025 | 2/2008 |
| JP | A-2008-164768 | 7/2008 |
| JP | 2009-216778 | 9/2009 |
| WO | WO 99/31534 | 6/1999 |
| WO | WO 00/42454 | 7/2000 |
| WO | WO 00/43813 | 7/2000 |
| WO | 2005/087680 | 9/2005 |
| WO | WO 2007005357 A1 * | 1/2007 |

OTHER PUBLICATIONS

Dec. 3, 2013 Office Action in Japan Patent Application No. 2010-094495 [with English Translation].

Chinese Patent Office, First Office Action mailed Apr. 2, 2014 in Chinese Patent Application No. 201110088525.1 w/English-language Translation.

* cited by examiner

OPTICAL BODY, OPTICAL BODY MANUFACTURING METHOD, SOLAR SHADING MEMBER, WINDOW MEMBER, INTERIOR MEMBER, AND FITTING

CROSS REFERENCES TO RELATED APPLICATIONS

The present application claims priority to Japanese Patent Application JP 2010-094495 filed on Apr. 15, 2010, the entire contents of which is hereby incorporated by reference.

BACKGROUND

The present disclosure relates to an optical body, an optical body manufacturing method, a solar shading member, a window member, an interior member, and a fitting. More particularly, the present invention relates to an optical body for directionally reflecting incident light.

Recently, cases of coating a layer partly absorbing or reflecting the sunlight on architectural glasses for high-rise buildings and housings, vehicular window glasses, etc. have increased. Such a trend represents one of energy-saving measures with the view of preventing global warming, and it is intended to reduce a load of cooling equipment, which is increased with solar energy, i.e., the sunlight, entering the indoor through windows and raising the indoor temperature.

Optical energy incoming from the sun is primarily provided by light in a visible range at wavelengths of 380 to 780 nm and light in a near infrared range at wavelengths of 780 to 2100 nm. Because transmittance of the light in the latter near infrared range through windows is unrelated to visibility of human eyes, the transmittance of the near infrared light is an important factor affecting the performance that is to be provided by a window having high transparency and a high thermal shielding ability.

As an example of methods for blocking the light in the near infrared range while maintaining transparency to the light in the visible range, there is a method of providing, on a window glass, an optical body having a high reflectance in the near infrared range. With regards to such a method, various techniques using, as reflecting layers, an optical multilayer film, a metal-containing film, a transparent electroconductive film, etc. are already disclosed (see, e.g., pamphlet of International Publication WO05/087680).

However, the reflecting layers in the disclosed technique are formed on a flat window glass, and the incident sunlight is just specularly (regularly) reflected. Therefore, the light incoming from the sky and specularly reflected by the flat window glass reaches other outdoor buildings and the ground where the light is absorbed and converted to heat, thus raising the ambient temperature. Accordingly, a local temperature rise occurs in the surroundings of a building in which all windows are coated with the above-mentioned type of reflecting layer. This gives rise to the problems that, in urban areas, a heat island phenomenon is accelerated and grass is not grown in areas irradiated with the reflected light.

To cope with the above-mentioned problems, a technique of using a directional reflector to retroreflect the incoming sunlight in the incident direction thereof is proposed (see, e.g., Japanese Unexamined Patent Application Publication No. 2007-10893). In the proposed related art, the directional reflector is constituted by arraying, e.g., many substantially pyramidal structures. Light incident on the directional reflector is reflected by surfaces of the substantially pyramidal structures plural times such that the light is eventually reflected substantially in the incident direction.

However, the function of the directional reflection is degraded for the light entering the directional reflector at a large incident angle. Further, although ridge portions of the substantially pyramidal structures are designed to have substantially triangular shapes in cross-sections, the actual ridge portions may have shapes deformed (collapsed) from the ideal shape in some cases for the reason encountered in manufacturing processes. In such a case, the incident light entering the ridge portions is reflected in the specular reflection direction without being reflected plural times. Thus, as the shapes of the ridge portions are deformed from the ideal shape to a larger extent, a directionally reflected component of the incident light is reduced.

Stated another way, the above-described directional reflector has the problem that, with the reduction of the directionally reflected component, the sunlight reaches the ground in a larger amount and causes a temperature rise near the ground surface.

SUMMARY

The present embodiments present an optical body, an optical body manufacturing method, a solar shading member, a window member, an interior member, and a fitting, which can reduce a component of light reflected to the ground even when the shapes of the ridge portions are deformed from the ideal shape to a relatively large extent.

According to an embodiment, there is provided an optical body including a first optical layer, a second optical layer having an incident surface on which light is incident, and a reflecting layer sandwiched between the first and second optical layers, wherein the first optical layer includes a plurality of convex or concave structures formed on or in a surface thereof on which the reflecting layer is disposed, ridges of the convex structures or ridges between the concave structures adjacent to each other have tip portions projecting toward the incident surface side, the tip portions are deformed from an ideal shape, the second optical layer is transparent and has a refractive index of 1.1 or more and 1.9 or less, and the optical body selectively directionally reflects part of light entering the incident surface at an incident angle $(\theta, \phi)$ (where $\theta$ is an angle formed by a line perpendicular to the incident surface and incident light entering the incident surface or light reflected by the incident surface, and $\phi$ is an angle formed between a specific linear line in the incident surface and a component obtained by projecting the incident light or the reflected light to the incident surface), which part is in a specific wavelength band, in direction other than $(-\theta, \phi+180°)$.

Preferably, the plural structures are arrayed in a substantially cyclic structure pattern.

Preferably, the tip portions are deformed from the ideal shape at a rate of 7% or less with respect to an array pitch of the structures.

Preferably, the refractive index of the second optical layer is 1.4 or more and 1.6 or less.

More preferably, the refractive index of the second optical layer is 1.49 or more and 1.55 or less.

According to another embodiment, there is provided an optical body manufacturing method including the steps of transferring a concave-convex shape of a mold or a die to a first resin material, thereby forming a first optical layer which includes a plurality of convex or concave structures formed on or in one principal surface thereof, forming a reflecting layer on the concave-convex surface that has been transferred to the first optical layer, and embedding the reflecting layer with a second resin material, thereby forming a second optical layer having an incident surface on which light is incident, the second optical layer being transparent and having a refractive index of 1.1 or more and 1.9 or less, wherein ridges of the convex structures or ridges between the concave structures adjacent to each other have tip portions projecting toward the incident surface side, the tip portions are deformed from an ideal shape, and the optical body selectively directionally reflects part of light entering the incident surface at an incident angle (θ, φ) (where θ is an angle formed by a line perpendicular to the incident surface and incident light entering the incident surface or light reflected by the incident surface, and φ is an angle formed between a specific linear line in the incident surface and a component obtained by projecting the incident light or the reflected light to the incident surface), which part is in a specific wavelength band, in direction other than (−θ, φ+180°).

Herein, the magnitude of deformation (collapse) from the ideal shape is represented by the radius of a circle that is defined as follows. FIGS. 32A and 32B are illustrations to explain how a deformation Cr from the ideal shape is determined. In FIG. 32A, P denotes the array pitch (hereinafter also referred to simply as "pitch") of the structures. FIG. 32B is an enlarged view of a region XXXIIB in FIG. 32A.

As illustrated in FIG. 32B, PL1 and PL2 represent contour lines of the structure tip portion, which would be drawn on condition that the structure tip portion is formed as per design, when observing a cross-section of the structure in the optical layer. When the structure tip portion actually has a curvature or some different shape in the designed structure cross-section, lines extended from contour lines defining side surfaces of the actual structure in a cross-section thereof are regarded as the contour lines PL1 and PL2. Then, two inscribed circles are drawn which are in contact with PL1 and PL2, and which pass a point T most projecting toward the light incident side in the actual shape of the structure tip portion. Of those two inscribed circles, a radius Cr of one circle Ic having a larger radius than the other circle is defined as representing the magnitude of deformation from the ideal shape.

The magnitude of deformation from the ideal shape corresponds, for example, to the radius of curvature of a bite tip that is used to machine the mold or the die for transferring the concave-convex shape to the optical layer.

When the structures are arrayed in a substantially cyclic structure pattern, the array pitch of the structures is equivalent to the cycle of the substantially cyclic structure pattern. Herein, the substantially cyclic structure pattern implies a cyclic structure pattern in which a deviation of the actual array pitch of the structures is 3% or less and preferably 1% or less of the designed array pitch. Be it noted that the substantially cyclic structure pattern includes an exactly cyclic structure pattern.

With the present embodiments, since the refractive index of the optical layer, which embeds the reflecting layer formed on the concave-convex surface, is set to fall in the predetermined range, a total reduction of the directionally reflected component can be suppressed even when the shapes of the structure tip portions are deformed from the ideal shape to a larger extent.

Additional features and advantages are described herein, and will be apparent from the following Detailed Description and the figures.

DETAILED DESCRIPTION

Embodiments will be described below in the following order with reference to the drawings.

1. First embodiment (example of an optical body in which a reflecting layer is formed in a corner cube pattern)
2. Second embodiment (example of a solar shading device employing the optical body)
3. Third embodiment (another example of the solar shading device in which the optical body is applied to a rolling screen device)
4. Fourth embodiment (example of a fitting in which the optical body is employed in a lighting portion)

1. First Embodiment

Structure of Optical Body

Figure 1:
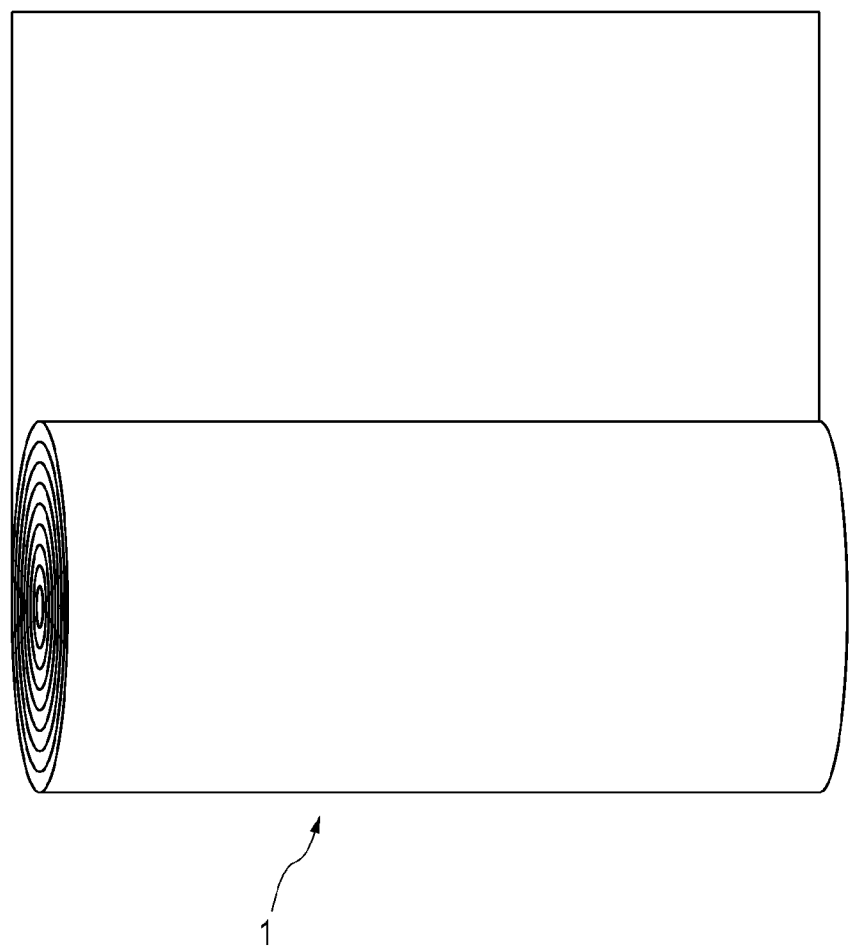
FIG. 1 is a perspective view illustrating an overall appearance of an optical body according to a first embodiment.
Figure 2A:
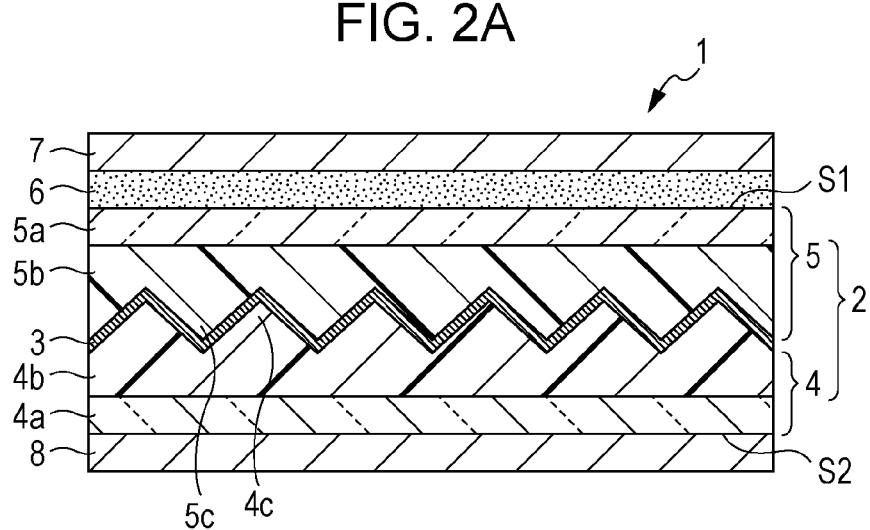
FIG. 2A is a sectional view illustrating one example of structure of the optical body according to the first embodiment.
Figure 2B:
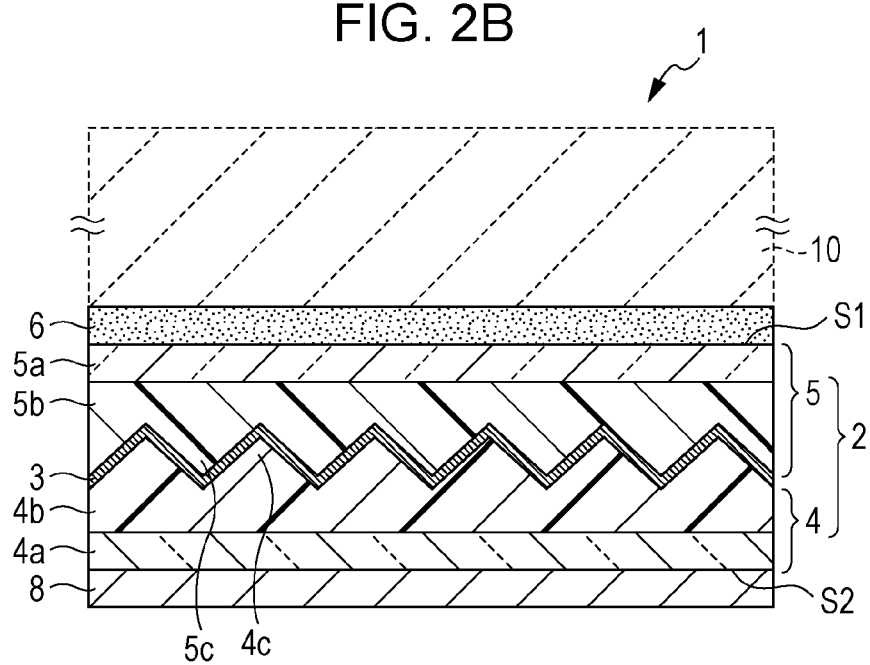
FIG. 2B is a sectional view illustrating an example in which the optical body according to the first embodiment is affixed to and adherend (affixing target)

FIG. 1 is a perspective view illustrating an overall appearance of an optical body 1 according to the first embodiment. FIG. 2A is a sectional view illustrating one example of structure of the optical body according to the first embodiment, and FIG. 2B is a sectional view illustrating an example in which the optical body according to the first embodiment is affixed to an adherend (affixing target). The optical body 1 serving as a directional reflector is in the form of, e.g., an optical film having directional reflectivity. As illustrated in FIG. 1, the optical body 1 has a belt-like shape and is wound into a roll-like form to be prepared as the so-called stock roll.

As illustrated in FIG. 2A, the optical body 1 includes an optical layer 2 having a concave-convex interface therein, and a reflecting layer 3 formed at the concave-convex interface in the optical layer 2. The optical layer 2 includes a first optical layer 4 having a first surface in the concave-convex form, and a second optical layer 5 having a second surface in the concave-convex form. The concave-convex interface in the optical layer 2 is formed by the first and second concave-convex surfaces that are positioned to face each other. Stated another way, the optical body 1 includes the first optical layer 4 having the concave-convex surface, the reflecting layer 3 formed on the concave-convex surface of the first optical layer 4, and the second optical layer 5 formed on the reflecting layer 3 so as to flatly fill the concave-convex surface on which the reflecting layer 3 is formed. The optical layer 2 has an incident surface S1 on which light, such as the sunlight, is incident, and an emergent surface S2 from which part of the light incident on the incident surface S1, having transmitted (passed) through the optical body 1, emerges. The optical body 1 is suitably applied to inner wall members, outer wall members, window members, wall materials, and so on. Further, the optical body 1 is suitably applied to a slat (one example of a solar shading member) of a window blind (shade) and a screen (another example of the solar shading member) of a rolling screen device. Moreover, the optical body 1 is suitably employed as an optical body that is disposed in a lighting portion of a fitting (i.e., an interior member or an exterior member), such as a shoji (i.e., a paper-made and/or glass-fitted sliding door).

The optical body 1 may further include a first base element 4a, if necessary, on the side providing the emergent surface S2 of the optical layer 2. The optical body 1 may further include a second base element 5a, if necessary, on the side providing the incident surface S1 of the optical layer 2. When the optical body 1 includes the first base element 4a and/or the second base element 5a, optical characteristics described later, such as transparency and color of the transmitted light, are preferably satisfied in a state where the first base element 4a and/or the second base element 5a is formed in the optical body 1.

The optical body 1 may further include an affixing layer 6, if necessary. The affixing layer 6 is formed on one of the incident surface S1 and the emergent surface S2 of the optical body 1, which is to be affixed to a window member 10. Thus, the optical body 1 is affixed to the indoor or outdoor side of the window member 10, i.e., the adherend, with the affixing layer 6 interposed therebetween. The affixing layer 6 can be formed, for example, as a bonding layer containing a bond (e.g., a UV-cured resin or a two-liquid mixed resin) as a main component, or as an adhesive layer containing an adhesive (e.g., a PSA (Pressure Sensitive Adhesive)) as a main component. When the affixing layer 6 is the adhesive layer, a peeling-off layer 7 is preferably further formed on the affixing layer 6. With the provision of the peeling-off layer 7, the optical body 1 can be easily affixed, just by peeling the peeling-off layer 7, to the adherend, e.g., the window member 10, with the affixing layer 6 interposed therebetween.

From the viewpoint of increasing adhesion between the second base element 5a and one or both of the affixing layer 6 and the second optical layer 5 (specifically a later-described resin layer 5b thereof), the optical body 1 may further include a primer layer (not shown) between the second base element 5a and one or both of the affixing layer 6 and the second optical layer 5. Also, from the viewpoint of increasing adhesion at the same locations, it is preferable to carry out ordinary physical pretreatment instead of or in addition to forming the primer layer. The ordinary physical pretreatment includes, e.g., plasma treatment or corona treatment.

The optical body 1 may further include a barrier layer (not shown) on one of the incident surface S1 and the emergent surface S2, which one is affixed to the adherend, e.g., the window member 10, or between the surface S1 or S2 and the reflecting layer 3. With the presence of the barrier layer, it is possible to reduce diffusion of moisture toward the reflecting layer 3 from the incident surface S1 or the emergent surface S2 and to suppress deterioration of a metal, etc. contained in the reflecting layer 3. Accordingly, durability of the optical body 1 can be improved.

The optical body 1 may further include a hard coat layer 8 from the viewpoint of giving the surface of the optical body 1 with resistance against excoriation, scratching, etc. The hard coat layer 8 is preferably formed on one of the incident surface S1 and the emergent surface S2 of the optical body 1, which one is positioned on the opposite side to the surface affixed to the adherend, e.g., the window member 10. A water-repellent or hydrophilic layer may be further formed on the incident surface S1 of the optical body 1 from the viewpoint of providing an antifouling property, etc. The layer having such a function may be formed, for example, directly on the optical layer 2 or on one of various functional layers such as the hard coat layer 8.

The optical body 1 preferably has flexibility from the viewpoint of enabling the optical body 1 to be easily affixed to the adherend, e.g., the window member 10. More specifically, the optical body 1 is preferably an optical film having flexibility. Such a property enables the belt-shaped optical body 1 to be wound into the stock roll, thus increasing easiness in, for example, carrying and handling the optical body 1. Herein, the term "film" is to be construed as including a sheet. In other words, an optical sheet is also included in practical examples of the optical body 1. The form of the optical body 1 is not limited to a film, and it may be a plate or a block.

The optical body 1 has transparency. The transparency preferably falls within a later-described range of transmission image clarity. The difference in refractive index between the first optical layer 4 and the second optical layer 5 is preferably 0.010 or less, more preferably 0.008 or less, and even more preferably 0.005 or less. If the difference in refractive index exceeds 0.010, a transmission image tends to blur in appearance. When the difference in refractive index is more than 0.008 and not more than 0.010, there are no problems in daily life though depending on outdoor brightness. When the difference in refractive index is more than 0.005 and not more than 0.008, the outdoor sight can be clearly viewed although only a very bright object, such as a light source, causes a displeasing diffraction pattern. When the difference in refractive index is 0.005 or less, the diffraction pattern is hardly displeasing. Note that the difference in refractive index between the first optical layer 4 and the second optical layer 5 may depart from the above-mentioned range in some cases.

One of the first optical layer 4 and the second optical layer 5, which one is positioned on the side affixed to, e.g., the window member 10, may contain an adhesive as a main component. With such a feature, the optical body 1 can be affixed to, e.g., the window member 10 by using the first optical layer 4 or the second optical layer 5 that contains the adhesive as a main component. In that case, the difference in refractive index with respect to the adhesive is preferably within the above-described range.

The first optical layer 4 and the second optical layer 5 preferably have the same optical characteristics, such as the refractive index. More specifically, the first optical layer 4 and the second optical layer 5 are preferably made of the same material, e.g., the same resin material, having transparency in the visible range. By using the same material to form the first optical layer 4 and the second optical layer 5, the refractive indexes of both the optical layers are equal to each other, and hence transparency to visible light can be improved. However, even when the starting material is the same, care is to be paid to such a point that the refractive indexes of finally formed layers may differ from each other depending on, e.g., curing conditions in a film forming process. On the other hand, when the first optical layer 4 and the second optical layer 5 are made of different materials, a transmission image tends to blur for the reason that light is refracted at the reflecting layer 3, which provides a boundary, due to the difference in refractive index between both the optical layers. In particular, there is a tendency that when observing an object analogous to a point light source, such as a lamp at a far distance, a diffraction pattern is conspicuously observed. Note that, in order to adjust a value of the refractive index, an additive may be mixed in the first optical layer 4 and/or the second optical layer 5.

The first optical layer 4 and the second optical layer 5 preferably have transparency in the visible range. Herein, the term "transparency" is defined as having two meanings, i.e., as not absorbing light and not scattering light. When the term "transparency" is generally used, it often implies the former meaning. In the optical body 1 according to the first embodiment, however, it preferably has the transparency in both the meanings. A currently employed retroreflector is intended to visually confirm light reflected from road signs, clothes of night workers, etc. to provide a noticeable indication. Therefore, even when the retroreflector has a scattering property, light reflected from an underlying reflector can be visually observed if the retroreflector is in close contact with the underlying reflector. Such a phenomenon is based on the same principle as that an image can be visually confirmed even when antiglare treatment providing a scattering property is applied to a front surface of an image display for the purpose of imparting an antiglare property. In contrast, the optical body 1 according to the first embodiment preferably does not scatter light for the reason that the optical body 1 is featured in transmitting light other than the directionally reflected light of specific wavelengths, and that the optical body 1 is affixed to a transmission member transmitting primarily light of transmission wavelengths, thus allowing the transmitted light to be observed. Depending on usage, however, the first optical layer 4 may be intentionally provided with the scattering property.

The optical body 1 is preferably used in such a way that it is affixed to a rigid member, e.g., the window member 10, which has transmissivity primarily to the light having transmitted through the optical body and falling in bands other than the specific wavelengths, with, e.g., an adhesive interposed therebetween. Examples of the window member 10 include architectural window members for high-rise buildings, houses, etc. and window members for vehicles. When the optical body 1 is applied to architectural window members, it is preferably applied to the window member 10 that is oriented to face, particularly, in some direction within a range from east to south and further to west (e.g., within a range from southeast to southwest). This is because, by applying the optical body 1 to the window member 10 oriented as mentioned above, heat rays can be more effectively reflected. The optical body 1 can be applied to not only a single-layer window glass, but also a special glass, such as a multilayer glass. Further, the window member 10 is not limited to a glass-made member, and it may be a member made of a high polymeric material having transparency. The optical layer 2 preferably has transparency in the visible range. The reason is that, with the optical layer 2 having transparency in the visible range, when the optical body 1 is affixed to the window member 10, e.g., the window glass, visible light is allowed to pass through the optical body 1 and lighting with the sunlight can be ensured. The optical body 1 may be affixed to not only an inner surface of a glass pane, but also an outer surface thereof.

Further, the optical body 1 can be used in combination with an additional heat-ray cutting film. For example, a light absorption coating may be disposed at the interface between air and the optical body 1 (i.e., the outermost surface of the optical body 1). Still further, the optical body 1 can be used in combination with a hard coat layer, an ultraviolet cutting layer, a surface antireflective layer, etc. When one or more of those functional layers are used in a combined manner, the functional layer is preferably disposed at the interface between the optical body 1 and air. However, the ultraviolet cutting layer is to be disposed on the side closer to the sun than the optical body 1. Thus, particularly when the optical body 1 is affixed to an inner surface of the window glass having surfaces to face the inside and the outside of a room, the ultraviolet cutting layer is desirably disposed between the inner surface of the window glass and the optical body 1. In that case, an ultraviolet absorber may be mixed in an affixing layer between the inner surface of the window glass and the optical body 1.

Depending on usage of the optical body 1, the optical body 1 may be colored to have a visually attractive design. When the visually attractive design is given to the optical body 1, at least one of the first optical layer 4 and the second optical layer 5 is preferably formed to absorb primarily light in a particular wavelength band within the visible range to such an extent as not reducing transparency.

Figure 3:
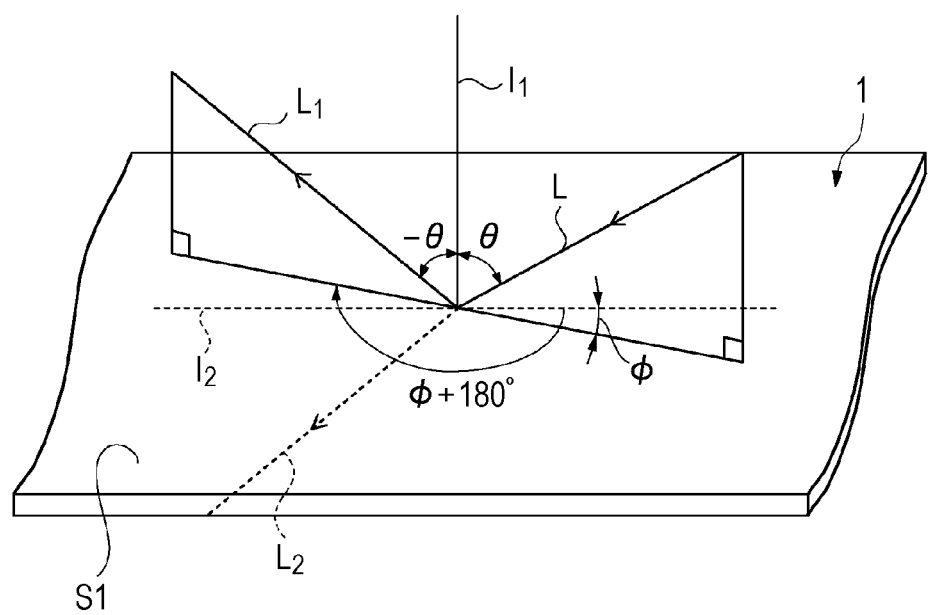
FIG. 3 is a perspective view illustrating the relationship between incident light that is incident on the optical body and reflected light that is reflected by the optical body.

FIG. 3 is a perspective view illustrating the relationship between incident light that is incident on the optical body 1 and reflected light that is reflected by the optical body 1. The optical body 1 has the incident surface S1 on which light L is incident. When the reflecting layer 3 is a wavelength-selective reflecting layer, it is preferable that, of the light L incident on the incident surface S1 at an incident angle ($\theta$, $\phi$), the optical body 1 selectively directionally reflects light $L_1$ in a specific wavelength band in direction other than a specular reflection direction ($-\theta$, $\phi+180°$) while transmitting light $L_2$ other than the specific wavelength band. Also, the optical body 1 has transparency to the light other than the specific wavelength band. The transparency preferably falls within the later-described range of transmission image clarity. When the reflecting layer 3 is a semitransparent layer, it is preferable that the optical body 1 selectively directionally reflects, of the light L incident on the incident surface S1 at the incident angle ($\theta$, $\phi$), part $L_1$ thereof in direction other than the specular reflection direction ($-\theta$, $\phi+180°$) while transmitting the remaining light $L_2$. Herein, $\theta$ is an angle formed by a perpendicular line $l_1$ with respect to the incident surface S1 and the incident light L or the reflected light $L_1$. Also, $\phi$ is an angle formed by a specific linear line $l_2$ in the incident surface S1 and a component resulting from projecting the incident light L or the reflected light $L_1$ to the incident surface S1. The specific linear line $l_2$ in the incident surface S1 implies an axis in which the reflection intensity is maximized in the direction $\phi$ when the optical body 1 is rotated about an axis provided by the perpendicular line $l_1$ with respect to the incident surface S1 of the optical body 1 while the incident angle ($\theta$, $\phi$) is held fixed. When there are plural axes (directions) in which the reflection intensity is maximized, one of the axes is selected as the linear line $L_2$. Further, an angle $\theta$ rotated clockwise from the perpendicular line $l_1$ as a reference is defined as "+$\theta$", and an angle $\theta$ rotated counterclockwise from the perpendicular line $l_1$ is defined as "–$\theta$". An angle $\phi$ rotated clockwise from the linear line $l_2$ as a reference is defined as "+$\phi$", and an angle $\phi$ rotated counterclockwise from the linear line $l_2$ is defined as "–$\phi$". When the reflecting layer 3 is semitransparent layer, the directionally reflected light is preferably light primarily falling in a wavelength band of 400 nm or longer to 2100 nm or shorter.

The light in the specific wavelength band, which is to be selectively directionally reflected, and the particular light to be transmitted are set differently depending on the usage of the optical body 1. For example, when the optical body 1 is applied to the window member 10, the light in the specific wavelength band, which is to be selectively directionally reflected, is preferably near infrared light and the light in the other wavelength bands to be transmitted is preferably visible light. In more detail, the light in the specific wavelength band, which is to be selectively directionally reflected, is preferably near infrared light primarily falling in a wavelength band of 780 nm to 2100 nm. By reflecting the near infrared light, a temperature rise inside a building can be suppressed when the optical body 1 is affixed to the window member 10 such as the window glass. Accordingly, a cooling load can be reduced and energy saving can be achieved. Herein, the expression "directionally reflected" implies that light is reflected in a particular direction other than the specular reflection direction and the intensity of the reflected light is sufficiently stronger than the intensity of light diffusely reflected with no directionality. Further, the expression "reflected" implies that the reflectance in a specific wavelength band, e.g., in the near infrared range, is preferably 30% or more, more preferably 50% or more, and even more preferably 80% or more. The expression "transmitted" implies that the transmittance in a specific wavelength band, e.g., in the visible range, is preferably 30% or more, more preferably 50% or more, and even more preferably 70% or more.

A direction $\phi_o$ in which the incident light is directionally reflected by the optical body 1 is preferably in the range of –90° or more to 90° or less. On such a condition, when the optical body 1 is affixed to the window member 10, it can return, of the light incoming from the sky, the light in the specific wavelength band toward the sky. When there are no high-rise buildings in the surroundings, the optical body 1 directionally reflecting the incident light in the above-mentioned range is usefully employed. Further, the direction of the directional reflection is preferably in the vicinity of ($\theta$, –$\phi$). The expression "vicinity" implies that a deviation in the direction of the directional reflection is preferably within 5 degrees, more preferably within 3 degrees, and even more preferably within 2 degrees with respect to ($\theta$, –$\phi$). The reason is that, by setting the direction of the directional reflection of the light in the specific wavelength band as described above, when the optical body 1 is affixed to the window member 10, it can efficiently return, of the light incoming from the sky above buildings standing side by side at substantially the same height, the light in the specific wavelength band toward the sky above the other buildings. To realize such directional reflection, it is preferable, for example, to employ a three-dimensional structure that is formed by using a part of a spherical surface or a hyperbolic surface, a triangular pyramid, a quadrangular pyramid, or a circular cone. The light incoming in the direction ($\theta$, $\phi$) ($-90°<\phi<90°$) can be reflected in a direction ($\theta_o$, $\phi_o$) ($0°<\theta_o<90°$ and $-90°<\phi_o<90°$) in accordance with the shape of the three-dimensional structure. As an alternative, the three-dimensional structure may have a columnar shape extending in one direction. In that case, the light incoming in the direction ($\theta$, $\phi$) ($-90°<\phi<90°$)

can be reflected in a direction $(\theta_o, \phi_o)$ $(0°<\theta_o<90°)$ in accordance with a slope angle of the columnar shape.

The light in the specific wavelength band is preferably directionally reflected by the optical body 1 in a direction in the vicinity of the direction of retroreflection. In other words, with respect to the light incident on the incident surface S1 at the incident angle $(\theta, \phi)$, the direction of the reflection of the light in the specific wavelength band is preferably in the vicinity of $(\theta, \phi)$. The reason is that when the optical body 1 is affixed to the window member 10, it can return, of the light incoming from the sky, the light in the specific wavelength band toward the sky. Herein, the expression "vicinity" implies that a deviation in the direction of the directional reflection is preferably within 5 degrees, more preferably within 3 degrees, and even more preferably within 2 degrees. By setting the direction of the directional reflection of the light in the specific wavelength band as described above, when the optical body 1 is affixed to the window member 10, it can efficiently return, of the light incoming from the sky, the light in the specific wavelength band toward the sky. In the case of, e.g., an infrared sensor or an infrared image pickup device where an infrared irradiation unit and a light receiving unit are arranged adjacent to each other, the direction of retroreflection is to be set aligned with the incident direction. However, when sensing in a specific direction is not performed as in the embodiments, the direction of retroreflection and the incident direction may be set not so exactly aligned with each other.

When the reflecting layer 3 is the wavelength-selective reflecting layer, a value of the transmission image clarity in the wavelength band where the optical body 1 has transmissivity is preferably 50 or larger, more preferably 60 or larger, and even more preferably 75 or larger when an optical comb of 0.5 mm is used. If the value of the transmission image clarity is smaller than 50, a transmission image tends to blur in appearance. When the value of the transmission image clarity is not smaller than 50 and smaller than 60, there are no problems in daily life though depending on outdoor brightness. When the value of the transmission image clarity is not smaller than 60 and smaller than 75, the outdoor sight can be clearly viewed although only a very bright object, such as a light source, causes a displeasing diffraction pattern. When the value of the transmission image clarity is not smaller than 75, the diffraction pattern is hardly displeasing. Further, a total of values of the transmission image clarity measured using optical combs of 0.125 mm, 0.5 mm, 1.0 mm and 2.0 mm is preferably 230 or larger, more preferably 270 or larger, and even more preferably 350 or larger. If the total value of the transmission image clarity is smaller than 230, a transmission image tends to blur in appearance. When the total value of the transmission image clarity is not smaller than 230 and smaller than 270, there are no problems in daily life though depending on outdoor brightness. When the total value of the transmission image clarity is not smaller than 270 and smaller than 350, the outdoor sight can be clearly viewed although only a very bright object, such as a light source, causes a displeasing diffraction pattern. When the total value of the transmission image clarity is not smaller than 350, the diffraction pattern is hardly displeasing. Herein, the value of the transmission image clarity is measured in conformity with JIS K7105 by using ICM-1T made by Suga Test Instruments Co., Ltd. When the wavelength to be transmitted differs from that of the D65 light source, the measurement is preferably performed after calibration using a filter having the wavelength to be transmitted.

When the reflecting layer 3 is a semitransparent layer, a value of the transmission image clarity measured for the D65 light source is preferably 30 or larger, more preferably 50 or larger, and even more preferably 75 or larger when the optical comb of 0.5 mm is used. If the value of the transmission image clarity is smaller than 30, a transmission image tends to blur in appearance. When the value of the transmission image clarity is not smaller than 30 and smaller than 50, there are no problems in daily life though depending on outdoor brightness. When the value of the transmission image clarity is not smaller than 50 and smaller than 75, the outdoor sight can be clearly viewed although only a very bright object, such as a light source, causes a displeasing diffraction pattern. When the value of the transmission image clarity is not smaller than 75, the diffraction pattern is hardly displeasing. Further, a total of values of the transmission image clarity measured using the optical combs of 0.125 mm, 0.5 mm, 1.0 mm and 2.0 mm is preferably 170 or larger, more preferably 230 or larger, and even more preferably 350 or larger. If the total value of the transmission image clarity is smaller than 170, a transmission image tends to blur in appearance. When the total value of the transmission image clarity is not smaller than 170 and smaller than 230, there are no problems in daily life though depending on outdoor brightness. When the total value of the transmission image clarity is not smaller than 230 and smaller than 350, the outdoor sight can be clearly viewed although only a very bright object, such as a light source, causes a displeasing diffraction pattern. When the total value of the transmission image clarity is not smaller than 350, the diffraction pattern is hardly displeasing. Herein, the value of the transmission image clarity is measured in conformity with JIS K7105 by using ICM-1T made by Suga Test Instruments Co., Ltd.

Haze occurred in the transmission wavelength band where the optical body 1 has transmissivity is preferably 6% or less, more preferably 4% or less, and even more preferably 2% or less. If the haze exceeds 6%, the transmitted light is scattered and a view is obscured. Herein, the haze is measured in accordance with the measurement method stipulated in JIS K7136 by using HM-150 made by Murakami Color Research Laboratory Co., Ltd. When the wavelength to be transmitted differs from that of the D65 light source, the measurement is preferably performed after calibration using a filter having the wavelength to be transmitted. The incident surface S1, preferably both the incident surface S1 and the emergent surface S2, of the optical body 1 have smoothness at such a level as not degrading the transmission image clarity. More specifically, arithmetic mean roughness Ra of the incident surface S1 and the emergent surface S2 is preferably 0.08 μm or less, more preferably 0.06 μm or less, and even more preferably 0.04 μm or less. Note that the arithmetic mean roughness Ra is obtained as a roughness parameter by measuring the surface roughness of the incident (emergent) surface and deriving a roughness curve from a two-dimensional profile curve. Measurement conditions are set in conformity with JIS B0601:2001. Details of a measuring apparatus and the measurement conditions are as follows;

measuring apparatus: full-automated fine shape measuring machine SURFCODER ET4000A (made by Kosaka Laboratory Ltd.), $\lambda c$=0.8 mm, evaluation length: 4 mm, cutoff: ×5, and data sampling interval: 0.5 μm.

The light transmitted through the optical body 1 is preferably as close as possible to neutral in color. Even when the transmitted light is colored, the color preferably has a pale tone in blue, blue-green, or green, for example, which provides a cool feeling. From the viewpoint of obtaining such a color tone, it is desired that chromaticity coordinates x and y of the reflected light and the transmitted light, output from the emergent surface S2 after entering the incident surface S1 and passing through the optical layer 2 and the reflecting layer 3, satisfy respective ranges of preferably 0.20<x<0.35 and 0.20<y<0.40, more preferably 0.25<x<0.32 and 0.25<y<0.37, and even more preferably 0.30<x<0.32 and 0.30<y<0.35, when the measurement is conducted for irradiation using the D65 light source, for example. Further, from the viewpoint of avoiding the color tone from becoming reddish, it is desired that the chromaticity coordinates x and y satisfy the relationship of preferably y>x−0.02 and more preferably y>x. In addition, change in color tone of the reflected light depending on the incident angle is undesired because, when the optical body is applied to, e.g., building windows, the color tone is different depending on a viewing place and an appearing color is changed upon walking. From the viewpoint of suppressing the above-mentioned changes in the color tone of the reflected light, the light preferably enters the incident surface S1 or the emergent surface S2 at the incident angle θ of 5° or larger and 60° or smaller, and each of an absolute value of difference between chromaticity coordinates x and an absolute value of difference between chromaticity coordinates y of the light specularly reflected by the optical body 1 is preferably 0.05 or smaller, more preferably 0.03 or smaller, and even more preferably 0.01 or smaller at each of both the principal surfaces of the optical body 1. The above-described limitations on numerical ranges regarding the chromaticity coordinates x and y of the reflected light are desirably satisfied for both the incident surface S1 and the emergent surface S2.

To suppress color change in the vicinity of the specular reflection, it is desired that the optical body 1 dose not include a flat surface having a slope angle of preferably 5° or smaller and more preferably 10° or smaller. When the reflecting layer 3 is covered with a resin, the incident light is refracted upon entering the resin from air, and hence the color tone change in the vicinity of the specular reflection can be suppressed in a wider range of incident angle. Additionally, when the color of light reflected in other directions than the specular reflection direction is to be taken into consideration, the optical body 1 is preferably arranged such that the directionally reflected light does not propagate in the relevant direction.

The first optical layer 4, the second optical layer 5, and the reflecting layer 3, which constitute the optical body 1, will be described in more detail below.

(First Optical Layer and Second Optical Layer)

The first optical layer 4 serves to, for example, support and protect the reflecting layer 3. The first optical layer 4 is made of a layer containing, e.g., a resin as a main component from the viewpoint of giving the optical body 1 with flexibility. One of two principal surfaces of the first optical layer 4 is a smooth surface and the other is a concave-convex surface (first surface). The reflecting layer 3 is formed on the concave-convex surface of the first optical layer 4.

The second optical layer 5 serves to protect the reflecting layer 3 by embedding the first surface (concave-convex surface) of the first optical layer 4 on which the reflecting layer 3 is formed. The second optical layer 5 is made of a layer containing, e.g., a resin as a main component from the viewpoint of giving the optical body 1 with flexibility. One of two principal surfaces of the second optical layer 5 is a smooth surface and the other is a concave-convex surface (second surface). The concave-convex surface of the first optical layer 4 and the concave-convex surface of the second optical layer 5 are reversed to each other in a concave-convex relation.

Figure 4A:
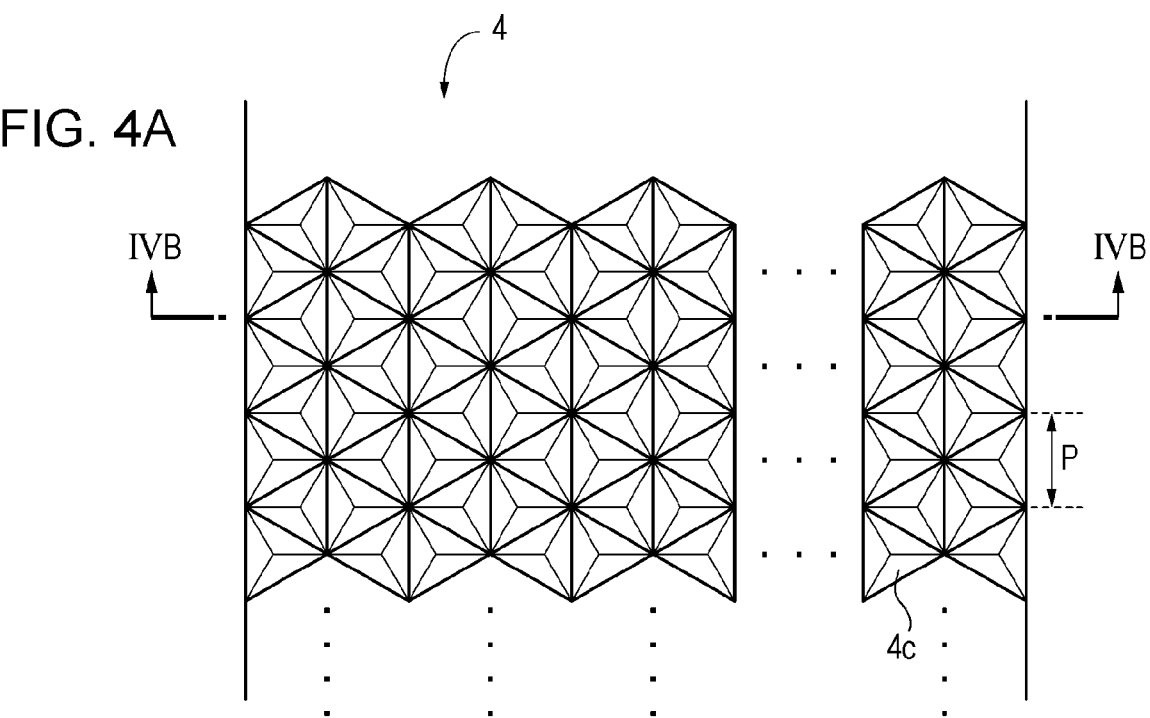
FIG. 4A is a plan view illustrating one example of the shape of a concave-convex surface of a first optical layer.
Figure 4B:
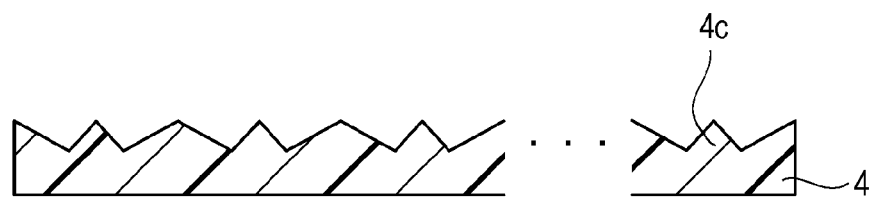
FIG. 4B is a sectional view of the first optical layer taken along line IVB-IVB in FIG. 4A.
Figure 24A:
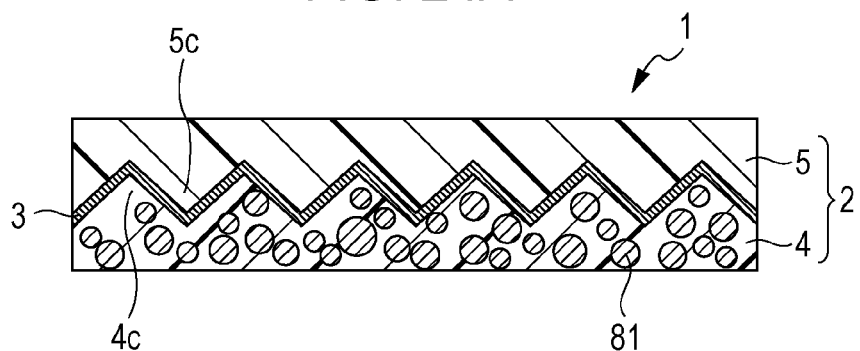
FIG. 24A is a sectional view illustrating a second modification of the first embodiment.
Figure 24B:
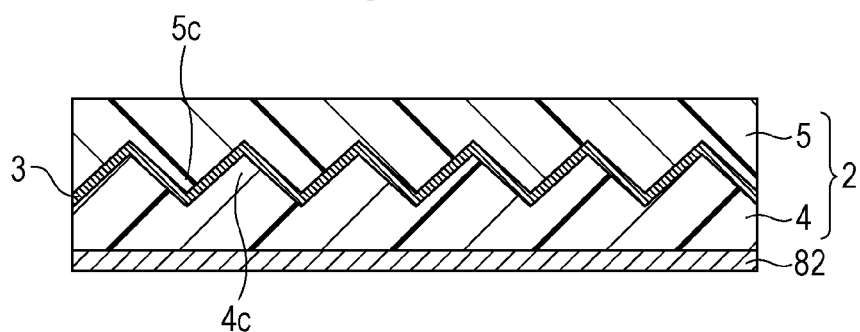
FIG. 24B is a sectional view illustrating a third modification of the first embodiment.
Figure 24C:
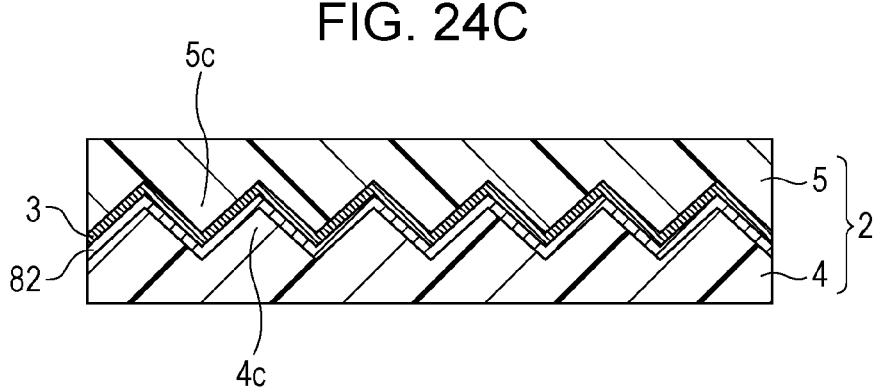
FIG. 24C is a sectional view illustrating a fourth modification of the first embodiment.

The concave-convex surface of the first optical layer 4 is formed, for example, by a plurality of two-dimensionally arranged structures 4c (FIGS. 4A and 4B). The concave-convex surface of the second optical layer 5 is formed, for example, by a plurality of two-dimensionally arranged structures 5c (FIGS. 24A to 24C). Because the structures 4c of the first optical layer 4 and the structures 5c of the second optical layer 5 differ only in that the concave-convex relation is reversed to each other, the following description is made just about the structures 4c of the first optical layer 4.

An array pitch P of the structures 4c is preferably not smaller than 5 μm and not larger than 5 mm, more preferably not smaller than 5 μm and smaller than 250 μm, and even more preferably not smaller than 20 μm and not larger than 200 μm. If the array pitch P of the structures 4c is smaller than 5 μm, part of the light of the transmission wavelengths may be reflected in some cases because it is generally difficult to obtain the desired shape of the structures 4c and to sharpen a wavelength selection characteristic of the wavelength-selective reflecting layer. The occurrence of the above-described partial reflection has a tendency of generating diffraction and causing even higher-order reflections to be visually recognized, thus making a viewing person feel poorer in transparency. On the other hand, if the array pitch P of the structures 4c exceeds 5 mm, a necessary film thickness is increased and flexibility is lost when the shape of the structures 4c necessary for the directional reflection is taken into consideration, thus leading to a difficulty in affixing the optical body 1 to a rigid body, such as the window member 10. Further, by setting the array pitch P of the structures 4c to be smaller than 250 μm, flexibility is increased to such an extent that the optical body 1 can be easily manufactured in a roll-to-roll manner and batch production is not necessary. When the optical body 1 is applied to building components such as windows, a length of about several meters is necessary for the optical body 1 and roll-to-roll production is more suitable than the batch production. By setting the array pitch P to be not smaller than 20 μm and not larger than 200 μm, productivity can be further increased.

The shape of the structures 4c formed on the surface of the first optical layer 4 is not limited to one type, and the structures 4c may be formed in plural shapes on the surface of the first optical layer 4. When the structures 4c are formed in plural shapes on the surface of the first optical layer 4, a predetermined pattern including the plural shapes of the structures 4c may be cyclically repeated. Alternatively, the plural shapes of the structures 4c may be formed at random (non-cyclically) depending on the desired characteristic.

FIG. 4A is a plan view illustrating one example of the shape of the concave-convex surface of the first optical layer, and FIG. 4B is a sectional view of the first optical layer taken along line IVB-IVB in FIG. 4A. The concave-convex surface of the first optical layer 4 is formed, for example, by two-dimensionally arraying the structures 4c each having a recessed corner-cube shape such that sloped surfaces of the adjacent structures 4c are positioned to face each other. The two-dimensional array of the structures 4c is preferably a two-dimensional array in a close-packed state. The reason is that the close-packed state is effective in increasing a packing rate of the structures 4c and in improving the directional reflection effect of the optical body 1.

Figure 5:
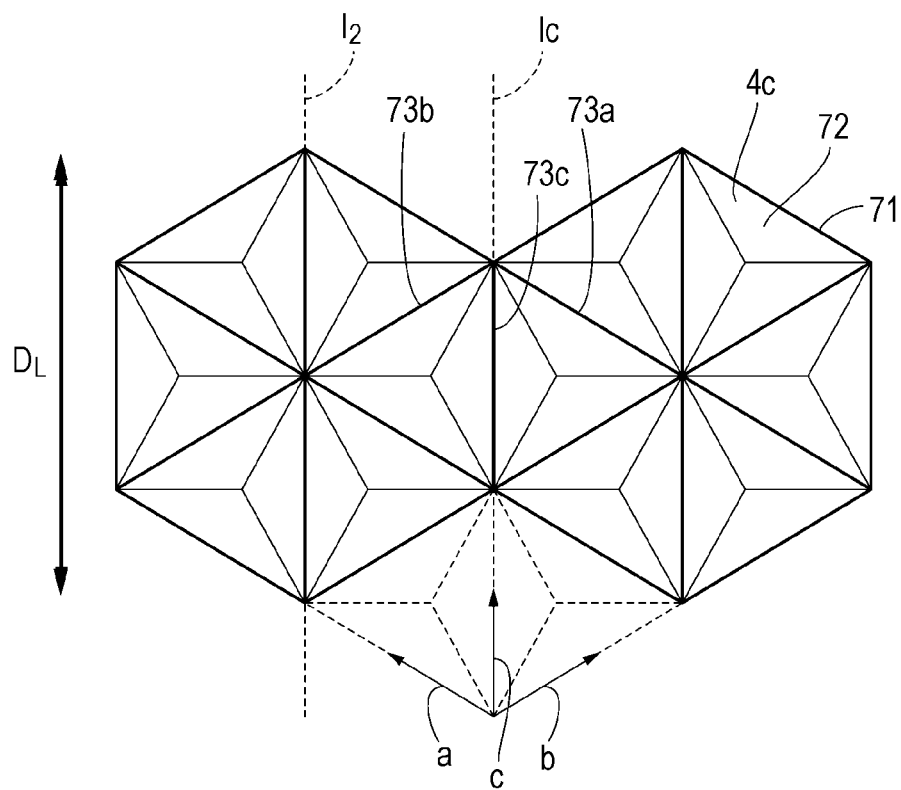
FIG. 5 is an enlarged plan view illustrating, in an enlarged scale, part of the concave-convex surface of the first optical layer illustrated in FIG. 4A.

FIG. 5 is an enlarged plan view illustrating, in an enlarged scale, part of the concave-convex surface of the first optical layer illustrated in FIG. 4A. The structure 4c in the form of a recess is a structure having a corner cube shape (the structure being referred to also as a "corner cube" hereinafter), and the corner cube is defined by a triangular bottom surface 71 and three sloped surfaces 72 each having a triangular shape. Ridges 73a, 73b and 73c are formed by the sloped surfaces of the structures 4c adjacent to each other. The ridges 73a, 73b and 73c are formed to extend in three directions (hereinafter referred to as "ridge directions") a, b and c in the concave-convex surface of the first optical layer 4. One ridge direction c of the three ridge directions a, b and c is substantially parallel to a lengthwise direction $D_L$ of the belt-shaped optical body 1, i.e., to the direction of the specific linear line $l_2$ in the incident surface S1 of the optical body 1.

Herein, the term "corner cube shape" includes not only a precise corner cube shape, but also a substantially corner cube shape. Examples of the substantially corner cube shape include a corner cube shape having an inclined optical axis, a corner cube shape having one or more sloped surfaces that are curved, a corner cube shape having a corner angle deviated from 90°, a corner cube shape having a set of grooves in three directions which are deviated from 6-fold symmetry, a corner cube shape in which grooves in specific two directions are deeper than a groove in the other one direction, a corner cube shape in which a groove in specific one direction is deeper than grooves in the other two directions, a corner cube shape in which grooves in three directions intersect at points not exactly aligned with each other, and a corner cube shape having a curvature at a top. Examples of the corner cube having one or more sloped surfaces that are curved include a corner cube in which three surfaces constituting the corner cube are all curved surfaces, and a corner cube in which one or two of the three surfaces constituting the corner cube are curved surfaces and the remaining two or one surface is a flat surface. Examples of the curved surface include a specific curved surface, such as a parabolic surface, a hyperbolic surface, a spherical surface, or an elliptic surface, and a free-form surface. The curved surface may be concave or convex. Further, one corner cube may include both of concave and convex curved surfaces.

The first optical layer 4 has, for example, a two-layer structure. In more detail, the first optical layer 4 includes a first base element 4a and a first resin layer 4b. The first resin layer 4b is formed between the first base element 4a and the reflecting layer 3, and it has a concave-convex surface in close contact with the reflecting layer 3. Note that the structure of the first optical layer 4 is not limited to the two-layer structure and may be a single-layer structure or a structure having three or more layers.

The first optical layer 4 preferably contains, as a main component, a resin of the type exhibiting a small reduction in its storage (elastic) modulus at 100° C. and no significant difference in storage modulus between 25° C. and 100° C. In more detail, the first optical layer 4 preferably contains a resin having the storage modulus of $3 \times 10^9$ Pa or less at 25° C. and the storage modulus of $3 \times 10^7$ Pa or more at 100° C. The first optical layer 4 is preferably made of one type of resin, but it may contain two or more types of resins. Further, the first optical layer 4 may be mixed with an additive, if necessary.

When the first optical layer 4 contains, as a main component, the resin of the type exhibiting a small reduction in its storage modulus at 100° C. and no significant difference in storage modulus between 25° C. and 100° C. as described above, the first optical layer 4 can substantially maintain the interface shape as per design even when a process under application of heat or heat and pressure is carried out after forming the concave-convex surface (first surface) of the first optical layer 4. On the other hand, if the first optical layer 4 contains, as a main component, a resin of the type exhibiting a large reduction in its storage modulus at 100° C. and significant difference in storage modulus between 25° C. and 100° C., the interface shape is deformed (collapsed) from the designed shape to such a large extent that the optical body 1 may be curled.

The process under application of heat includes not only a process of directly applying heat to the optical body 1 or components thereof, such as annealing, but also a process in which temperature at the surface of a formed film is raised and heat is indirectly applied to the film surface, for example, during formation of a thin film and during curing of a resin composition, and a process in which mold temperature is raised upon irradiation of energy rays and heat is indirectly applied to the optical film. Further, the effect resulting from restricting the numerical range of the storage modulus as described above is not limited to the case using the particular type of resin and can be similarly obtained when a thermoplastic resin, a thermosetting resin, and an energy-ray irradiation resin are used.

The storage modulus of the first optical layer 4 can be confirmed, for example, as follows. When the surface of the first optical layer 4 is exposed, the storage modulus of the first optical layer 4 can be confirmed by measuring the storage modulus of the exposed surface with a micro-hardness tester. When the first base element 4a, etc. are formed on the surface of the first optical layer 4, the storage modulus of the first optical layer 4 can be confirmed by peeling the first base element 4a, etc. to make the surface of the first optical layer 4 exposed, and then measuring the storage modulus of the exposed surface with a micro-hardness tester.

A reduction in the storage modulus at high temperatures can be suppressed, for example, by a method of adjusting, e.g., the length and the kind of a side chain when the thermoplastic resin is used, and by a method of adjusting, e.g., the number of cross-linking points and the molecular structure of a cross-linking agent when the thermosetting resin or the energy-ray irradiation resin is used. However, it is preferable that the characteristics demanded for the resin material itself are not degraded with such a structural change. Depending on the type of the cross-linking agent, for example, the storage modulus at about room temperature may be so increased as to make a resin film brittle, or the resin film may be curved or curled due to large shrinkage. It is, therefore, preferable to properly select the type of the cross-linking agent depending on the demanded characteristics.

When the first optical layer 4 contains a crystalline high-polymeric material as a main component, it preferably contains, as a main component, a resin having the glass transition point higher than the maximum temperature during a manufacturing process and exhibiting a small reduction in the storage modulus at the maximum temperature during the manufacturing process. If a resin having the glass transition point in the range of room temperature 25° C. or higher to the maximum temperature during the manufacturing process and exhibiting a large reduction in the storage modulus at the maximum temperature during the manufacturing process is used, a difficulty occurs in maintaining the ideal interface shape as per design during the manufacturing process.

When the first optical layer 4 contains a non-crystalline (amorphous) high-polymeric material as a main component, it preferably contains, as a main component, a resin having the melting point higher than the maximum temperature during the manufacturing process and exhibiting a small reduction in the storage modulus at the maximum temperature during a manufacturing process. If a resin having the melting point in the range of room temperature 25° C. or higher to the maximum temperature during the manufacturing process and exhibiting a large reduction in the storage modulus at the maximum temperature during the manufacturing process is used, a difficulty occurs in maintaining the ideal interface shape as per design during the manufacturing process.

Herein, the expression "maximum temperature during the manufacturing process" implies a maximum temperature at the concave-convex surface (first surface) of the first optical layer 4 during the manufacturing process. Preferably, the second optical layer 5 also satisfies the above-mentioned numerical range of the storage modulus and the above-mentioned temperature range of the glass transition point.

Thus, at least one of the first optical layer 4 and the second optical layer 5 preferably contains the resin having the storage modulus of $3 \times 10^9$ Pa or less at 25° C. On such a condition, the optical body 1 can be given with flexibility at the room temperature 25° C. and can be manufactured in the roll-to-roll manner.

(Base Element)

The first base element 4a and the second base element 5a have transparency in an exemplary case. Each base element is preferably in the form of a film from the viewpoint of giving the optical body 1 with flexibility, but the form of the base element is not particularly limited to the film. The first base element 4a and the second base element 5a can be each formed by using, e.g., general high polymeric materials. Examples of the general high polymeric materials include triacetylcellulose (TAC), polyester (TPEE), polyethylene terephthalate (PET), polyimide (PI), polyamide (PA), aramid, polyethylene (PE), polyacrylate, polyethersulfone, polysulfone, polypropylene (PP), diacetyl cellulose, polyvinyl chloride, acrylic resin (PMMA), polycarbonate (PC), epoxy resin, urea resin, urethane resin, and melamine resin. However, the materials of the first base element 4a and the second base element 5a are not particularly limited to the above-mentioned examples. The thickness of each of the first base element 4a and the second base element 5a is preferably 38 to 100 μm from the viewpoint of productivity, but it is not particularly limited to such a range. The first base element 4a or the second base element 5a is preferably transparent to an energy ray. The reason is that when the first base element 4a or the second base element 5a is transparent to an energy ray, an energy-ray curable resin interposed between the first base element 4a or the second base element 5a and the reflecting layer 3 can be cured, as described later, by irradiating the energy-ray curable resin with the energy ray from the side including the first base element 4a or the second base element 5a.

(Resin Layer)

The first resin layer 4b of the first optical layer 4 and a second resin layer 5b (described later) of the second optical layer 5 have transparency in an exemplary case. The first resin layer 4b and the second resin layer 5b are each obtained, for example, by curing a resin composition. As the resin composition, an energy-ray curable resin capable of being cured upon irradiation with light or an electron beam, or a thermosetting resin capable of being cured upon application of heat is preferably used from the viewpoint of easiness in production. As the energy-ray curable resin, a photosensitive resin composition capable of being cured upon irradiation with light is preferable, and an ultraviolet curable resin capable of being cured upon irradiation with an ultraviolet ray is most preferable. From the viewpoint of increasing adhesion between the first optical layer 4 (specifically the first resin layer 4b) or the second optical layer 5 (specifically the second resin layer 5b) and the reflecting layer 3, the resin composition preferably further contains a compound containing phosphoric acid, a compound containing succinic acid, and a compound containing butyrolactone. The compound containing phosphoric acid may be, e.g., (meth)acrylate containing phosphoric acid, preferably a (meth)acryl monomer or oligomer having phosphoric acid in a functional group. The compound containing succinic acid may be, e.g., (meth)acrylate containing succinic acid, preferably a (meth)acryl monomer or oligomer having succinic acid in a functional group. The compound containing butyrolactone may be, e.g., (meth)acrylate containing butyrolactone, preferably a (meth)acryl monomer or oligomer having butyrolactone in a functional group.

The ultraviolet curable resin composition contains, e.g., (meth)acrylate and a photopolymerization initiator. The ultraviolet curable resin composition may further contain, if necessary, a photo-stabilizer, a flame retardant, a leveling agent, and/or an anti-oxidant.

As the acrylate, a monomer and/or an oligomer having two or more (meth)acryloyl groups is preferably used. Examples of such a monomer and/or oligomer include urethane (meth)acrylate, epoxy (meth)acrylate, polyester (meth)acrylate, polyol (meth)acrylate, polyether (meth)acrylate, and melamine (meth)acrylate. Herein, the term "(meth)acryloyl group" implies an acryloyl group or a methacryloyl group. The term "oligomer" used herein implies a molecule having molecular weight of 500 or more to 60000 or less.

The photopolymerization initiator used here can be selected, as appropriate, from among general materials. As examples of the general materials, benzophenone derivatives, acetophenone derivatives, and anthraquinone derivatives can be used alone or in combination. An amount of the photopolymerization initiator mixed is preferably 0.1% by mass or more and 10% by mass or less of the solid content. If the amount of the photopolymerization initiator mixed is less than 0.1% by mass, photo-curability is reduced to such a level as being not suitable for industrial production from the practical point of view. On the other hand, if the amount of the photopolymerization initiator mixed exceeds 10% by mass, an odor tends to remain in a formed coating when an amount of light emitted for the irradiation is insufficient. Herein, the term "solid content" implies all components constituting the first resin layer 4b or the second resin layer 5b after being cured. For example, the acrylate and the photopolymerization initiator are included in the solid content.

The resin used here preferably causes neither deformations nor cracks even at the process temperature during formation of a dielectric. If the glass transition temperature is too low, this is unsatisfactory in that the resin may be deformed at relatively high temperatures after installation, or that the resin shape may be changed during the formation of the dielectric. If the glass transition temperature is too high, this is unsatisfactory in that cracks and interfacial peeling are more apt to occur. In practice, the glass transition temperature is preferably 60° C. or higher and 150° C. or lower and more preferably 80° C. or higher and 130° C. or lower.

Preferably, the resin has such a property that a structure can be transferred to the resin upon, e.g., irradiation with the energy ray or application of heat. For example, a vinyl-based resin, an epoxy-based resin, and a thermoplastic resin are usable. In other words, any type of resin can be used as long as the resin satisfies the above-described requirements for the refractive index.

The resin may be mixed with an oligomer to reduce curing shrinkage. The resin may further contain, e.g., polyisocyanate as a curing agent. In consideration of adhesion between the first optical layer 4 (specifically the first resin layer 4b) or the second optical layer 5 (specifically the second resin layer 5b) and the adjacent layer, the resin may be further mixed with suitable one or more of monomers having a hydroxyl group, a carboxyl group and a phosphoric group, polyols, coupling agents such as carboxylic acid, silane, aluminum and titanium, and various chelating agents.

The resin composition preferably further contains a cross-linking agent. In particular, a cyclic cross-linking agent is preferably used as the cross-linking agent. By using the cross-linking agent, the resin can be made heat-resistant without greatly changing the storage modulus at the room temperature. If the storage modulus at the room temperature is greatly changed, the optical body 1 may become brittle and a difficulty may occur in fabricating the optical body 1 through the roll-to-roll process. Examples of the cyclic cross-linking agent include dioxaneglycol diacrylate, tricyclodecanedimethanol diacrylate, tricyclodecanedimethanol dimethacrylate, ethylene oxide-modified isocyanurate diacrylate, ethylene oxide-modified isocyanurate triacrylate, and caprolactone-modified tris(acryloxyethyl) isocyanurate.

Note that the contents of the above-mentioned polymers, etc. can be optionally adjusted depending on the properties of, e.g., a dielectric layer or a metal layer included in the reflecting layer 3.

Preferably, the first base element 4a or the second base element 5a has water vapor permeability lower than that of the first resin layer 4b (forming the first optical layer 4) or the second resin layer 5b (forming the second resin layer 5), respectively. For example, when the first resin layer 4b is formed by using the energy-ray curable resin, e.g., urethane acrylate, the first base element 4a is preferably formed by using a resin having water vapor permeability lower than that of the first resin layer 4b and being transmissive to the energy ray, e.g., polyethylene terephthalate (PET). As a result, diffusion of moisture toward the reflecting layer 3 from the incident surface S1 or the emergent surface S2 can be reduced and deterioration of a metal, etc. contained in the reflecting layer 3 can be suppressed. Hence, durability of the optical body 1 can be improved. Note that the water vapor permeability of PET having a thickness of 75 μm is about 10 g/m²/day (40° C., 90% RH).

Preferably, at least one of the first optical layer 4 and the second optical layer 5 contains a functional group having high polarity, and the content of such a functional group differs between the first optical layer 4 and the second optical layer 5. More preferably, both the first optical layer 4 and the second optical layer 5 contain a phosphoric compound (e.g., phosphoric ester), and the content of the phosphoric compound differs between the first optical layer 4 and the second optical layer 5. The difference in the content of the phosphoric compound between the first optical layer 4 and the second optical layer 5 is preferably two or more times, more preferably five or more times, and even more preferably ten or more times.

When at least one of the first optical layer 4 and the second optical layer 5 contains the phosphoric compound, the reflecting layer 3 preferably contains an oxide, a nitride, or an oxynitride in its surface contacting with the first optical layer 4 or the second optical layer 5 that contains the phosphoric compound. It is particularly preferable that the reflecting layer 3 includes a layer, which contains zinc oxide (ZnO) or niobium oxide, in its surface contacting with the first optical layer 4 or the second optical layer 5 that contains the phosphoric compound. Such a feature is effective in increasing adhesion between the first optical layer 4 or the second optical layer 5 and the reflecting layer 3, e.g., the wavelength-selective reflecting layer. Another reason is that an anticorrosion effect is increased when the reflecting layer 3 contains a metal, such as Ag. Additionally, the reflecting layer 3 may contain a dopant, such as Al or Ga. The reason is that the dopant improves film quality and smoothness when a metal oxide layer is formed by, e.g., sputtering.

From the viewpoint of giving the optical body 1, the window member 10, etc. with a visually attractive design, at least one of the first optical layer 4 and the second optical layer 5 preferably has a characteristic of absorbing light in the specific wavelength band within the visible range. A pigment dispersed in the resin may be either an organic pigment or an inorganic pigment. In particular, an inorganic pigment having high weatherbility in itself is preferable. Practical examples of the inorganic pigment include zircone gray (Co, Ni-doped $ZrSiO_4$), praseodymium yellow (Pr-doped $ZrSiO_4$), chrome-titania yellow (Cr, Sb-doped $TiO_2$ or Cr, W-doped $TiO_2$), chrome green (such as $Cr_2O_3$), peacock blue $((CoZn)O(AlCr)_2O_3)$, Victoria green $((Al, Cr)_2O_3)$, deep blue $(CoO.Al_2O_3.SiO_2)$, vanadium-zirconium blue (V-doped $ZrSiO_4$), chrome-tin pink (Cr-doped $CaO.SnO_2.SiO_2$), manganese pink (Mn-doped $Al_2O_3$), and salmon pink (Fe-doped $ZrSiO_4$). Examples of the organic pigment include an azo-based pigment and a phthalocyanine pigment.

(Refractive Index of Second Optical Layer)

As described above, the second optical layer 5 serves to protect the reflecting layer 3 by embedding the first surface (concave-convex surface) of the first optical layer 4 on which the reflecting layer 3 is formed. By setting the refractive index of the second optical layer 5 to fall within a predetermined range, it is possible to refract the light incident on the optical body 1 at the incident surface S1 and to modify an actual incident angle with respect to the reflecting layer 3. It is further possible to suppress a reduction of the directionally reflected component, which is caused by the reflection of the incident light at the air/resin interface. Accordingly, even when the shapes of tip portions of the structures constituting the reflecting layer 3, e.g., the shapes of ridge portions when the structures are corner cubes, are deformed (collapsed) from the ideal shape, an overall rate of the directionally reflected component can be held high.

The second optical layer 5 has, for example, a two-layer structure. In more detail, the second optical layer 5 includes the second base element 5a and the second resin layer 5b. The second resin layer 5b is formed between the second base element 5a and the reflecting layer 3, and it has a concave-convex surface in close contact with the reflecting layer 3. Note that the structure of the second optical layer 5 is not limited to the two-layer structure and may be a single-layer structure or a structure having three or more layers.

The second base element 5a and the second resin layer 5b can be formed by using similar materials to those of the first base element 4a and the first resin layer 4b, respectively. However, it is important that the materials of the second base element 5a and the second resin layer 5b each have the refractive index within a predetermined range. More specifically, the refractive index of the second optical layer 5 is preferably 1.1 or more and 1.9 or less, more preferably 1.4 or more and 1.6 or less, and even more preferably 1.49 or more and 1.55 or less. The reason why the refractive index of the second optical layer 5 is preferably set to fall within the above-mentioned range will be described later together with explanation of EXAMPLES.

When the second optical layer 5 has a multilayer structure, the difference in refractive index between adjacent layers of the multilayer structure is preferably 0.010 or less, more preferably 0.008 or less, and even more preferably 0.005 or less. Also, when the optical body 1 is affixed to the adherend, e.g., the window member, the difference between the refractive index of the optical layer at the affixed surface of the optical body and the refractive index of the adherend is preferably held within the above-mentioned range.

Figure 6A:
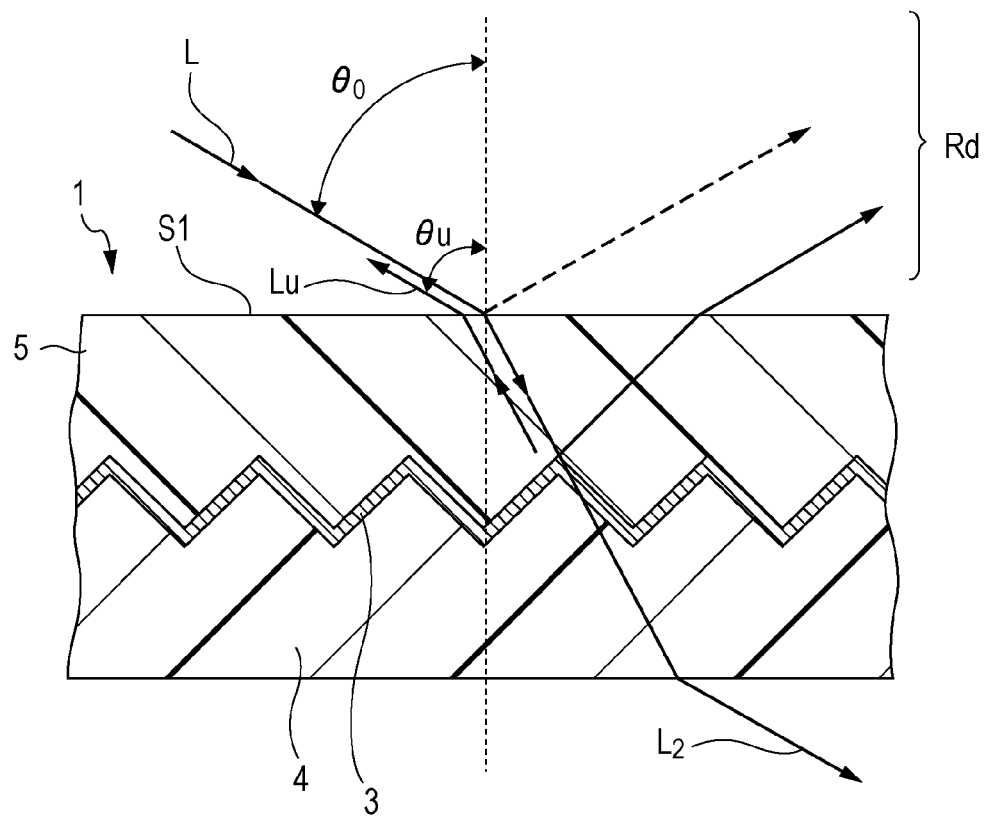
FIG. 6A is a schematic sectional view illustrating how the light incident on the optical body is reflected by a reflecting layer.
Figure 6B:
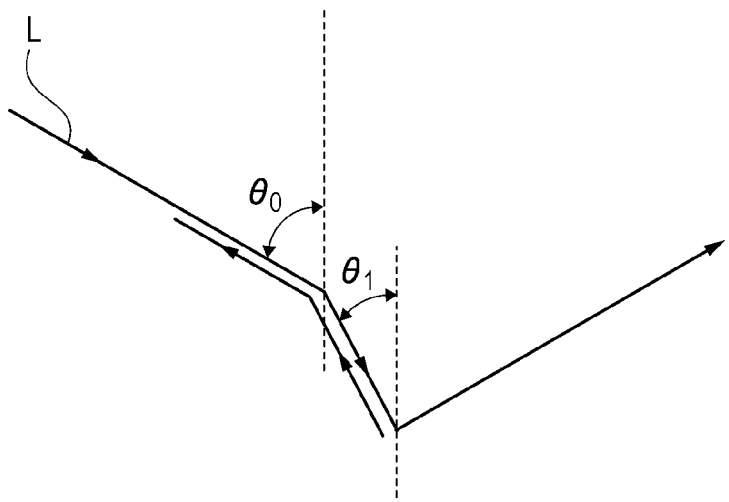
FIG. 6B illustrates, using just lines, optical paths when light refracted at an air/resin interface is reflected by the reflecting layer.

FIG. 6A is a schematic sectional view illustrating how the light incident on the optical body 1 is reflected by the reflecting layer 3, and FIG. 6B illustrates, using just lines, optical paths when light refracted at the air/resin interface is reflected by the reflecting layer 3.

In FIG. 6A, the adherend, the adhesive layer, etc. are omitted and the incident surface S1 is provided as the interface between the optical body 1 and air. While the following description is made on the premise that the left side on the drawing is positioned upward in the vertical direction, the embodiment is not limited to such an exemplary case. For example, when the optical body 1 is applied to a sloped roof, the left side in FIG. 6A may be positioned obliquely upward. When the optical body 1 is applied to a skylight, the optical body 1 may be oriented to extend substantially in the horizontal direction.

An upward reflectance (directional reflectance) Ru and a downward reflectance Rd of the light emerging from the optical body 1 can be determined as follows.

Let now consider the case where light L is incident on the optical body 1 at an incident angle $\theta_0$. Part of the light L is reflected at the air/resin interface, while the remaining part of the light L is refracted at a refractive angle $\theta_1$ and advances to the reflecting layer 3. Part of the light having advanced to the reflecting layer 3 is reflected by the reflecting layer 3 downward of the optical body 1, while the remaining part thereof is directionally reflected. The directionally reflected light advances to the air/resin interface and emerges upward of the optical body 1 after being refracted at the air/resin interface. On the other hand, the light having been not directionally reflected by the reflecting layer 3 is refracted at the air/resin interface to emerge downward of the optical body 1 (to the right side in FIG. 6A).

Accordingly, the upward reflected component is given as a component of the light L, which is directionally reflected by the reflecting layer 3, and the downward reflected component is given as the sum of a component reflected at the air/resin interface and a component not directionally reflected by the reflecting layer 3. The term "upward reflected component" used in this specification implies light Lu emerging from the optical body 1 at an emergence angle $\theta_u$ in the range of 0° or larger to 90° or smaller in FIG. 6A.

Energy reflectance at the air/resin interface can be calculated based on the so-called Fresnel's reflectance formulae:

$$\Gamma s = \left\{ \frac{(n_0\cos\theta_0 - n_1\cos\theta_1)}{(n_0\cos\theta_0 + n_1\cos\theta_1)} \right\}^2 \quad (1)$$

$$\Gamma p = \left\{ \frac{(n_0\cos\theta_1 - n_1\cos\theta_0)}{(n_0\cos\theta_1 + n_1\cos\theta_0)} \right\}^2 \quad (2)$$

where $\Gamma s$: energy reflectance (S wave)
$\Gamma p$: energy reflectance (P wave)
$n_0$: refractive index of air ($n_0$=1.0)
$n_1$: refractive index of the second optical layer The magnitude of the component reflected at the air/resin interface can be estimated from an arithmetic mean $\Gamma$ (hereinafter referred to as a "Fresnel reflectance") of $\Gamma s$ and $\Gamma p$. On the other hand, a proportion of the component, which has not been reflected at the air/resin interface, with respect to the light incident on the optical body 1, i.e., a proportion of the component propagating to the reflecting layer 3 after being refracted at the air/resin interface, can be thought as being (1−Γ).

Given that a proportion of the directionally reflected light with respect to the light incident on the reflecting layer 3, i.e., the directional reflectance at the reflecting layer 3, is Re, a proportion (upward reflectance Ru) of the light, which emerges from the optical body 1 upward again, with respect to the light entering the optical body 1 from above is expressed by Re×(1−Γ), and a proportion of the light emerging from the optical body 1 downward is expressed by (1−Re)×(1−Γ).

Thus, the upward reflectance Ru and the downward reflectance Rd of the optical body 1 can be expressed by the following formulae (3) and (4), respectively:

$$Ru = Re \times (1-\Gamma) \quad (3)$$

$$Rd = \Gamma + (1-Re) \times (1-\Gamma) = 1 - Re \times (1-\Gamma) \quad (4)$$

Figure 7:
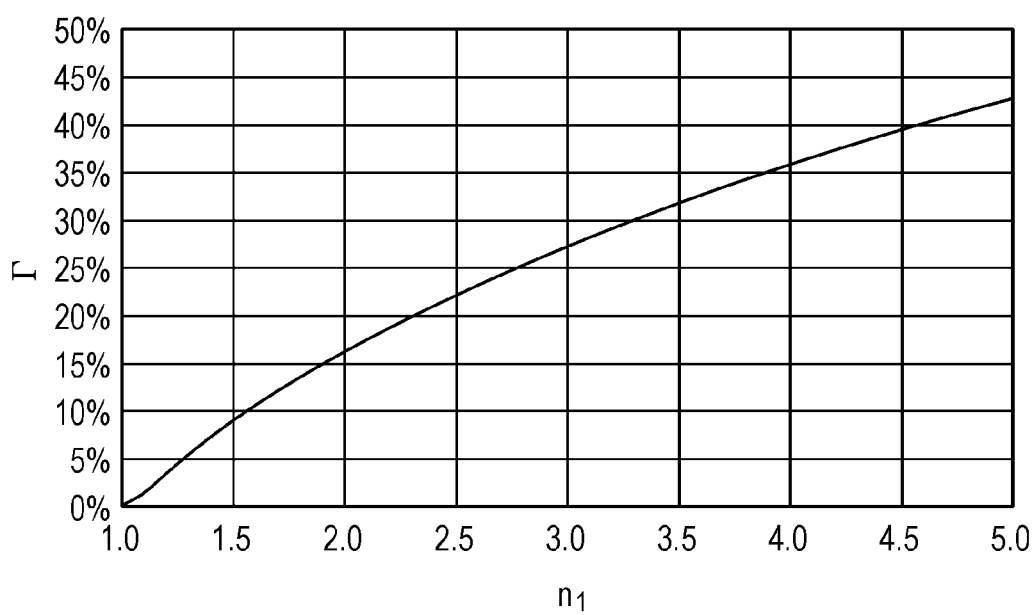
FIG. 7 is a graph representing the relationship between a Fresnel reflectance Γ and a refractive index $n_1$ of a second optical layer.

FIG. 7 is a graph representing the relationship between the Fresnel reflectance $\Gamma$ and the refractive index $n_1$ of the second optical layer 5. As plotted in FIG. 7, $\Gamma$ increases as $n_1$ increases. This implies that, taking into account only a point of suppressing, of the incident light L, the component specularly reflected at the air/resin interface, the refractive index $n_1$ of the second optical layer 5 is preferably as close as possible to 1.0.

On the other hand, from the viewpoint of increasing the directional reflectance Re at the reflecting layer 3, it is desired that the light propagating to the reflecting layer 3 is positively reflected plural times by the surfaces of the structures. To that end, an incident angle on condition that the reflecting layer is assumed to be a flat plane parallel to the incident surface, i.e., the refractive index $\theta_1$ at the air/resin interface, is preferably as small as possible.

The refractive angle $\theta_1$ is calculated based on the so-called Snell's law:

$$n_0 \sin\theta_0 = n_1 \sin\theta_1 \quad (5)$$

As seen from the Snell's law, the refractive index $n_1$ of the second optical layer 5 is preferably increased in order to reduce the refractive index $\theta_1$ on condition that $n_0$=1.0 and $\theta_0$ is fixedly held.

In short, it can be thought that the downward reflected component, which reduces the directional reflection performance of the optical body 1, is affected by two factors, i.e., the reflection occurred at the air/resin interface and the downward reflection occurred at the reflecting layer 3. The refractive index $n_1$ of the second optical layer 5 is preferably closer to the refractive index of air from the viewpoint of reducing contribution of the former reflection, and it is preferably as large as possible from the viewpoint of reducing contribution of the latter reflection. Stated another way, the refractive index of the second optical layer 5 is one of parameters determining the directional reflection performance of the optical body 1.

(Reflecting Layer)

The reflecting layer 3 is, for example, a wavelength-selective reflecting layer for directionally reflecting, of the light incident on the incident surface at the incident angle (θ, φ), the light in the specific wavelength band while transmitting the remaining light other than the specific wavelength band, or a reflecting layer for directionally reflecting the light incident on the incident surface at the incident angle (θ, φ), or a semitransparent layer that slightly causes scattering and has transparency allowing the opposite side to be visually recognized. The wavelength-selective reflecting layer is, for example, a laminate (stacked) film, a transparent electroconductive layer, or a functional layer. Alternatively, the wavelength-selective reflecting layer may be formed by using two or more of the laminate film, the transparent conductive layer, and the functional layer in a combined manner. A mean thickness of the reflecting layer 3 is preferably 20 μm or less, more preferably 5 μm or less, and even more preferably 1 μm or less. If the mean thickness of the reflecting layer 3 exceeds 20 µm, the length of an optical path in which the transmitted light is refracted is increased, and the transmission image tends to distort in appearance. The reflecting layer 3 can be formed, for example, by sputtering, vapor deposition, dip coating, or die coating.

The laminate film, the transparent electroconductive layer, the functional layer, and the semitransparent layer will be described below one by one.

(Laminate Film)

The laminate film is, for example, a film formed by alternately stacking a low refractive index layer and a high refractive index layer, which differ from each other in refractive index. As another example, the laminate film is a film formed by stacking a metal layer having a high reflectance in the infrared range, a metal oxide protective layer for preventing deterioration of the reflecting layer, and a high refractive index layer having a high refractive index in the visible range and serving as an anti-reflection layer. An optical transparent layer or a transparent electroconductive layer can be used as the high refractive index layer. The latter laminate film may be formed by successively stacking the metal layer, the metal oxide protective layer, and the high refractive index layer one above another in a repeated manner.

The metal layer having a high reflectance in the infrared range contains, as a main component, Au, Ag, Cu, Al, Ni, Cr, Ti, Pd, Co, Si, Ta, W, Mo or Ge alone, or an alloy containing two or more selected from among those elements, for example. Of those examples, Ag-, Cu-, Al-, Si- or Ge-based materials are preferable in consideration of practicability. When an alloy is used as the material of the metal layer, the metal layer preferably contains, as a main component, AlCu, Alti, AlCr, AlCo, AlNdCu, AlMgSi, AgPdCu, AgPdTi, AgCuTi, AgPdCa, AgPdMg, AgPdFe, AgNdCu, AgBi, Ag, or SiB, for example. To retard corrosion of the metal layer, an additional material, such as Ti or Nd, is preferably mixed in the metal layer. In particular, when Ag is used as the material of the metal layer, it is preferable to mix the additional material.

The film thickness of the wavelength-selective reflecting metal layer is preferably 6 to 30 nm, more preferably 7 to 25 nm, and even more preferably 8 to 20 nm. If the film thickness is smaller than 6 nm, the metal in the reflecting layer is brought into the island-like or granular form and the reflective function is reduced. If the film thickness exceeds 30 nm, transmittance is reduced.

The metal oxide protective layer is preferably formed as a film of, e.g., a ZnO-based oxide metal, such as ZnO, GAZO, AZO or GZO, with a thickness of preferably 3 to 30 nm, more preferably 4 to 20 nm, and even more preferably 5 to 15 nm. If the layer thickness is smaller than 3 nm, the wavelength-selective reflecting metal layer is apt to deteriorate. If the layer thickness exceeds 30 nm, the metal oxide protective layer is apt to crack. The metal oxide protective layer is preferably formed by using an oxide target in an atmosphere of Ar gas alone with DC pulse sputtering, MF dual sputtering, or RF sputtering.

The high refractive index layer is a layer containing, as a main component, a metal oxide, for example. Preferably, the high refractive index layer contains, as a main component, a high-dielectric material in the form of a metal oxide, e.g., niobium oxide, tantalum oxide, or titanium oxide, and it is formed as a metal oxide layer of, e.g., niobium pentoxide, tantalum pentoxide, or titanium oxide with a thickness of preferably 10 to 120 nm, more preferably 10 to 100 nm, and even more preferably 10 to 80 nm. If the layer thickness is smaller than 10 nm, the high refractive index layer is more apt to reflect the visible light. If the layer thickness exceeds 120 nm, the high refractive index layer is more apt to reduce transmittance and to cause cracking.

The refractive index of the high refractive index layer included in the laminate film is preferably in the range of 1.7 or more to 2.6 or less, more preferably 1.8 or more to 2.6 or less, and more preferably 1.9 or more to 2.6 or less. By setting the refractive index as mentioned above, anti-reflection can be realized in the visible range with a film being so thin as not to cause cracking. Note that the refractive index is measured at a wavelength of 550 nm.

The laminate film is not limited to a thin film made of an inorganic material, and it may be formed by stacking a thin film made of a high polymeric material and a layer containing fine particles, etc. dispersed in a high polymeric material.

(Transparent Electroconductive Layer)

The transparent electroconductive layer is a layer containing, as a main component, an electroconductive material having transparency in the visible range. More specifically, the transparent electroconductive layer contains, as a main component, a transparent electroconductive material, e.g., tin oxide, zinc oxide, a material containing carbon nano-tubes, indium-doped tin oxide, indium-doped zinc oxide, and antimony-doped tin oxide. A layer alternatively usable here may contain nano-particles of the above-mentioned materials, or nano-particles, nano-rods or nano-wires of an electroconductive material, e.g., a metal, which are dispersed in a resin at a high density.

(Functional Layer)

The functional layer contains, as a main component, a chromic material of which reflection performance, for example, is reversibly changed upon application of an external stimulus. The term "chromic material" implies a material reversibly changing its structure upon application of an external stimulus, such as heat, light, or intrusive molecules. Examples of the chromic material usable here include a photochromic material, a thermochromic material, a gaschromic material, and an electrochromic material.

The photochromic material is a material reversibly changing its structure by the action of light. The photochromic material can reversibly change various physical properties, such as reflectance and color, upon irradiation with light, e.g., an ultraviolet ray. Transition metal oxides, such as $TiO_2$, $WO_3$, $MoO_3$, and $Nb_2O_5$, which are doped with Cr, Fe or Ni, for example, can be used as the photochromic material. Further, wavelength selectivity can be improved by stacking a layer of the photochromic material and a layer having a different refractive index from that of the former layer.

The thermochromic material is a material reversibly changing its structure by the action of heat. The thermochromic material can reversibly change various physical properties, such as reflectance and color, upon application of heat. For example, $VO_2$ can be used as the thermochromic material. Other elements, such as W, Mo and F, may also be added for the purpose of controlling the transition temperature and the transition curve. Further, a laminate structure may be formed by sandwiching a thin film containing, as a main component, the thermochromic material, e.g., $VO_2$, between anti-reflection layers each containing, as a main component, a high refractive index material, e.g., $TiO_2$ or ITO.

A photonic lattice, such as a cholesteric liquid crystal, can also be used. The cholesteric liquid crystal can selectively reflect light of a wavelength depending on an interlayer distance, and the interlayer distance is changeable depending on temperature. Therefore, the physical properties, such as reflectance and color, of the cholesteric liquid crystal can be reversibly changed upon heating. In this connection, a reflection band can be widened by using several cholesteric liquid crystal layers having different interlayer distances.

The electrochromic material is a material reversibly changing various physical characteristics, such as reflectance and color, by the action of electricity. The electrochromic material can be provided, for example, as a material reversibly changing its structure upon application of voltage, for example. More specifically, a reflective light control material changing its reflection characteristic with doping or undoping of a proton, for example, can be used as the electrochromic material. The term "reflective light control material" implies a material capable of selectively controlling its optical property to desired one of a transparent state, a mirror state, and an intermediate state therebetween upon application of an external stimulus. Examples of the reflective light control material usable here include an alloy material containing, as a main component, a magnesium-nickel alloy material or a magnesium-titanium alloy material, $WO_3$, and materials in which needle crystals having selective reflectivity are enclosed in microcapsules.

In practice, the functional layer can be constituted, for example, by successively stacking, on the second optical layer 5, the above-described alloy layer, a catalyst layer containing, e.g., Pd, a thin buffer layer made of, e.g., Al, an electrolyte layer made of, e.g., $Ta_2O_5$, an ion storage layer made of, e.g., $WO_3$ containing protons, and the transparent electroconductive layer. Alternatively, the functional layer can be constituted, for example, by successively stacking, on the second optical layer 5, the transparent electroconductive layer, the electrolyte layer, an electrochromic layer made of, e.g., $WO_3$, and the transparent electroconductive layer. In such a laminate structure, when a voltage is applied between the transparent electroconductive layer and an opposed electrode, protons contained in the electrolyte layer are doped into or undoped from the alloy layer. As a result, the transmittance of the alloy layer is changed. Further, in order to increase the wavelength selectivity, the electrochromic material is desirably laminated with a high refractive index material, such as $TiO_2$ or ITO. As another usable laminate structure, the transparent conductive layer, an optical transparent layer including microcapsules dispersed therein, and a transparent electrode may be stacked on the second optical layer 5. In that structure, when a voltage is applied between both the transparent electrodes, a transmissive state can be obtained in which needle crystals in the microcapsules are uniformly oriented, and when the voltage is eliminated, a wavelength-selective reflective state can be obtained in which the needle crystals are oriented at random.

(Semitransparent Layer)

The semitransparent layer is a semitransparent reflecting layer. Examples of the semitransparent reflecting layer include a thin metal layer, a thin metal nitride layer, etc., each containing a semiconductive material. From the viewpoint of anti-reflection, color tone control, improved chemical wetting, and higher reliability against degradation caused by environmental factors, the semitransparent reflecting layer is preferably formed in a laminate structure in which the reflecting layer is stacked with, e.g., an oxide layer, a nitride layer, or an oxynitride layer.

The metal layer having a high reflectance in the visible range and the infrared range can be made of a material containing, as a main component, Au, Ag, Cu, Al, Ni, Cr, Ti, Pd, Co, Si, Ta, W, Mo or Ge alone, or an alloy containing two or more selected from among those elements, for example. Of those examples, Ag-, Cu-, Al-, Si- or Ge-based materials are preferable in consideration of practicability. To retard corrosion of the metal layer, an additional material, such as Ti or Nd, is preferably mixed in the metal layer. The metal nitride layer can be made of, e.g., TiN, CrN or WN.

A film thickness of the semitransparent layer can be set to fall in the range of 2 nm or more to 40 nm or less, for example. However, the thickness of the semitransparent layer is not limited to such a particular range because the semitransparent layer may have any desired thickness as long as it has semitransparency in the visible range and the near infrared range. Herein, the term "semitransparency" implies that the transmittance at wavelengths of 500 nm or longer to 1000 nm or shorter is 5% or more and 70% or less, preferably 10% or more and 60% or less, and more preferably 15% or more and 55% or less. Also, the term "semitransparent layer" implies a reflecting layer having the transmittance of 5% or more and 70% or less, preferably 10% or more and 60% or less, and more preferably 15% or more and 55% or less at wavelengths of 500 nm or longer to 1000 nm or shorter.

[Functions of Optical Body]

Figure 8A:
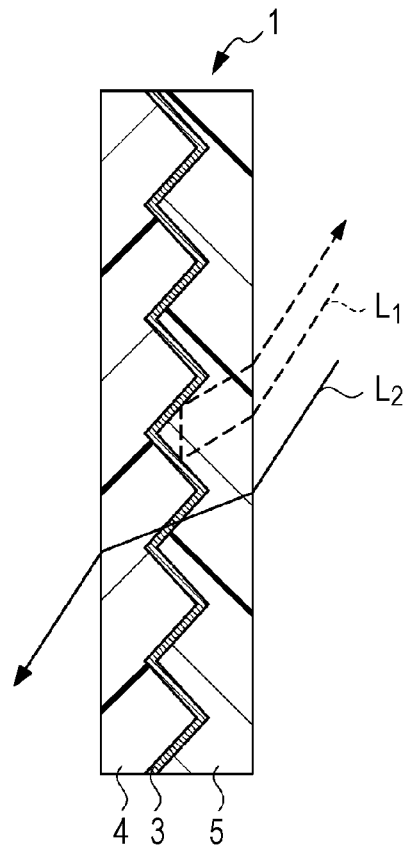
FIGS. 8A and 8B are each a sectional view to explain one example of functions of the optical body.
Figure 8B:
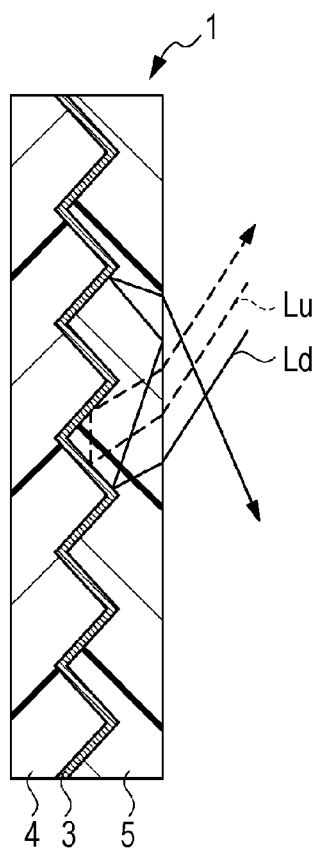

FIGS. 8A and 8B are each a sectional view to explain one example of functions of the optical body. The following description is made, by way of example, in connection with the case where each of the structures constituting the concave-convex surface has a cross-section in a prism-like shape having an inclination angle of 45°. As illustrated in FIG. 8A, part of a near infrared ray $L_1$ in the sunlight entering the optical body 1 is directionally reflected toward the sky in a substantially reversed relation to the direction of the incident light. On the other hand, visible light $L_2$ passes through the optical body 1.

Further, as illustrated in FIG. 8B, light being incident on the optical body 1 and reflected by the reflecting surface of the reflecting layer 3 is separated into a component $L_U$ reflected toward the sky and a component $L_D$ not reflected toward the sky at a proportion depending on the incident angle. The component $L_D$ not reflected toward the sky is totally reflected at the interface between the second optical layer 5 and air and is then finally reflected in a direction differing from the incident direction.

Given that the light incident angle is $\theta_0$, the refractive index of the second optical layer 5 is $n_1$, and the reflectance of the reflecting layer 3 is R, a proportion Ru of the upward reflected component Lu with respect to the total incident component can be expressed by the following formula (6) on the premise that the refractive index of air is $n_0=1.0$. In the formula (6), $\theta_1$ denotes the refractive angle at the interface between air and the second optical layer 5.

$$Ru=(\sin(45-\theta_1)+\cos(45-\theta_1)/\tan(45+\theta_1))/(\sin(45-\theta_1)+\cos(45-\theta_1))\times R^2 \quad (6)$$

where $\theta_1=\sin^{-1}(\sin \theta_0/n_1)$

Thus, considering the case where the refractive index $n_1$ of the second optical layer 5 is fixedly held, as the incident angle $\theta_0$ of the light entering the optical body 1 increases, the proportion Ru of the upward reflected component decreases. Conversely speaking, reducing the effective incident angle to the reflecting layer 3 is effective in suppressing a reduction of Ru, which is caused by an increase of $\theta_0$. In other words, it is effective to increase the refractive index $n_1$ of the second optical layer 5 as large as possible in order to prevent a reduction of Ru, which is caused by an increase of $\theta_0$.

Further, as the proportion of the component Ld not reflected toward the sky increases, the proportion at which the incident light is reflected toward the sky decreases. Contriving or improving the shape of the reflecting layer 3, i.e., the shape of the structure 4c of the first optical layer 4, is effective in increasing the proportion of the component reflected toward the sky.

Figure 9A:
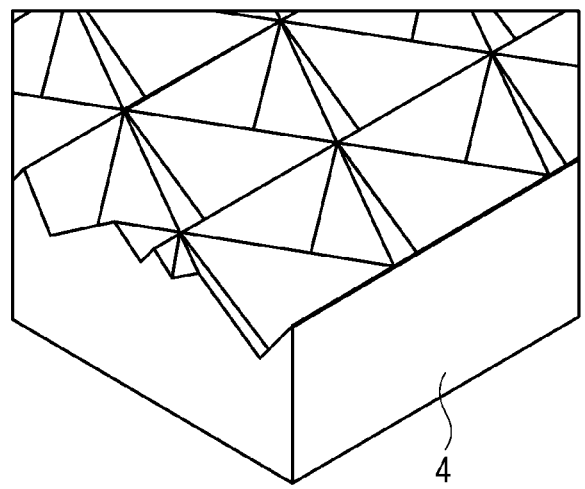
FIG. 9A is a perspective view illustrating part of the first optical layer in which corner cubes are formed.
Figure 9B:
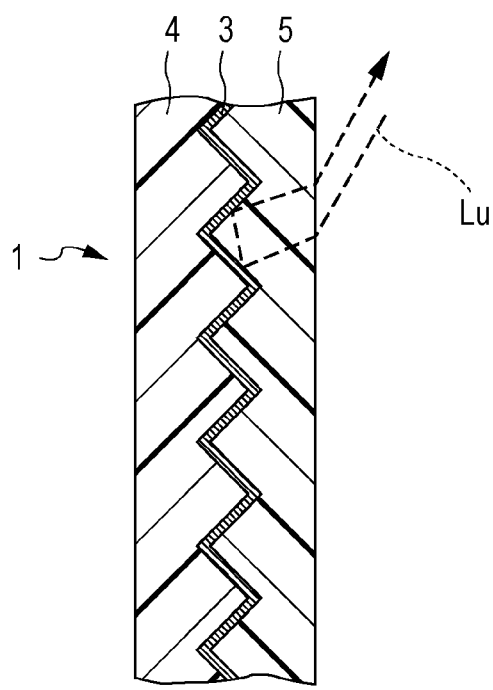
FIG. 9B is a schematic sectional view of the optical body in which the corner cubes are formed in the first optical layer.

FIG. 9A is a perspective view illustrating part of the first optical layer 4 in which corner cubes are formed, and FIG. 9B is a schematic sectional view of the optical body 1 in which the corner cubes are formed in the first optical layer 4. When the ridge portions of the corner cubes are not deformed from the ideal shape as illustrated in FIG. 9A, the foregoing discussion can be applied as it is. For the reason in the manufacturing process, however, a difficulty may occur sometimes in forming the ridge portions in shape as per design.

Figure 10A:
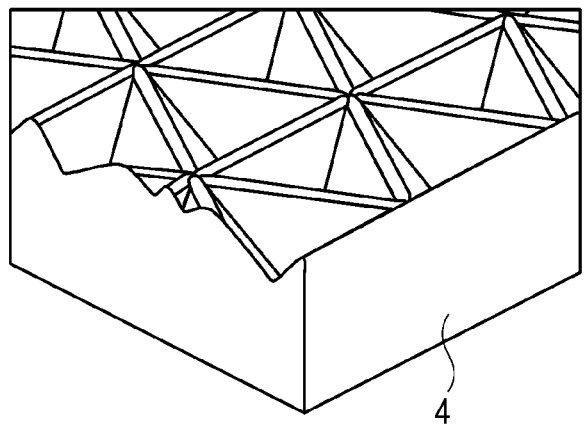
FIG. 10A is a perspective view illustrating part of the first optical layer in which corner cubes having shapes deformed from the ideal shape are formed.
Figure 10B:
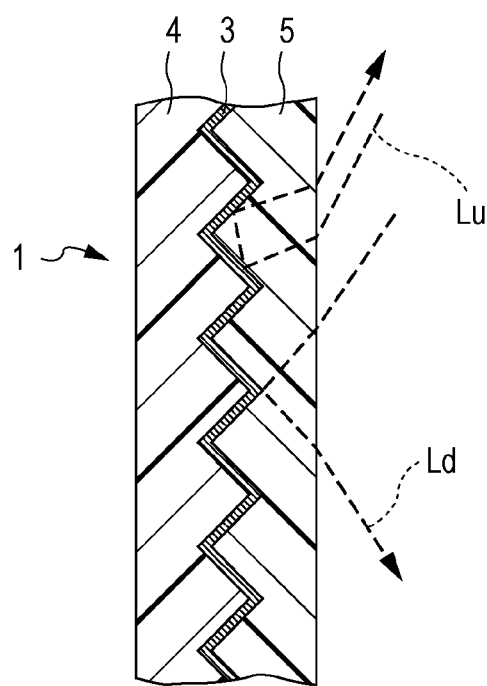
FIG. 10B is a schematic sectional view of the optical body in which the corner cubes having the shapes deformed from the ideal shape are formed in the first optical layer.

FIG. 10A is a perspective view illustrating part of the first optical layer 4 in which corner cubes having shapes deformed from the ideal shape are formed, and FIG. 10B is a schematic sectional view of the optical body 1 in which the corner cubes having the shapes deformed from the ideal shape are formed in the first optical layer 4. When the ridge portions of the corner cubes, which are each to have a substantially triangular shape in design, are deformed from the ideal shape as illustrated in FIG. 10A, the component reflected toward the sky is reduced. More specifically, as illustrated in FIG. 10B, part of the component Lu, which is to be reflected toward the sky when the ridge portions of the corner cubes are not deformed from the ideal shape, is reflected downward by the deformed ridge portions. Thus, the deformation (collapse) of the ridge portions from the ideal shape becomes a factor increasing the proportion of the component Ld not reflected toward the sky. It is, therefore, important to reduce the above-described influence of the deformation of the ridge portions from the ideal shape.

[Method of Affixing Optical Body]

Figure 11A:
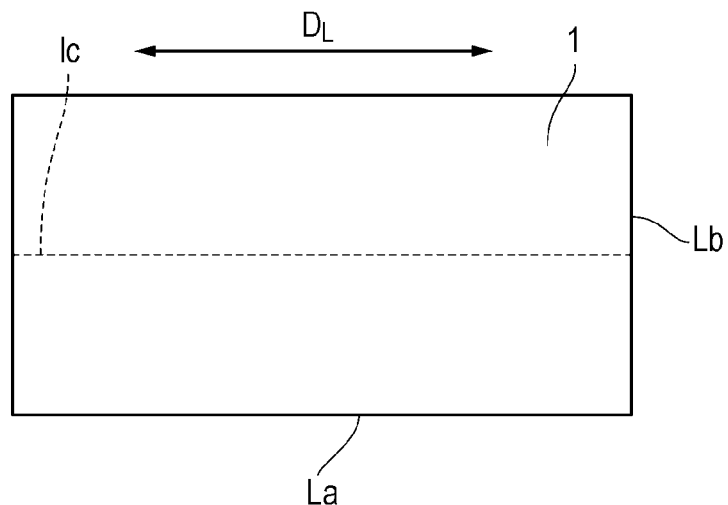
FIGS. 11A and 11B are illustrations to explain one example of a method of affixing the optical body according to the first embodiment.
Figure 11B:
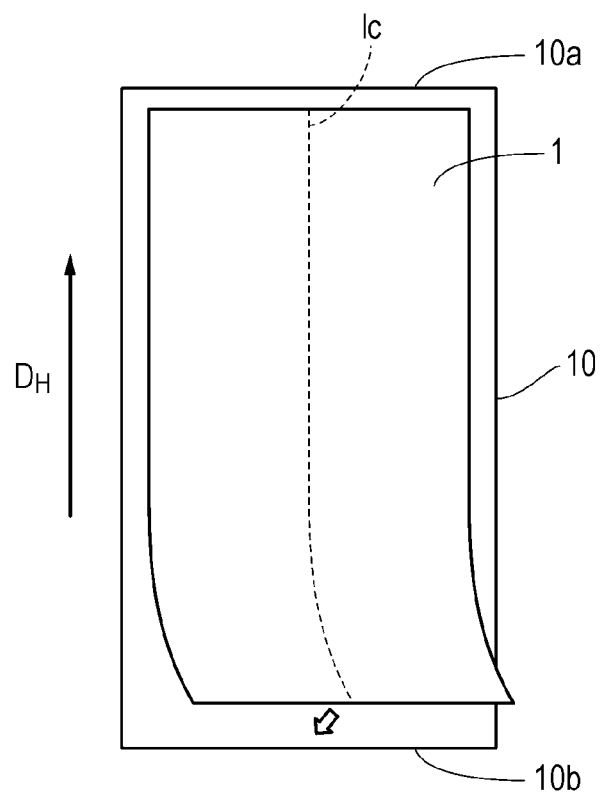

FIGS. 11A and 11B are illustrations to explain one example of a method of affixing the optical body according to the first embodiment. The window member 10 employed in a recent tall structure, such as a high-rise building, generally has a rectangular shape with a vertical size being larger than a horizontal size. Therefore, the following description is made in connection with an example in which the optical body 1 is affixed to the window member 10 having such a rectangular shape.

First, the belt-shaped optical body 1 is let out from the rolled optical body 1 (in the state of the so-called stock roll) and is cut in an appropriate length corresponding to the shape of the window member 10 to which the optical body 1 is to be affixed, thereby obtaining the optical body 1 having a rectangular shape. As illustrated in FIG. 11A, the rectangular optical body 1 has a pair of opposing long sides La and a pair of opposing short sides Lb. The long sides La of the rectangular optical body 1 are substantially parallel to a ridge $l_c$ (see FIG. 5 as well) of the corner cube in the incident surface of the optical body 1. In other words, the lengthwise direction $D_L$ of the rectangular optical body 1 is substantially parallel to the direction of the ridge $l_c$ of the corner cube in the incident surface of the optical body 1.

Next, one short side Lb of the cut optical body 1 is aligned with a short side 10a of the rectangular window member 10, the short side 10a being positioned at an upper end of the window member 10. Next, the rectangular optical body 1 is gradually affixed to the window member 10 in a direction from the upper end toward the lower end thereof with the affixing layer 6 interposed between them. Finally, the other short side Lb of the optical body 1 is aligned with a short side 10b of the rectangular window member 10, the short side 10b being positioned at the lower end of the window member 10. Next, if necessary, the surface of the optical body 1 affixed to the window member 10 is pressed, for example, to purge out bubbles trapped between the window member 10 and the optical body 1. As a result, the rectangular optical body 1 is affixed to the window member 10 in such a state that the ridge $l_c$ of the corner cube in the incident surface of the optical body 1 is substantially parallel to a height direction $D_H$ of a building, e.g., a high-rise building.

[Apparatus for Manufacturing Optical Body]

Figure 12:
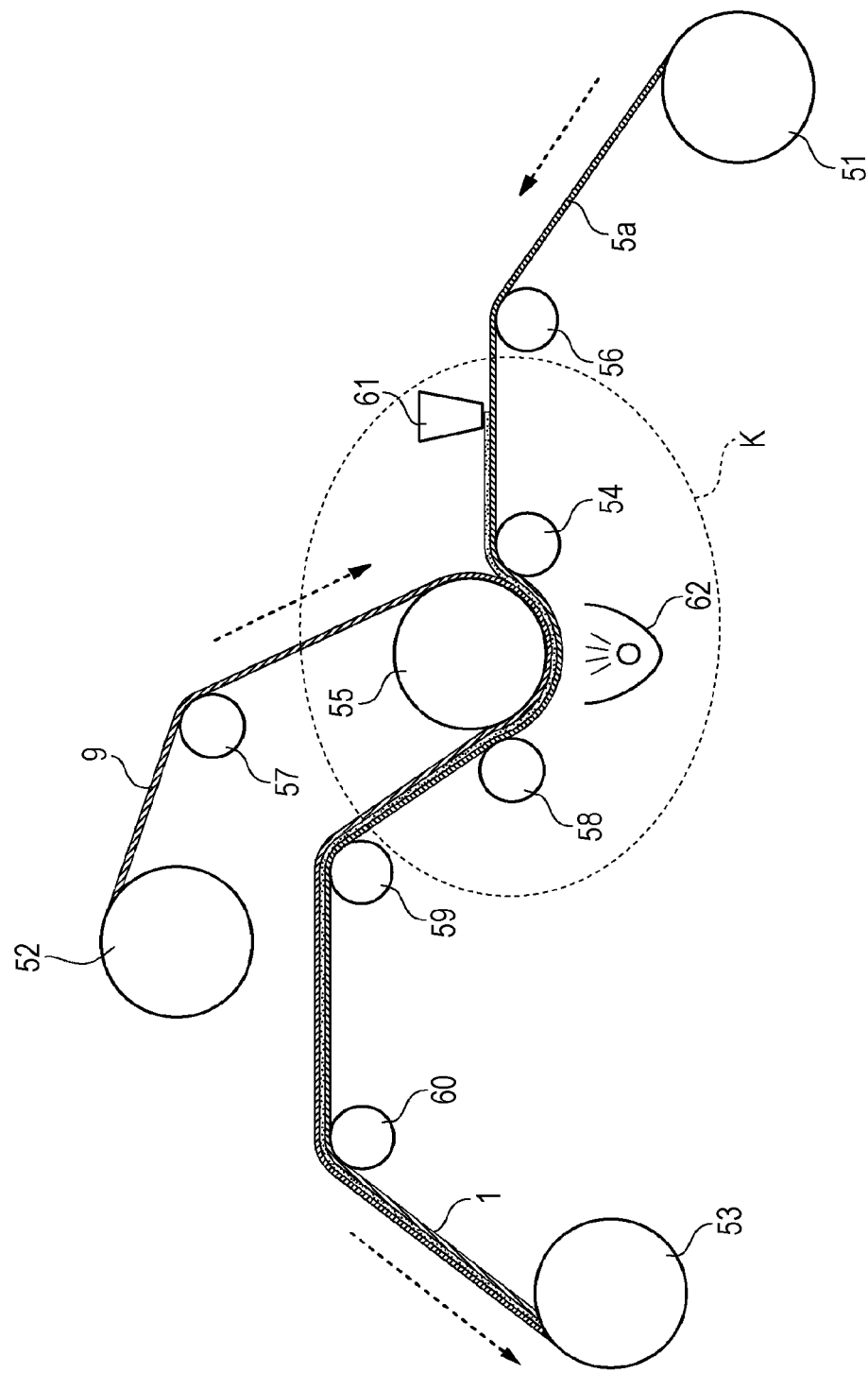
FIG. 12 is a schematic view illustrating one example of configuration of an apparatus for manufacturing the optical body according to the first embodiment.

FIG. 12 is a schematic view illustrating one example of construction of a manufacturing apparatus for manufacturing the optical body according to the first embodiment. As illustrated in FIG. 12, the manufacturing apparatus includes a base element supply roll 51, an optical layer supply roll 52, a take-up roll 53, laminating rolls 54 and 55, guide rolls 56 to 60, a coating device 61, and an irradiation device 62.

The base element supply roll 51 and the optical layer supply roll 52 hold respectively the belt-shaped base element 5a and a belt-shaped optical layer 9, the latter including the reflecting layer affixed thereto, in the form wound around the rolls. The base element 5a and the reflecting-layer affixed optical layer 9 can be continuously let out from the rolls 51 and 52, respectively, with the aid of the guide rolls 56 and 57, etc. Arrows in FIG. 12 represent directions in which the base element 5a and the reflecting-layer affixed optical layer 9 are conveyed. The reflecting-layer affixed optical layer 9 is the first optical layer 4 on which the reflecting layer 3 is formed.

The take-up roll 53 is arranged to be able to take up the belt-shaped optical body 1 fabricated by the illustrated manufacturing apparatus. The guide rolls 56 to 60 are arranged along conveying paths in the manufacturing apparatus such that the belt-shaped reflecting-layer affixed optical layer 9, the belt-shaped base element 5a, and the belt-shaped optical body 1 can be conveyed as intended. Materials of the laminating rolls 54 and 55 and the guide rolls 56 to 60 are not limited to particular ones. A metal such as stainless steel, rubber, silicone, etc. can be optionally used, as appropriate, depending on the desired roll characteristics.

The coating device 61 can be prepared as a device including a coating unit, such as a coater. As the coater, ordinary coaters including a gravure coater, a wire bar, and a die can be optionally used, as appropriate, in consideration of physical properties of the resin composition to be coated, etc. The irradiation device 62 is a device for irradiating the resin composition with an ionizing ray, e.g., an electron ray, an ultraviolet ray, a visible ray, or a gamma ray.

Figure 13:
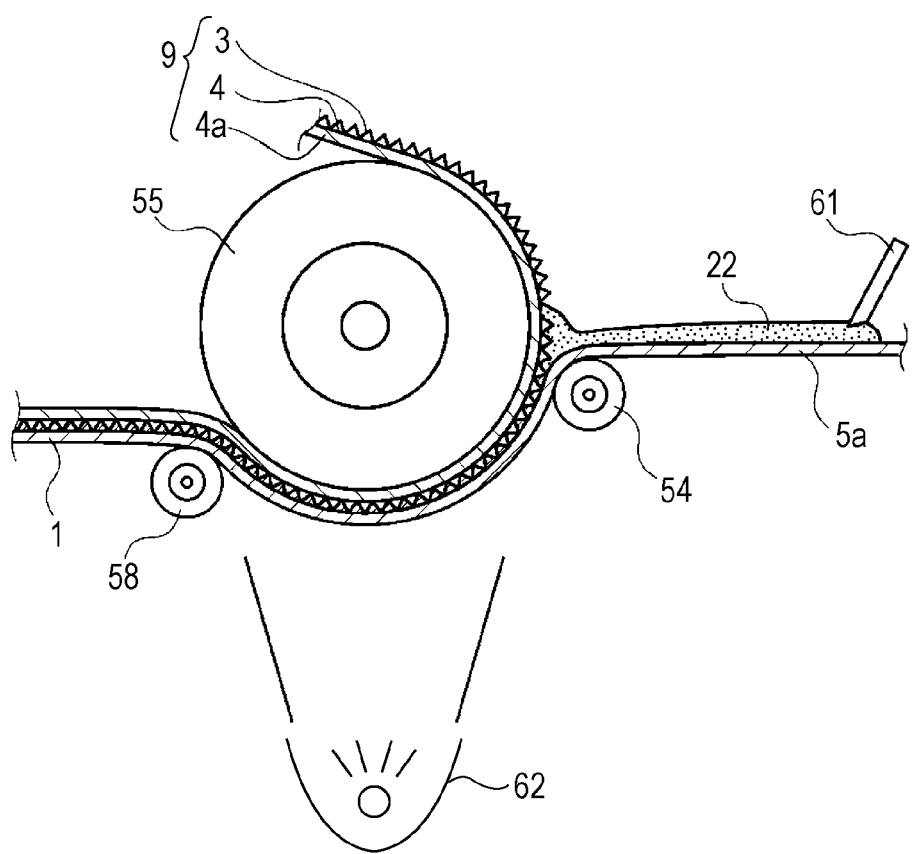
FIG. 13 is an enlarged view of a region K in FIG. 12.

FIG. 13 is an enlarged view of a region K in FIG. 12. The laminating rolls 54 and 55 are arranged to be able to feed the reflecting-layer affixed optical layer 9 and the second base element 5a in a nipped state. Herein, the reflecting-layer affixed optical layer 9 corresponds to the first optical layer 4 including the reflecting layer 3 formed on one principal surface thereof. The reflecting-layer affixed optical layer 9 may further include the first base element 4a formed on the other principal surface of the first optical layer 4 on the side oppositely away from the one principal surface of the first optical layer 4 on which the reflecting layer 3 is formed. In the illustrated example, the reflecting layer 3 is formed on the one principal surface of the first optical layer 4, and the first base element 4a is formed on the other principal surface of the first optical layer 4.

[Method of Manufacturing Optical Body]

One example of a method of manufacturing the optical body according to the first embodiment will be described below with reference to FIGS. 12 and 14 to 16. Note that, in consideration of productivity, part or the whole of a manufacturing process described below is preferably performed in a roll-to-roll manner except for a step of fabricating a mold or a die.

Figure 14A:
FIGS. 14A to 14C illustrate successive steps to explain one example of a method of manufacturing the optical body according to the first embodiment.
Figure 14B:
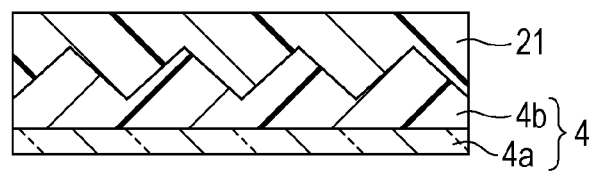
Figure 14C:
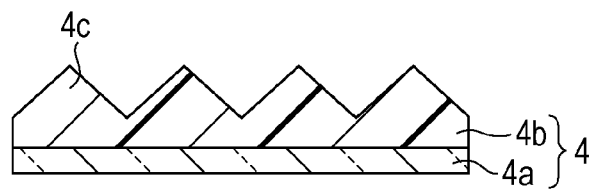

First, as illustrated in FIG. 14A, a mold or a die having the same concave-convex shape as that of the structures 4c, or a mold or a die (replica) 21 having a shape reversed to the concave-convex shape of the former mold (die) is formed by, e.g., bite machining or laser machining. Next, as illustrated in FIG. 14B, the concave-convex shape of the mold (die) 21 is transferred to a resin material in the form of a film by utilizing, e.g., a fusion extrusion process or a transfer process. The transfer process can be practiced, for example, by a method of pouring an energy-ray curable resin into a mold and irradiating the poured resin with an energy ray to cure the resin, by a method of applying heat and/or pressure to a resin for transferring the desired shape to the resin, or by a method (laminate transfer process) of supplying a resin film from a roll and transferring the shape of a die to the resin film under application of heat. Through the above-described steps, as illustrated in FIG. 14C, the first optical layer 4 having the structures 4c on one principal surface thereof is formed. Preferably, the resin further contains a cross-linking agent. The reason is that the cross-linking agent can make the resin resistant against heat without greatly changing the storage modulus at the room temperature.

Figure 15A:
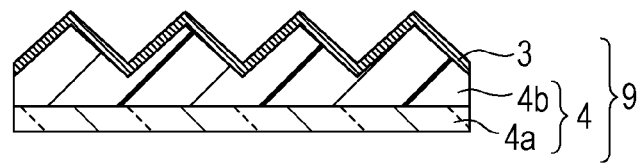
FIGS. 15A to 15C illustrate successive steps to explain the one example of the method of manufacturing the optical body according to the first embodiment.
Figure 15B:
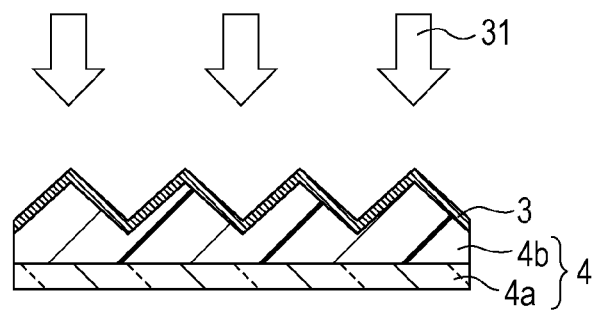

Next, as illustrated in FIG. 15A, the reflecting layer 3 is formed on the one principal surface of the first optical layer 4. The reflecting layer 3 can be formed, for example, by sputtering, evaporation coating, CVD (chemical vapor deposition), dip coating, die coating, wet coating, or spray coating. Preferably, one of those film forming processes is selected, as appropriate, depending on the shape of the structure 4c, etc. Next, as illustrated in FIG. 15B, an annealing process, denoted by 31, is carried out on the reflecting layer 3 if necessary. A temperature of the annealing process is, for example, in the range of 100° C. or higher to 250° C. or lower.

Figure 15C:
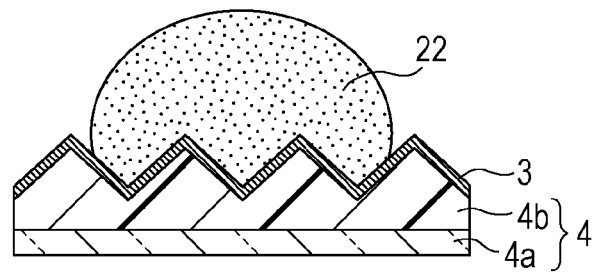
Figure 16A:
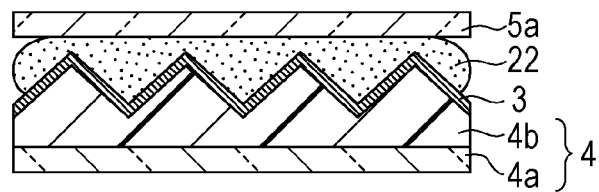
FIGS. 16A to 16C illustrate successive steps to explain the one example of the method of manufacturing the optical body according to the first embodiment.
Figure 16B:
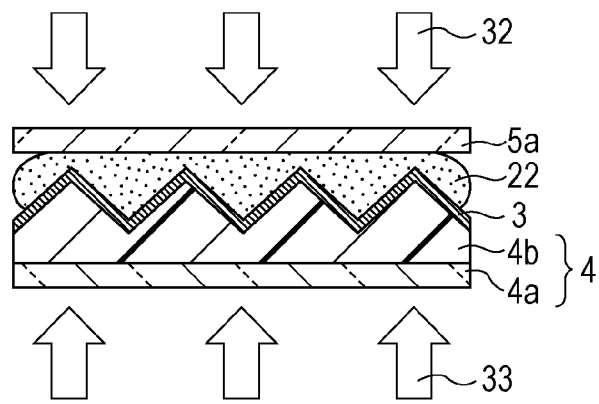
Figure 16C:
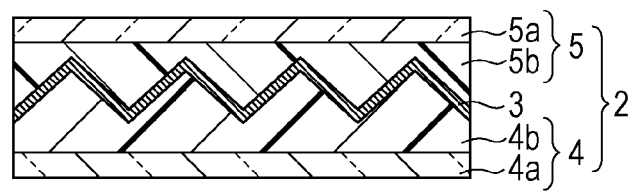

Next, as illustrated in FIG. 15C, a resin 22 in a state not yet cured is coated on the reflecting layer 3. For example, an energy-ray curable resin or a thermosetting resin can be used as the resin 22. The energy-ray curable resin is preferably an ultraviolet curable resin. Next, as illustrated in FIG. 16A, a laminate is formed by coating the second base element 5a on the resin 22. Next, as illustrated in FIG. 16B, the resin 22 is cured, for example, by irradiation with an energy ray or by heating, as denoted by 32. At that time, pressure is applied, as denoted by 33, to the laminate. The energy ray can be, e.g., an electron ray, an ultraviolet ray, a visible ray, or a gamma ray. From the viewpoint of production equipment, the ultraviolet ray is preferably used. Preferably, an integrated irradiation amount is selected, as appropriate, in consideration of the curing characteristic of the resin, suppression of yellowing of the resin and the second base element 5a, etc. The pressure applied to the laminate is preferably in the range of 0.01 MPa or higher to 1 MPa or lower. If the applied pressure is lower than 0.01 MPa, a problem may occur in traveling of the film. On the other hand, if the applied pressure exceeds 1 MPa, a metal roll is to be used as the nip roll, and the applied pressure is more apt to fluctuate. Through the above-described steps, as illustrated in FIG. 16C, the second optical layer 5 is formed on the reflecting layer 3 and the optical body 1 is obtained.

A method of forming the second optical layer 5 by using the manufacturing apparatus, illustrated in FIG. 12, will be described in more detail below. First, the (second) base element 5a is let out from the base element supply roll 51, and the let-out base element 5a is guided to pass under the coating device 61 through the guide roll 56. Next, an ionizing-ray curable resin is coated by the coating device 61 on the base element 5a passing under the coating device 61. Next, the base element 5a coated with the ionizing-ray curable resin is conveyed toward the laminating rolls 54 and 55. On the other hand, the reflecting-layer affixed optical layer 9 is let out from the optical layer supply roll 52 and is conveyed toward the laminating rolls 54 and 55 through the guide roll 57.

Next, the base element 5a and the reflecting-layer affixed optical layer 9, each having been conveyed in such a way, are sandwiched between the laminating rolls 54 and 55 without allowing bubbles to enter between the base element 5a and the reflecting-layer affixed optical layer 9, whereby the reflecting-layer affixed optical layer 9 is laminated on the base element 5a. Next, the base element 5a including the laminated reflecting-layer affixed optical layer 9 is conveyed along an outer circumferential surface of the laminating roll 55 while the irradiation device 62 irradiates the ionizing-ray curable resin with the ionizing ray from the side including the base element 5a, thereby curing the ionizing-ray curable resin. As a result, the base element 5a and the reflecting-layer affixed optical layer 9 are affixed to each other with the ionizing-ray curable resin interposed therebetween, and the objective long optical body 1 is fabricated. Next, the fabricated belt-shaped optical body 1 is conveyed to the take-up roll 53 through the guide rolls 58, 59 and 60 such that the optical body 1 is taken up by the take-up roll 53. Eventually, a stock roll in the rolled form of the belt-shaped optical body 1 is obtained.

Given that the process temperature in the above-described method of forming the second optical layer 5 is t° C., the first optical layer 4 (specifically the first resin layer 4b) in the cured state preferably has the storage modulus of $3 \times 10^7$ Pa or more at $(t-20)$° C. Herein, the process temperature t is, for example, the heating temperature of the laminating roll 55. The first optical layer 4 is conveyed, for example, in such a state that the first optical layer 4 (specifically the first resin layer 4b) is formed on the first base element 4a and is conveyed along the laminating roll 55 with the first base element 4a interposed therebetween. It is, therefore, empirically confirmed that the actual temperature of the first optical layer 4 is about $(t-20)$° C. Accordingly, by setting the storage modulus of the first optical layer 4 to be $3 \times 10^7$ Pa or more at $(t-20)$° C., the concave-convex shape of the interface inside the optical layer can be prevented from deforming due to application of heat or heat and pressure.

Further, the first optical layer 4 preferably has the storage modulus of $3 \times 10^9$ Pa or less at 25° C. With such a property, the optical body 1 can be given with flexibility at the room temperature, and the optical body 1 can be fabricated, for example, by using the roll-to-roll manufacturing process.

In consideration of the heat resistance of the resin used as the optical layer or the base element, the process temperature t is preferably 200° C. or lower. However, when a resin having higher heat resistance is used, the process temperature t can be set to 200° C. or higher.

[Structure of Roll-Shaped Master]

Figure 17A:
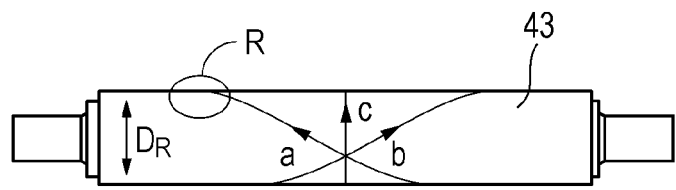
FIG. 17A is a perspective view illustrating an overall appearance of a roll-shaped master.
Figure 17B:
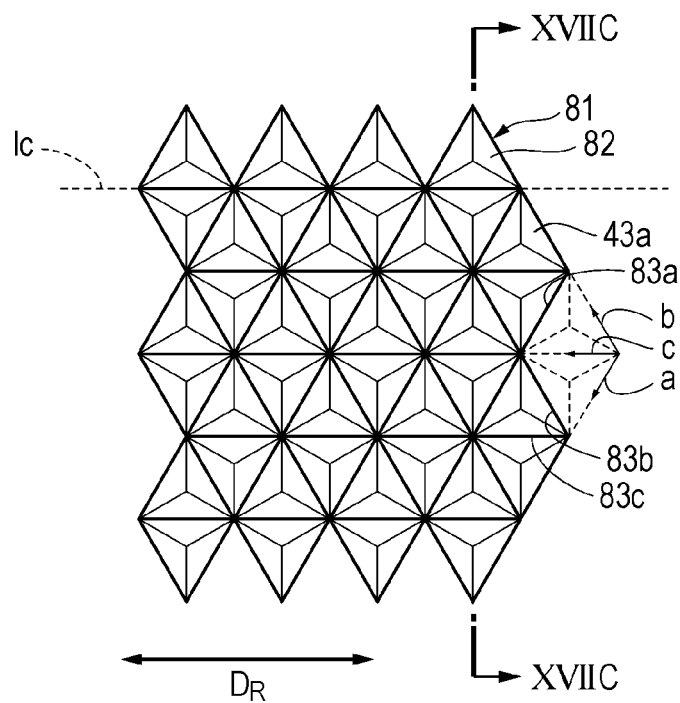
FIG. 17B is an enlarged plan view illustrating, in an enlarged scale, a region R in FIG. 17A.
Figure 17C:
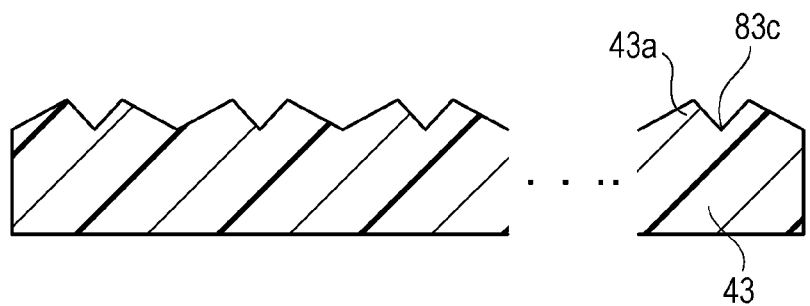
FIG. 17C is a sectional view taken along line XVIIC-XVIIC in FIG. 17B.

FIG. 17A is a perspective view illustrating an overall appearance of a roll-shaped master 43, FIG. 7B is an enlarged plan view illustrating, in an enlarged scale, a region R illustrated in FIG. 17A, and FIG. 17C is a sectional view taken along line XVIIC-XVIIC in FIG. 7B. The roll-shaped master 43 has a cylindrical surface that is formed as a concave-convex surface. The concave-convex surface of the first optical layer 4 is formed by transferring the concave-convex surface of the roll-shaped master 43 to, e.g., a film. The concave-convex surface of the roll-shaped master 43 is formed by arraying a large number of structures 43a each having a convex corner-cube shape. The convex shape of the structure 43a of the roll-shaped master 43 is equivalent to that obtained by reversing the concave shape of the structure 4c of the first optical layer 4.

The convex structure 43a is a structure having a corner cube shape defined by a triangular bottom surface 81 and three sloped surfaces 82 each having a triangular shape.

Grooves 83a, 83b and 83c are formed by the sloped surfaces of the adjacent structures 43a. The grooves 83a, 83b and 83c are formed to extend in three directions (hereinafter referred to also as "groove directions") a, b and c in the cylindrical surface of the roll-shaped master 43. One groove direction c of the three groove directions a, b and c is substantially parallel to a radial direction $D_R$ of the roll-shaped master 43. By forming the concave-convex surface of the first optical layer 4 by using the roll-shaped master 43, it is possible to form the ridge 73c extending in a direction substantially parallel to the lengthwise direction $D_L$ of the belt-shaped optical body 1, as illustrated in FIG. 5.

The optical body according to the embodiment can be obtained as described above. Factors causing the deformation of the structure tip portion from the ideal shape are, for example, as follows;

rounding of the structure tip portion caused with wear of the bite during the fabrication of the mold (die), imperfect transfer when the concave-convex shape of the mold (die) is transferred to a film-like resin material, and winding contraction caused when the optical body is wound around the roller.

In practice, it is difficult to avoid the occurrence of the deformation of the structure tip portion from the ideal shape and to prevent an increase of the deformation of the structure tip portion from the ideal shape, which deformation is caused by the above-mentioned problems specific to the manufacturing process.

EXAMPLES

Even when the structure tip portion is deformed from the ideal shape as described above, a reduction of the upward reflectance with respect to the incident light can be suppressed by embedding the reflecting layer with a resin and by properly controlling the refractive index of the embedding resin. The present embodiments will be described in more detail below in connection with TEST EXAMPLES, but the embodiments are not limited to the following TEST EXAMPLES.

Test Example 1

Figure 18A:
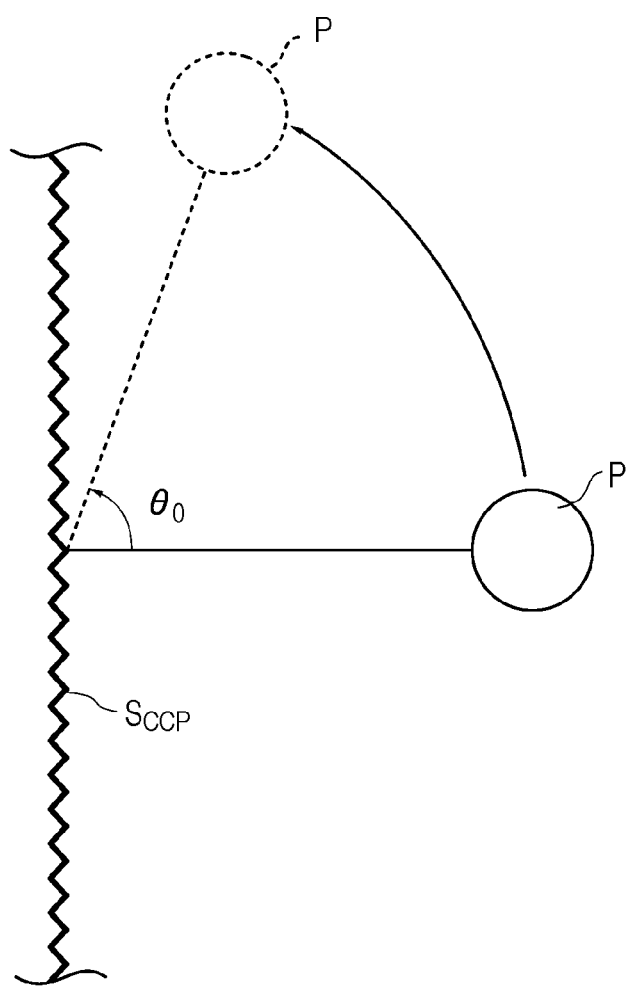
FIGS. 18A and 18B are illustrations to explain simulation conditions in TEST EXAMPLE 1.
Figure 18B:
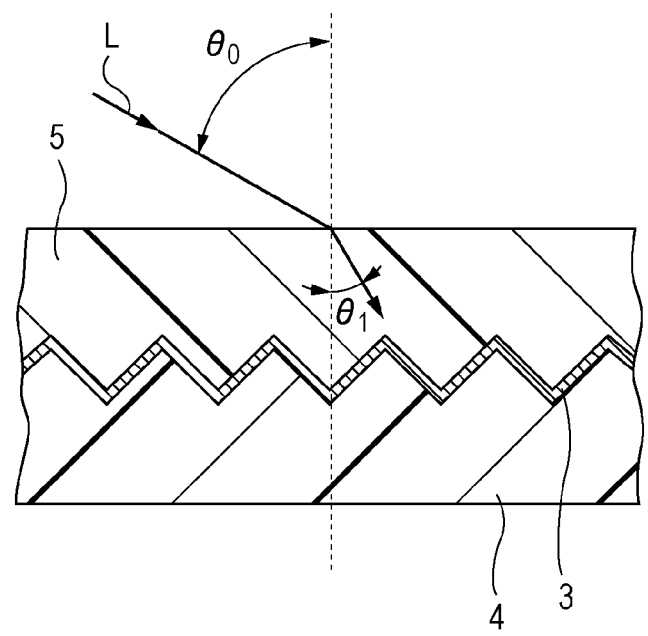

FIGS. 18A and 18B are illustrations to explain simulation conditions in TEST EXAMPLE 1.

The following simulation was performed to measure the upward reflectance by using the illumination design analysis software Light Tools made by ORA (Optical Research Associates).

First, a directional reflecting surface $S_{CCP}$ including a corner cube pattern formed in the close-packed state was set.

Setting conditions of the directional reflecting surface $S_{CCP}$ were as follows:

Pitch of corner cubes: 100 μm

Apex angle of corner cube: 90°

Next, an imaginary sunlight source (color temperature of 6500K) was set as a light source P, and light was illuminated to be incident on the directional reflecting surface $S_{CCP}$ from a direction of the incident angle $(\theta_0, \phi)=(0°, 0°)$. The angle $\theta_0$ was gradually increased in units of 10° within the range of the incident angle $(\theta_0, \phi)=(0°, 0°)$ to $(70°, 0°)$.

The upward reflectance is defined by the following formula (7);

upward reflectance $Ru$=[(total power of light reflected in upward direction)/(total power of incident light)]×100 (7)

where power of incident light=(power of light reflected in upward direction)+(power of light reflected in downward direction), upward direction: reflection angle $(\theta, \phi)=(\theta, 270°)$ to $(\theta, 90°)$, downward direction: reflection angle $(\theta, \phi)=(\theta, 90°)$ to $(\theta, 270°)$, directions of $\phi=90°$ and 270° being included in the upward direction, and incident angle $\theta_0$: $0° \leq \theta_0 \leq 90°$.

Figure 19A:
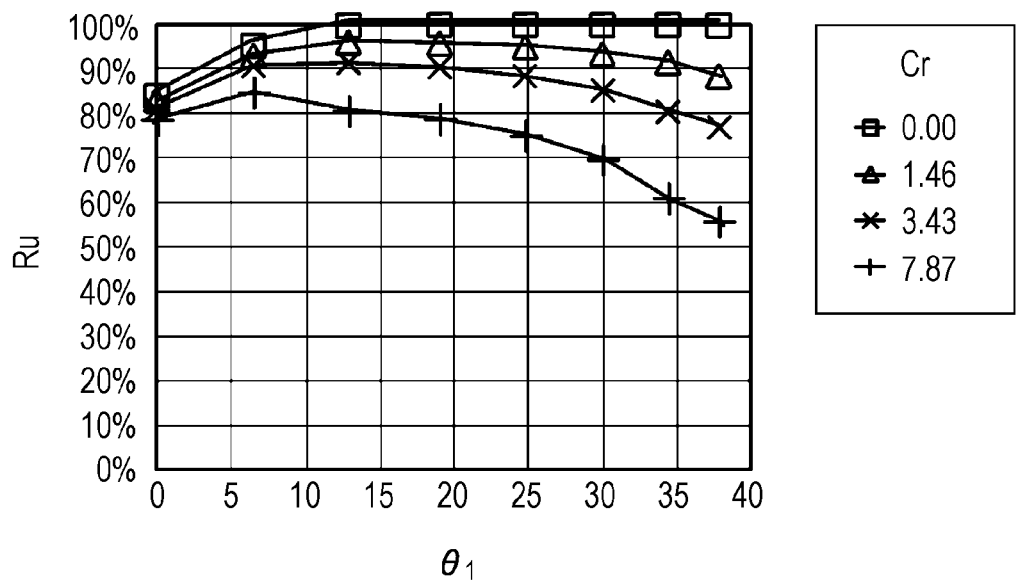
FIG. 19A is a graph plotting upward reflectance obtained with the simulation in TEST EXAMPLE 1.

FIG. 19A is a graph plotting the upward reflectance obtained with the above-described simulation. FIG. 19A represents the upward reflectance Ru when the reflecting layer is not embedded with the resin and when a deformation (collapse) Cr of the structure tip portion in the directional reflecting surface $S_{CCP}$ from the ideal shape is set to 0, 1.46, 3.43, and 7.87 (μm). The horizontal axis indicates a refraction angle $\theta_1$ of light on the premise that the reflecting layer is embedded with the resin. Note that, in this TEST EXAMPLE, because the reflecting layer is not embedded with the resin, the upward reflectance Ru corresponds to the case of Fresnel reflectance Γ=0.

Test Example 2

The upward reflectance was measured in the same manner as in TEST EXAMPLE 1 except that the reflecting layer was embedded with a resin having the refractive index $n_1$=1.53.

Figure 19B:
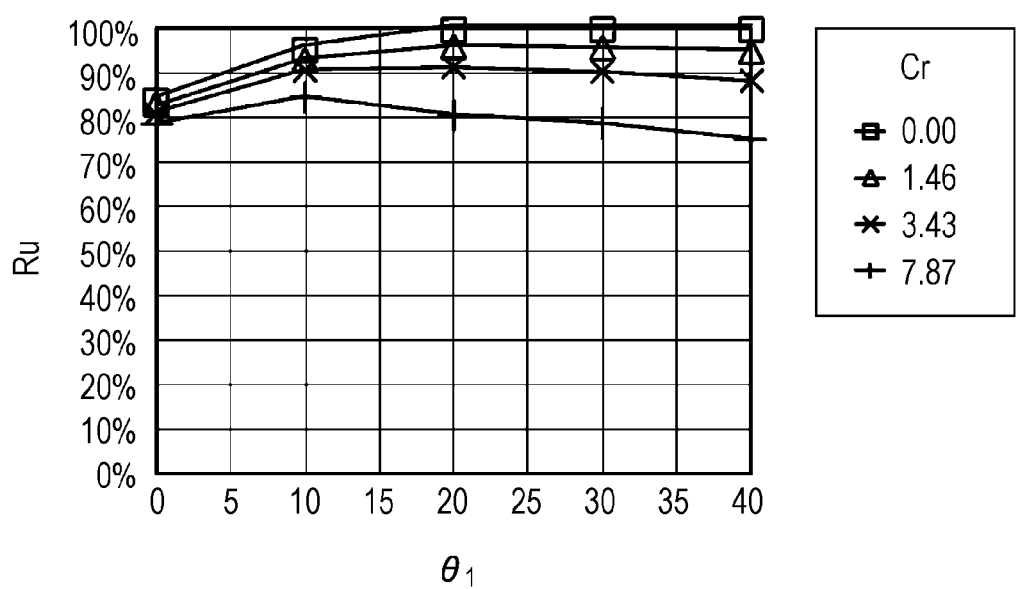
FIG. 19B is a graph plotting upward reflectance obtained with the simulation in TEST EXAMPLE 2.

FIG. 19B is a graph plotting the upward reflectance obtained with the above-described simulation. FIG. 19B represents the upward reflectance Ru when the deformation Cr of the structure tip portion in the directional reflecting surface $S_{CCP}$ from the ideal shape is set to 0, 1.46, 3.43, and 7.87 (μm). The horizontal axis indicates the refraction angle $\theta_1$, and the vertical axis indicates the upward reflectance.

As seen from FIGS. 19A and 19B, when the reflecting layer is embedded with the resin, a reduction of the upward reflectance with respect to an increase of the deformation Cr from the ideal shape is suppressed in comparison with the case where the reflecting layer is not embedded with the resin. In other words, embedding the reflecting layer formed on the structures with the resin is effective in suppressing the reduction of the upward reflectance, which is caused by the deformation of the structure tip portion from the ideal shape.

As discussed above in connection with the refractive index of the second optical layer 5 (specifically the second resin layer 5b), the refractive index of the resin embedding the reflecting layer 3, i.e., the refractive index $n_1$ of the second optical layer 5, affects the magnitude of the downward reflected component that reduces the directional reflection performance of the optical body 1. Hence, the reduction of the upward reflectance can be prevented by adjusting the refractive index $n_1$ of the second optical layer 5.

Test Example 3

Samples 1 to 9 were prepared to examine the influence upon the upward reflectance Ru when the deformation Cr from the ideal shape and the refractive index $n_1$ of the embedding resin were changed.

The following simulation was performed to measure the upward reflectance Ru by using the illumination design analysis software Light Tools made by ORA (Optical Research Associates).

First, a directional reflecting surface $S_{CCP}$ including a corner cube pattern formed in the close-packed state was set.

Setting conditions of the directional reflecting surface $S_{CCP}$ were as follows:

Pitch of corner cubes: 100 μm

Apex angle of corner cube: 90°

The refractive index $n_1$ was determined for each of various values of the refraction angle $\theta_1$ based on the above-mentioned formula (5) on condition that the incident angle of the incident light on the optical body was set to $\theta_0=60°$.

Table 1 lists the results of measuring the directional reflectance Re by carrying out the simulation for each of various values of $n_1$ and Cr. Note that, for the case of $\theta_1=35°$, the results were each obtained by calculating an arithmetic mean of the values Re measured for the cases of $\theta_1=35°$ and 40°.

TABLE 1

|  | $\theta_1$ [°] | $n_1$ | Cr [μm] | | | | | | | | |
| --- | --- | --- | --- | --- | --- | --- | --- | --- | --- | --- | --- |
|  |  |  | 0.00 | 1.00 | 1.46 | 3.43 | 5.00 | 6.50 | 7.87 | 10.0 | 15.0 |
| Sample 1 | 70 | 0.92 | 100% | 91% | 88% | 77% | 65% | 57% | 56% | 45% | 24% |
| Sample 2 | 60 | 1.00 | 100% | 94% | 91% | 80% | 74% | 66% | 61% | 56% | 36% |
| Sample 3 | 50 | 1.13 | 100% | 96% | 93% | 85% | 81% | 74% | 69% | 65% | 47% |
| Sample 4 | 40 | 1.35 | 100% | 97% | 95% | 88% | 85% | 79% | 75% | 71% | 56% |
| Sample 5 | 35 | 1.51 | 100% | 97% | 95% | 89% | 86% | 80% | 77% | 73% | 64% |
| Sample 6 | 30 | 1.73 | 100% | 97% | 96% | 90% | 87% | 82% | 79% | 75% | 66% |
| Sample 7 | 20 | 2.53 | 100% | 98% | 96% | 91% | 89% | 84% | 80% | 78% | 67% |
| Sample 8 | 10 | 4.99 | 95% | 94% | 93% | 91% | 89% | 86% | 85% | 76% | 68% |
| Sample 9 | 0 | ∞ | 84% | 83% | 83% | 81% | 81% | 79% | 78% | 72% | 67% |

The above-listed results were obtained not taking into consideration the influence of reflection at the air/resin interface. In order to take into consideration the influence of the reflection at the air/resin interface, $\Gamma$ was determined from the formulae (1) and (2) for each of various values of $\theta_1$ and $n_1$. Further, $(1-\Gamma)$ was determined from $\Gamma$. The calculated results are listed in Table 2.

TABLE 2

|  | $\theta_1$ [°] | $n_1$ | $\Gamma s$ | $\Gamma p$ | $\Gamma$ | $1-\Gamma$ |
| --- | --- | --- | --- | --- | --- | --- |
| Sample 1 | 70 | 0.92 | 0.0514 | 0.0219 | 0.0366 | 0.9634 |
| Sample 2 | 60 | 1.00 | 0 | 0 | 0 | 1 |
| Sample 3 | 50 | 1.13 | 0.0341 | 0.0041 | 0.0191 | 0.9809 |
| Sample 4 | 40 | 1.35 | 0.1206 | 0.0041 | 0.0624 | 0.9376 |
| Sample 5 | 35 | 1.51 | 0.18 | 0.0017 | 0.0908 | 0.9092 |
| Sample 6 | 30 | 1.73 | 0.25 | 0 | 0.125 | 0.875 |
| Sample 7 | 20 | 2.53 | 0.426 | 0.0219 | 0.224 | 0.776 |
| Sample 8 | 10 | 4.99 | 0.6646 | 0.1882 | 0.4264 | 0.5736 |
| Sample 9 | 0 | ∞ |  |  |  |  |

Further, based on the results of Tables 1 and 2, $Re \times (1-\Gamma)$ was calculated as the upward reflectance Ru, taking into consideration the influence of the reflection at the air/resin interface. The calculated results are given in Table 3 and FIG. 20. For example, Ru=83% at $(n_1, Cr)=(1.35, 3.43)$ in Table 3 represents a value obtained by multiplying a value of R at $(n_1, Cr)=(1.35, 3.43)$ in Table 1, i.e., 88%, by a value of $(1-\Gamma)$ at $n_1=1.35$ in Table 2, i.e., 0.9376.

TABLE 3

|  | $\theta_1$ [°] | $n_1$ | Cr [μm] | | | | | | | | |
| --- | --- | --- | --- | --- | --- | --- | --- | --- | --- | --- | --- |
|  |  |  | 0.00 | 1.00 | 1.46 | 3.43 | 5.00 | 6.50 | 7.87 | 10.0 | 15.0 |
| Sample 1 | 70 | 0.92 | 96% | 88% | 85% | 74% | 63% | 55% | 54% | 44% | 24% |
| Sample 2 | 60 | 1.00 | 100% | 94% | 91% | 80% | 74% | 66% | 61% | 56% | 36% |
| Sample 3 | 50 | 1.13 | 98% | 94% | 91% | 84% | 80% | 72% | 68% | 63% | 46% |

TABLE 3-continued

| | | | | | | Cr [μm] | | | | |
|---|---|---|---|---|---|---|---|---|---|---|
| | θ₁ [°] | n₁ | 0.00 | 1.00 | 1.46 | 3.43 | 5.00 | 6.50 | 7.87 | 10.0 | 15.0 |
| Sample 4 | 40 | 1.35 | 94% | 91% | 89% | 83% | 79% | 74% | 70% | 66% | 52% |
| Sample 5 | 35 | 1.51 | 91% | 88% | 87% | 81% | 78% | 73% | 70% | 66% | 58% |
| Sample 6 | 30 | 1.73 | 88% | 85% | 84% | 79% | 76% | 72% | 69% | 66% | 57% |
| Sample 7 | 20 | 2.53 | 77% | 76% | 74% | 71% | 69% | 65% | 62% | 60% | 52% |
| Sample 8 | 10 | 4.99 | 55% | 54% | 53% | 52% | 51% | 50% | 48% | 43% | 39% |
| Sample 9 | 0 | ∞ | | | | | | | | | |

(Evaluation of Optical Body)

The upward reflectance Ru of the optical body is preferably 70% or more. Further, from experiences of the inventors, it is confirmed that the deformation Cr from the ideal shape, which is attributable to the manufacturing process, is about 6.5 μm at maximum. On those conditions, the refractive index of the resin embedding the reflecting layer is preferably 1.1 or more and 1.9 or less. In that case, the deformation Cr from the ideal shape is 6.5% of the pitch P of the corner cube.

If the deformation Cr from the ideal shape exceeds 10% of the array pitch, degradation in the performance of the optical body becomes significant. Looking at the range in FIG. 20 where Cr is 10.0 or less, changes in value of Ru are small and the Ru value can be held at 65% or more when $n_1$ is in the range of 1.4 or more to 1.6 or less.

Figure 21:
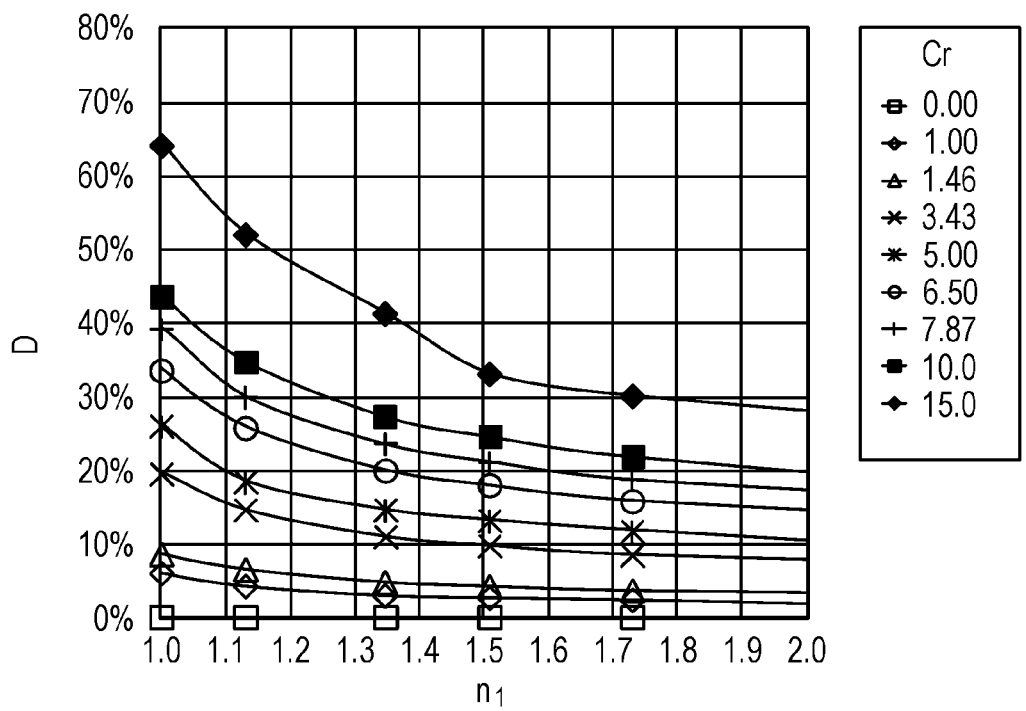
FIG. 21 is a graph plotting a loss D for each sample when the upward reflectance at Cr=0.00 is regarded as a reference.

Table 4 and FIG. 21 indicate values of the loss D for each sample when the upward reflectance at Cr=0.00 is regarded as a reference. For example, D=11% at ($n_1$, Cr)=(1.35, 3.43) in Table 4 represents a value obtained by subtracting Ru=83% at ($n_1$, Cr)=(1.35, 3.43) in Table 3 from Ru=94% at ($n_1$, Cr)=(1.35, 0.00) therein.

TABLE 4

| | | | | | | Cr [μm] | | | | |
|---|---|---|---|---|---|---|---|---|---|---|
| | θ₁ [°] | n₁ | 0.00 | 1.00 | 1.46 | 3.43 | 5.00 | 6.50 | 7.87 | 10.0 | 15.0 |
| Sample 1 | 70 | 0.92 | 0% | 8% | 11% | 22% | 33% | 42% | 43% | 52% | 73% |
| Sample 2 | 60 | 1.00 | 0% | 6% | 9% | 20% | 26% | 34% | 39% | 44% | 64% |
| Sample 3 | 50 | 1.13 | 0% | 4% | 7% | 14% | 18% | 26% | 30% | 35% | 52% |
| Sample 4 | 40 | 1.35 | 0% | 3% | 5% | 11% | 14% | 20% | 24% | 27% | 41% |
| Sample 5 | 35 | 1.51 | 0% | 3% | 4% | 10% | 13% | 18% | 21% | 25% | 33% |
| Sample 6 | 30 | 1.73 | 0% | 2% | 4% | 8% | 12% | 16% | 19% | 22% | 30% |
| Sample 7 | 20 | 2.53 | 0% | 1% | 3% | 7% | 8% | 13% | 15% | 17% | 25% |
| Sample 8 | 10 | 4.99 | 0% | 1% | 1% | 3% | 3% | 5% | 6% | 11% | 15% |
| Sample 9 | 0 | ∞ | | | | | | | | | |

Figure 22:
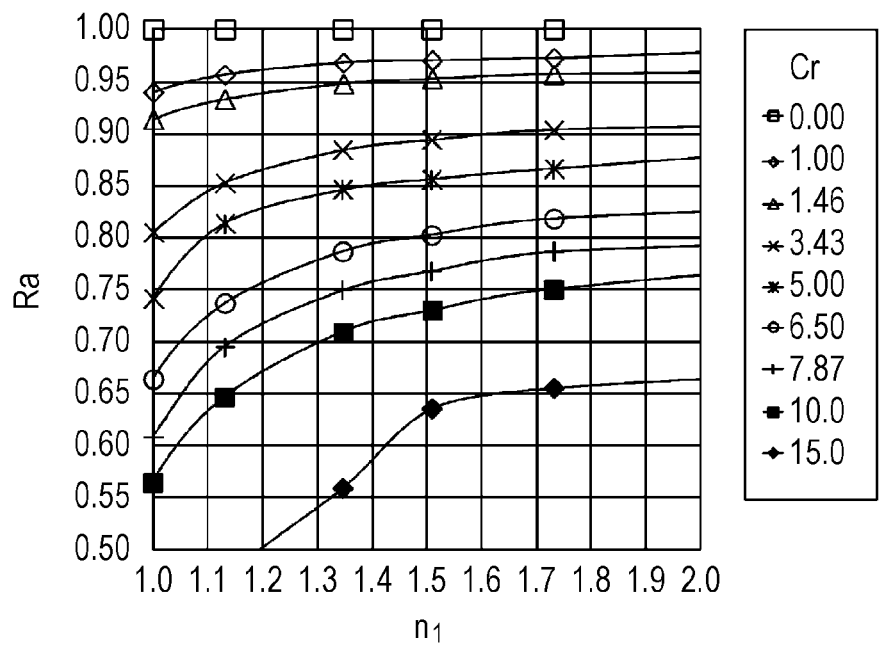
FIG. 22 is a graph plotting a ratio Ra for each sample when the upward reflectance at Cr=0.00 is regarded as a reference.

Table 5 and FIG. 22 indicate values of an upward reflectance ratio Ra for each sample when the upward reflectance at Cr=0.00 is regarded as a reference. For example, Ra=88% at ($n_1$, Cr)=(1.35, 3.43) in Table 5 represents a value obtained by dividing Ru=83% at ($n_1$, Cr)=(1.35, 3.43) in Table 3 by Ru=94% at ($n_1$, Cr)=(1.35, 0.00) therein.

TABLE 5

| | | | | | | Cr [μm] | | | | |
|---|---|---|---|---|---|---|---|---|---|---|
| | θ₁ [°] | n₁ | 0.00 | 1.00 | 1.46 | 3.43 | 5.00 | 6.50 | 7.87 | 10.0 | 15.0 |
| Sample 1 | 70 | 0.92 | 100% | 91% | 88% | 77% | 65% | 57% | 56% | 45% | 24% |
| Sample 2 | 60 | 1.00 | 100% | 94% | 91% | 80% | 74% | 66% | 61% | 56% | 36% |

TABLE 5-continued

| | | | | | | Cr [μm] | | | | |
|---|---|---|---|---|---|---|---|---|---|---|
| | $\theta_1$ [°] | $n_1$ | 0.00 | 1.00 | 1.46 | 3.43 | 5.00 | 6.50 | 7.87 | 10.0 | 15.0 |
| Sample 3 | 50 | 1.13 | 100% | 96% | 93% | 85% | 81% | 74% | 69% | 65% | 47% |
| Sample 4 | 40 | 1.35 | 100% | 97% | 95% | 88% | 85% | 79% | 75% | 71% | 56% |
| Sample 5 | 35 | 1.51 | 100% | 97% | 95% | 89% | 86% | 80% | 77% | 73% | 64% |
| Sample 6 | 30 | 1.73 | 100% | 97% | 96% | 90% | 87% | 82% | 79% | 75% | 66% |
| Sample 7 | 20 | 2.53 | 100% | 98% | 96% | 91% | 89% | 84% | 81% | 78% | 68% |
| Sample 8 | 10 | 4.99 | 100% | 99% | 98% | 95% | 94% | 91% | 89% | 80% | 72% |
| Sample 9 | 0 | ∞ | | | | | | | | | |

In FIG. 21, a smaller value of D indicates that the optical body has higher performance. Looking at the range where Cr is 10.0 or less, the D value can be held at 25% or less when $n_1$ is in the range of 1.49 or more. In FIG. 22, a larger value of Ra indicates that the optical body has higher performance. Looking at the range where Cr is 10.0 or less, the Ra value can be held at 70% or more when $n_1$ is in the range of 1.49 or more.

Figure 20:
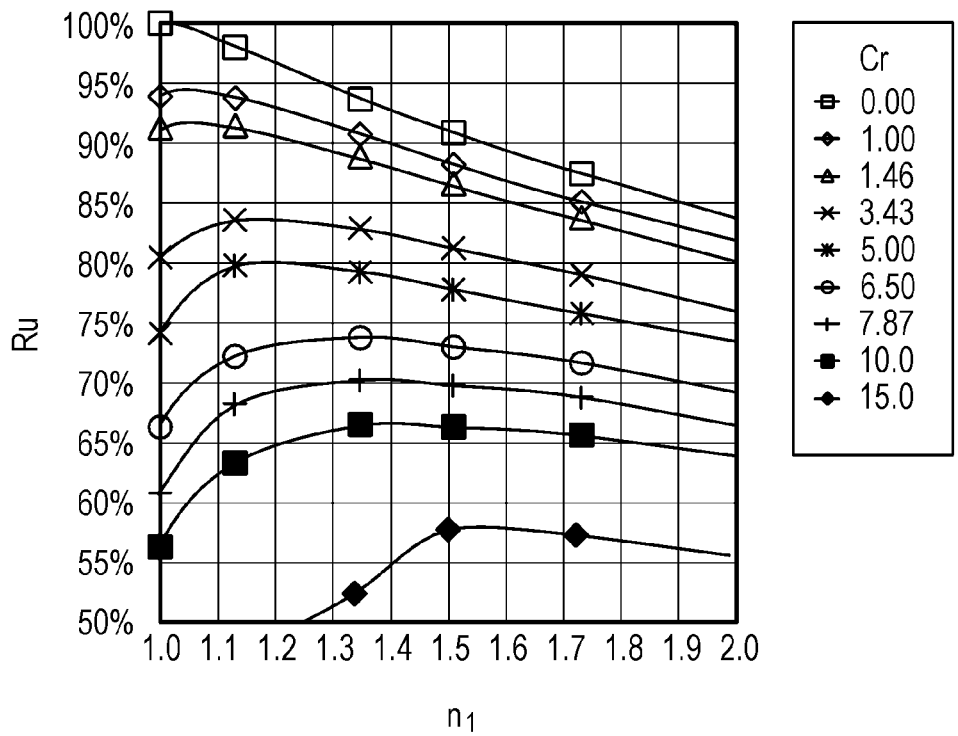
FIG. 20 is a graph plotting upward reflectance Ru obtained by taking into consideration the influence of reflection at the air/resin interface.

Further, FIG. 20 indicates a tendency that, as $n_1$ increases, the Ru value decreases. Such a tendency is more significant as the deformation Cr from the ideal shape decreases. As seen from FIG. 20, when $n_1$ is 1.55 or less, high performance (for example, Ru=90% or more in the case of the perfectly ideal shape, i.e., at Cr=0.00) can be ensured when the deformation Cr from the ideal shape is small. Accordingly, even when it is difficult to estimate the deformation Cr of the shape of the structure tip portion, which may be caused during the manufacturing process, materials ensuring satisfactory robustness can be selected.

As discussed above, by properly controlling the refractive index of the resin embedding the reflecting layer, the reduction in the directional reflection performance of the optical body can be suppressed even when the structure tip portion is deformed from the ideal shape. Stated another way, when the deformation Cr of the structure tip portion from the ideal shape is 6.5% or less of the pitch P of the corner cubes, the upward reflectance of 70% or more can be ensured by setting the refractive index of the resin, which is used to form the second optical layer embedding the reflecting layer, to be 1.1 or more and 1.9 or less.

MODIFICATIONS

Modifications of the forgoing first embodiment will be described below.

First Modification

Figure 23:
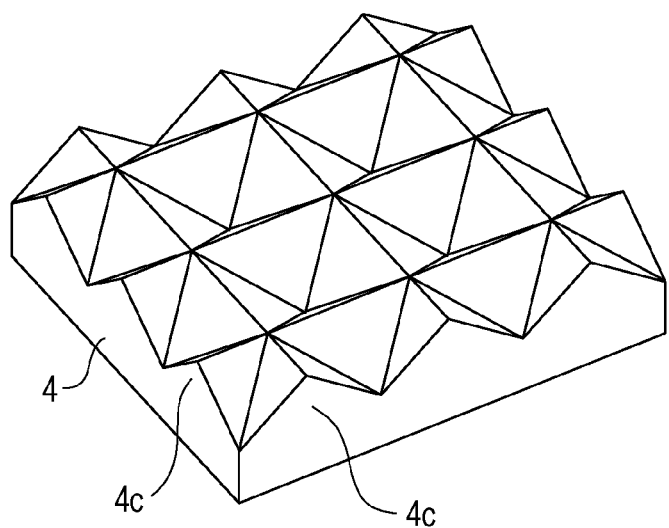
FIG. 23 is a perspective view illustrating a first modification of the first embodiment.

FIG. 23 is a perspective view illustrating a first modification of the first embodiment. Note that the second optical layer is excluded in FIG. 23. In the first modification, as illustrated in FIG. 23, the structures 4c formed in the first optical layer 4 are provided by substantially cyclically arraying a recess in the form of a quadrangular pyramid as one unit. Thus, the shape other than the corner cube shape can also be employed.

Second Modification

FIG. 24A is a sectional view illustrating a second modification of the first embodiment. As illustrated in FIG. 24A, the first optical layer 4 includes a resin and fine particles 81. The fine particles 81 have a refractive index differing from that of the resin, which is a main component material of the first optical layer 4. For example, at least one kind of organic fine particles and inorganic fine particles can be used as the fine particles 81. Further, the fine particles 81 may be hollow fine particles. Examples of the fine particles 81 include inorganic fine particles made of, e.g., silica or alumina, and organic fine particles made of, e.g., styrene, acryl, or a copolymer of the formers. Of those examples, silica fine particles are particularly preferable.

Third Modification

FIG. 24B is a sectional view illustrating a third modification of the first embodiment. As illustrated in FIG. 24B, the optical body 1 further includes a light diffusion layer 82 on the surface of the first optical layer 4. The light diffusion layer 82 includes, for example, a resin and fine particles. The fine particles can be the same as those used in the above-described second modification of FIG. 24A.

Fourth Modification

FIG. 24C is a sectional view illustrating a fourth modification of the first embodiment. As illustrated in FIG. 24C, the optical body 1 further includes a light diffusion layer 82 between the reflecting layer 3 and the first optical layer 4. The light diffusion layer 82 includes, for example, a resin and fine particles. The fine particles can be the same as those used in the above-described second modification of FIG. 24A.

According to the second through fourth modifications, it is possible to directionally reflect the light in the specific wavelength band, e.g., an infrared ray, and to scatter the light other than the specific wavelength band, e.g., visible light. Hence, a visually attractive design can be given to the optical body 1 by making the optical body 1 clouded.

Fifth Modification

Figure 25:
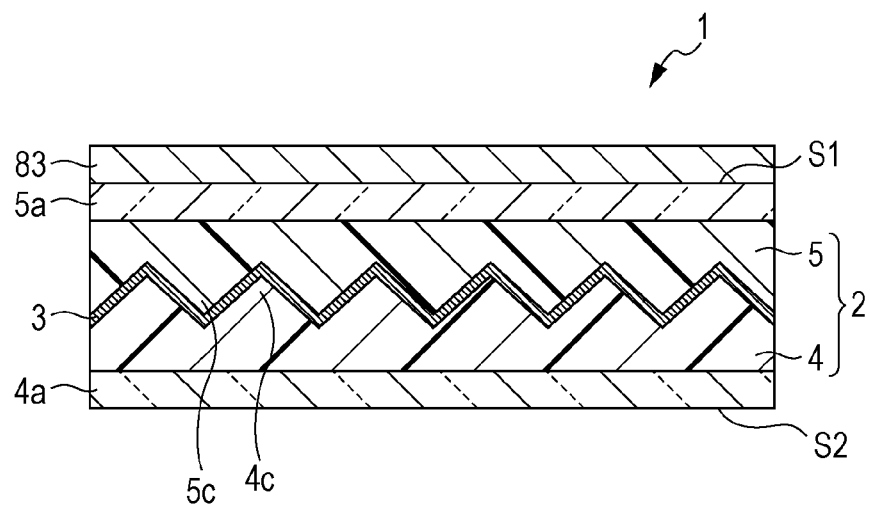
FIG. 25 is a sectional view illustrating a fifth modification of the first embodiment.

FIG. 25 is a sectional view illustrating a fifth modification of the first embodiment. The optical body 1 of the fifth modification further includes a self-cleaning effect layer 83, which develops a cleaning effect in itself, on an exposed surface of the optical body 1 on the side oppositely away from one of the incident surface S1 and the emergent surface S2 thereof, which is affixed to the adherend. The self-cleaning effect layer 83 includes, for example, a photocatalyst. For example, TiO₂ can be used as the photocatalyst.

As described above, the optical body 1 is featured in being semitransparent to the incident light. When the optical body 1 is used outdoors or in a dirty room, for example, light is scattered due to dirt and dust adhering to the surface of the optical body 1, thus causing transmissivity and reflectivity to be lost. Therefore, the surface of the optical body 1 is preferably optically transparent at all times. In other words, it is preferable that the surface of the optical body 1 is superior in the water-repellent or hydrophilic property and it can automatically develop the self-cleaning effect.

According to the fifth modification, since the optical body 1 includes the self-cleaning effect layer 83, the water-repellent or hydrophilic property, etc. can be given to the incident surface. Hence, it is possible to suppress dirt and dust from adhering to the incident surface and to retard degradation of the directional reflection characteristic.

Sixth Modification

Figure 26A:
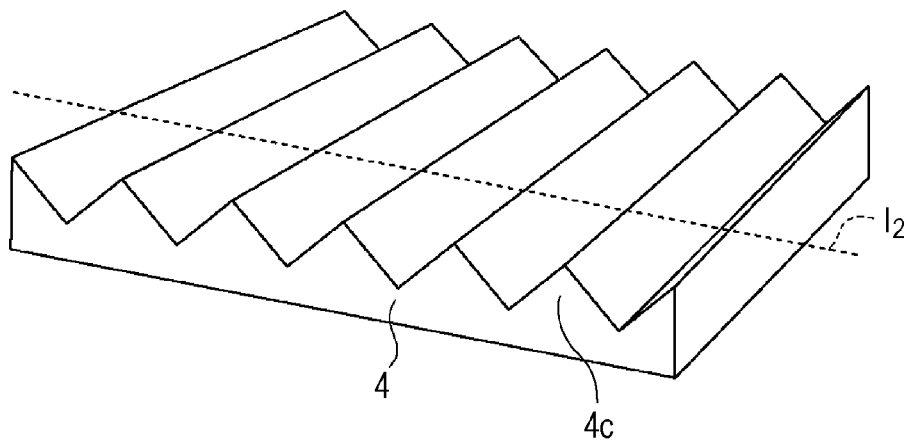
FIGS. 26A and 26B are each a perspective view illustrating an example of the shape of a structure formed in the first optical layer.
Figure 26B:
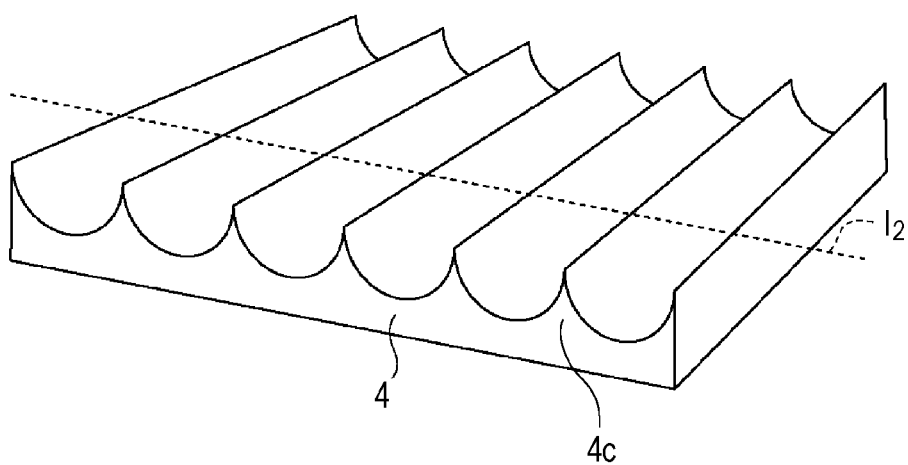

FIGS. 26A and 26B are perspective views illustrating examples of the shape of the structures formed in the first optical layer 4. Note that the second optical layer is excluded in FIGS. 26A and 26B. The structures 4c are each in the form of a columnar projection or recess extending in one direction. The columnar structures 4c are arrayed side by side in one direction, i.e., in a one-dimensionally cyclic pattern. The reflecting layer 3 is formed on the structures 4c. Therefore, the reflecting layer 3 has the same shape as the surface shape of the structures 4c.

The shape of the structures 4c can be, for example, a prism-like shape illustrated in FIG. 26A, a shape obtained, as illustrated in FIG. 26B, by reversing a lenticular shape, or a shape obtained by reversing the illustrated shape. Herein, the term "lenticular shape" includes the case where a cross-sectional shape as viewed perpendicularly to a ridge of the projection of each structure is part of a circular-arc, substantially circular-arc, elliptical-arc, substantially elliptical-arc, parabolic, or substantially parabolic shape. Thus, a cylindrical shape is also included in the lenticular shape. Note that the shape of the structure 4c is not limited to the shapes illustrated in FIGS. 26A and 26B or the shapes reversed to the illustrated shapes, and it may be a toroidal, hyperbolic cylindrical, elliptic cylindrical, polyhedral cylindrical, or a free-form shape. Further, an apex portion of the prism-like or lenticular shape may have a polygonal shape (e.g., a pentagonal shape). When the structure 4c has a prism-like shape, an inclination angle of the prism-like structure 4c is, e.g., 45°. From the viewpoint of reflecting larger part of light incoming from the sky to be returned toward the sky when the optical body is applied to the window member 10, the structure 4c preferably has a flat surface or a curved surface that is inclined at the inclination angle of 45° or larger. With the structure 4c having such a shape, the incident light can be returned toward the sky after being reflected substantially just once. Accordingly, even when the reflectance of the reflecting layer 3 is not so high, the incident light can be efficiently reflected toward the sky, and absorption of light by the reflecting layer 3 can be reduced.

Thus, the structures arrayed in the one-dimensionally cyclic pattern can also be employed as one example of plural structures forming a substantially cyclic structure pattern.

Seventh Modification

Figure 27A:
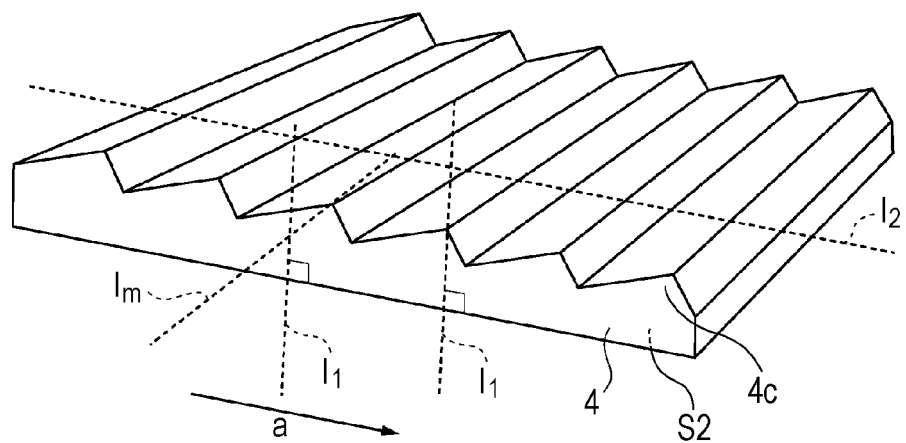
FIGS. 27A and 27B illustrate an example in which a prism-like structure is formed in an asymmetrical shape with respect to a perpendicular line.
Figure 27B:
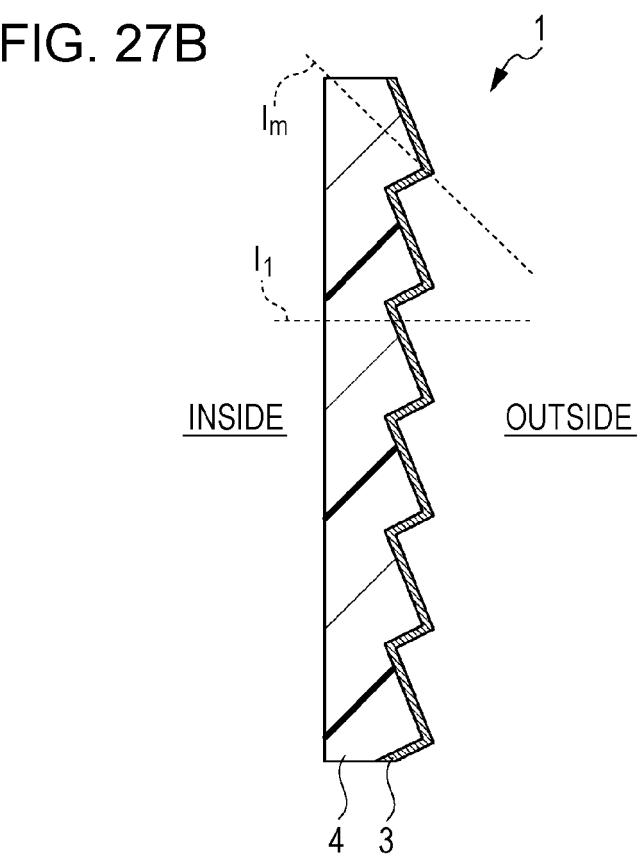

As illustrated in FIG. 27A, the shape of the structure 4c may be asymmetrical with respect to a line $l_1$ perpendicular to the incident surface S1 or the emergent surface S2 of the optical film (optical body) 1. In such a case, a principal axis $l_m$ of the structure 4c is inclined from the perpendicular line $l_1$ as a reference in a direction a in which the structures 4c are arrayed side by side. Herein, the principal axis $l_m$ of the structure 4c represents a linear line passing a midpoint of a bottom side of the structure and an apex of the structure in a cross-section thereof. When the optical film (body) 1 is affixed to the window member 10 arranged substantially vertically to the ground, the principal axis $l_m$ of the structure 4c is preferably inclined, as illustrated in FIG. 27B, downward of the window member 10 (toward the ground side) from the perpendicular line $l_1$ as a reference. In general, a larger amount of heat (optical energy) arrives from the sun through windows in a time zone past the noon, and the altitude (elevation angle) of the sun is mostly higher than 45° in such a time zone. By employing the structure having the above-described shape, the light incoming from the sun at the high altitude can be efficiently reflected upward. In the example illustrated in FIGS. 27A and 27B, the prism-like structure 4c is formed in an asymmetrical shape with respect to the perpendicular line $l_1$. As an alternative, the structure 4c having a shape other than the prism-like shape may be formed in an asymmetrical shape with respect to the perpendicular line $l_1$. For example, the corner cube may be formed in an asymmetrical shape with respect to the perpendicular line $l_1$.

2. Second Embodiment

While the first embodiment has been described above, by way of example, in connection with case where the optical body according to the embodiment is applied to the window member, the embodiment is not limited to the above-described application and can be further applied to various interior and exterior members, etc. other than the window member. In more detail, the optical body according to the embodiment is applicable to not only fixedly installed interior and exterior members, such as walls and roofs, but also to a device capable of adjusting an amount of the transmitted and/or reflected sunlight by moving an interior or external member depending on changes in amount of the sunlight, which are caused with the shift of seasons and the elapse of time, etc., and taking the adjusted amount of the sunlight into an indoor space, etc. In a second embodiment, one example of such a device is described in connection with a solar shading device (in the form of a window blind or a shade) capable of adjusting a degree at which a group of many solar shading members blocks the incident light, by changing an angle of the solar shading member group.

Figure 28:
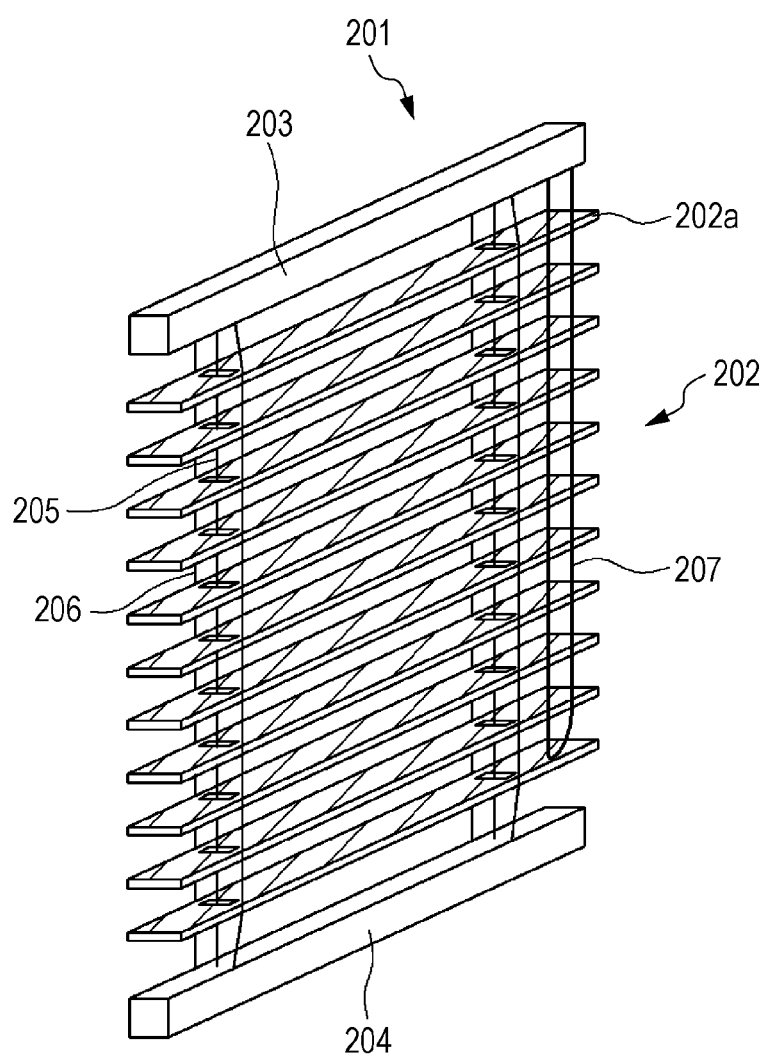
FIG. 28 is a perspective view illustrating one example of structure of a window blind (shade) according to a second embodiment.

FIG. 28 is a perspective view illustrating one example of structure of a window blind (shade) 201 according to the second embodiment. As illustrated in FIG. 28, the window blind 201 as one example of the solar shading device includes a head box 203, a slat group (solar shading member group) 202 made up of plural slats (blades) 202a, and a bottom rail 204. The head box 203 is disposed above the slat group 202 made up of the plural slats 202a. Ladder chords 206 and rise-and-fall chords 205 are extended downward from the head box 203, and the bottom rail 204 is suspended at lower ends of those chords. The slats 202a serving as the solar shading members are each formed in a slender rectangular shape, for example, and are supported by the ladder chords 206, which are extended downward from the head box 203, at predetermined intervals in a suspended state. Further, the head box 203 is provided with an operating member (not shown), such as a rod, for adjusting an angle of the slat group 202 made up of the plural slats 202a.

The head box 203 serves as a driving unit for rotating the slat group 202 made up of the plural slats 202a in accordance with operation of the operating member, such as the rod, thereby adjusting the amount of light taken into an indoor space, for example. Further, the head box 203 has the function of a driving unit (raising and lowering unit) for raising and lowering the slat group 202 in accordance with operation of an operating member, e.g., a rise-and-fall operating chord 207.

Figure 29A:
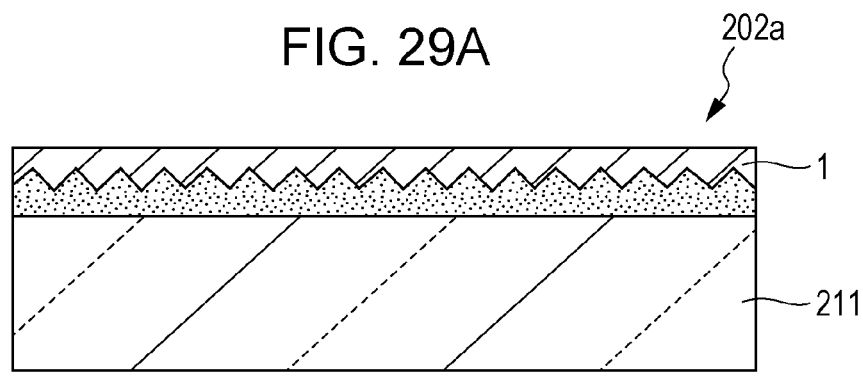
FIG. 29A is a sectional view illustrating a first example of structure of a slat.

FIG. 29A is a sectional view illustrating a first example of structure of the slat 202a. As illustrated in FIG. 29A, the slat 202a includes a base element 211 and an optical body 1. The optical body 1 is preferably disposed on one of two principal surfaces of the base element 211, the one principal surface being positioned on the side including an incident surface on which extraneous light is incident when the slat group 202 is in a closed state (e.g., on the side facing the window member). The optical body 1 and the base element 211 are affixed to each other with, for example, an affixing layer interposed between them.

The base element 211 can be formed in the shape of, e.g., a sheet, a film, or a plate. The base element 211 can be made of, e.g., glass, resin, paper, or cloth. In consideration of the case of taking visible light into a predetermined indoor space, for example, a resin having transparency is preferably used as the material of the base element 211. As the glass, the resin, the paper, or the cloth, the same materials as those generally used in ordinary rolling screens can be used. One type or two or more types of the optical bodies 1 according to the above-described embodiment and modifications can be used alone or in combination as the optical body 1.

Figure 29B:
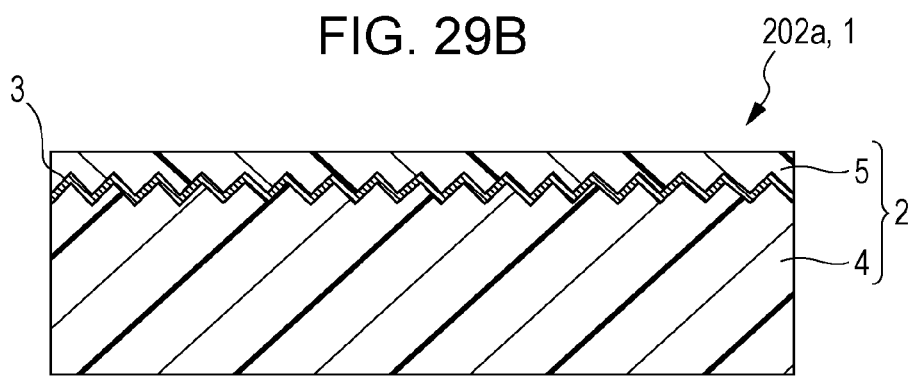
FIG. 29B is a sectional view illustrating a second example of structure of the slat.

FIG. 29B is a sectional view illustrating a second example of structure of the slat. In the second example, as illustrated in FIG. 29B, the optical body 1 is used itself as the slat 202a. The optical body 1 preferably has such a level of rigidity that the optical body 1 can be supported by the ladder chords 206 and can maintain its shape in a supported state.

Figure 29C:
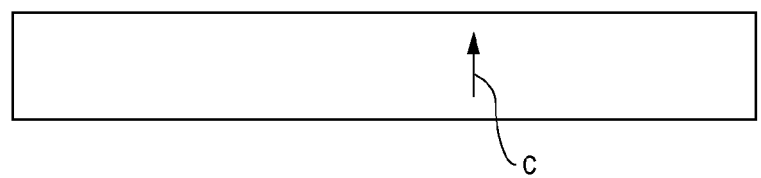
FIG. 29C is a plan view of the slat as viewed from the incident surface side of extraneous light when a group of slats is in a closed state.

FIG. 29C is a plan view of the slat, looking from the side including the incident surface on which extraneous light is incident when the slat group is in the closed state. As illustrated in FIG. 29C, a widthwise direction of the slat 202a is preferably substantially aligned with the ridge direction c of the corner cube. The reason is that such an arrangement increases efficiency of upward reflection.

3. Third Embodiment

A third embodiment will be described below in connection with a rolling screen device, i.e., another example of the solar shading device capable of adjusting a degree at which a solar shading member blocks the incident light, by winding or unwinding the solar shading member.

Figure 30A:
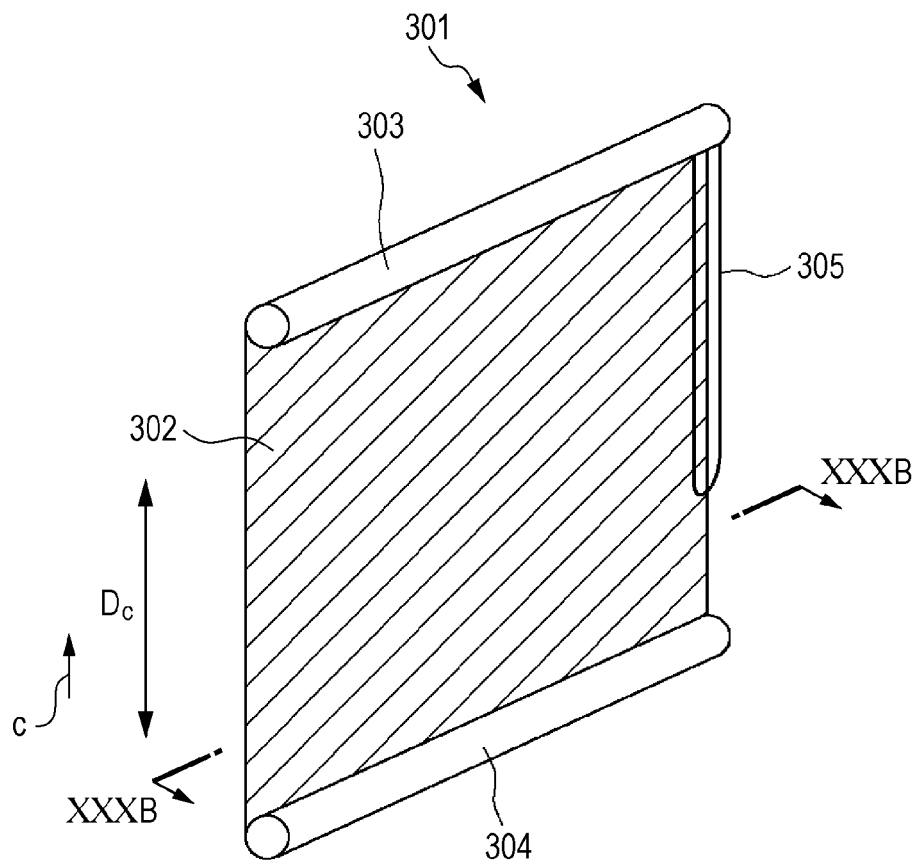
FIG. 30A is a perspective view illustrating one example of structure of a rolling screen device according to a third embodiment.

FIG. 30A is a perspective view illustrating one example of structure of a rolling screen device 301 according to the third embodiment. As illustrated in FIG. 30A, the rolling screen device 301 as another example of the solar shading device includes a screen 302, a head box 303, and a core member 304. The head box 303 can raise and fall the screen 302 with operation of an operating member, such as a chain 305. The head box 303 includes therein a winding shaft for taking up and letting out the screen 302, and one end of the screen 302 is coupled to the winding shaft. Further, the core member 304 is coupled to the other end of the screen 302. Preferably, the screen 302 has flexibility. The shape of the screen 302 is not limited to particular one and is preferably selected depending on the shape of, e.g., a window member to which the rolling screen device 301 is applied. For example, the screen 302 has a rectangular shape.

Preferably, as illustrated in FIG. 30A, a letting-out or taking-up direction $D_C$ of the screen 302 is substantially aligned with the ridge direction c of the corner cube. The reason is that such an arrangement increases efficiency of upward reflection.

Figure 30B:
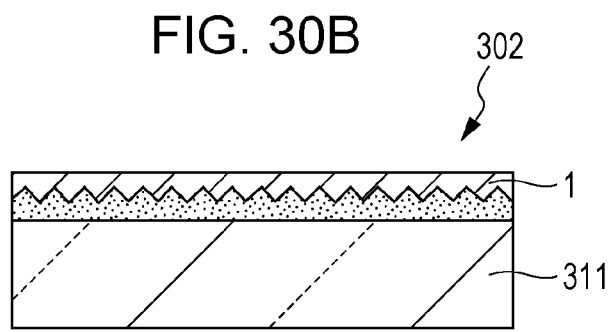
FIG. 30B is a sectional view, taken along line XXXB-XXXB in FIG. 30A, illustrating one example of structure of a screen.

FIG. 30B is a sectional view, taken along line XXXB-XXXB in FIG. 30A, illustrating one example of structure of the screen 302. As illustrated in FIG. 30B, the screen 302 includes a base element 311 and an optical body 1. The screen 302 preferably has flexibility. The optical body 1 is preferably disposed on one of two principal surfaces of the base element 311, the one principal surface being positioned on the side including an incident surface on which extraneous light is incident (e.g., on the side facing the window member). The optical body 1 and the base element 311 are affixed to each other with, for example, an affixing layer interposed between them. Note that the structure of the screen 302 is not limited to the illustrated example and the optical body 1 may be used itself as the screen 302.

The base element 311 can be formed in the shape of, e.g., a sheet, a film, or a plate. The base element 311 can be made of, e.g., glass, resin, paper, or cloth. In consideration of the case of taking visible light into a predetermined indoor space, for example, a resin having transparency is preferably used as the material of the base element 311. As the glass, the resin, the paper, or the cloth, the same materials as those generally used in ordinary rolling screens can be used. One type or two or more types of the optical bodies 1 according to the above-described embodiment and modifications can be used alone or in combination as the optical body 1.

4. Fourth Embodiment

A fourth embodiment will be described as applied to a fitting (e.g., an interior or exterior member) that includes a lighting portion provided with an optical body having the directional reflection function.

Figure 31A:
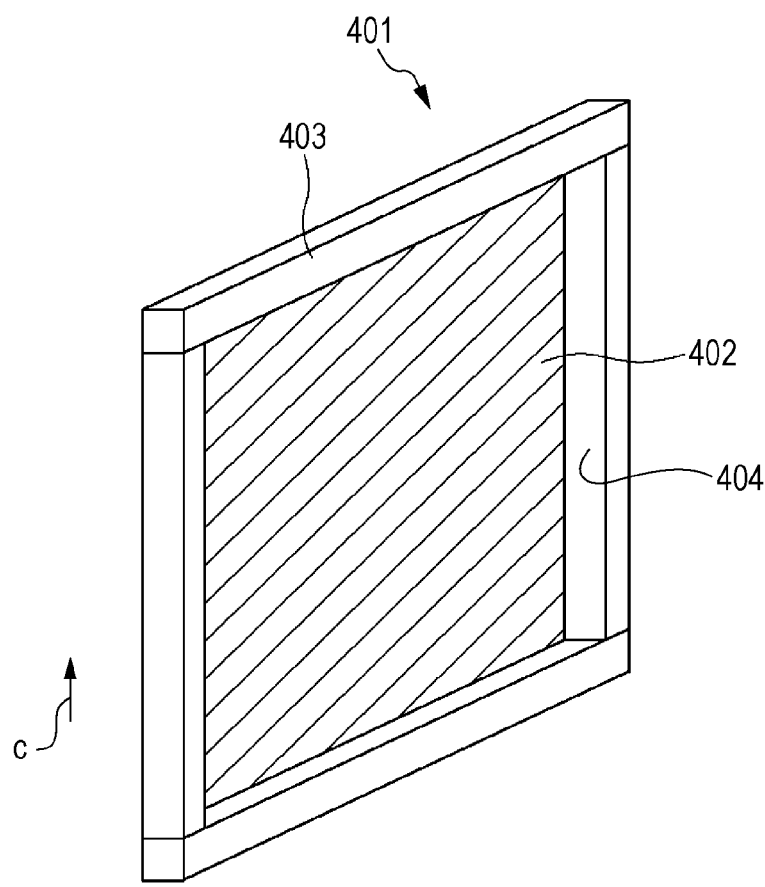
FIG. 31A is a perspective view illustrating one example of structure of a fitting according to a fourth embodiment.

FIG. 31A is a perspective view illustrating one example of structure of a fitting 401 according to the fourth embodiment. As illustrated in FIG. 31A, the fitting 401 includes a lighting portion 404 provided with an optical functional body 402. More specifically, the fitting 401 includes the optical functional body 402 and a frame member 403 that is disposed in a peripheral portion of the optical functional body 402. The optical functional body 402 is fixedly held by the frame member 98, but the optical functional body 402 can be removed, if necessary, by disassembling the frame member 403. While one example of the fitting 401 is a shoji (i.e., a paper-made and/or glass-fitted sliding door), applications are not limited to such an example and embodiments can be applied to various types of fittings that include lighting portions.

Preferably, as illustrated in FIG. 31A, a height direction $D_H$ (see FIG. 11B) of the optical functional body 402 is substantially aligned with the ridge direction c of the corner cube. The reason is that such an arrangement increases efficiency of upward reflection.

Figure 31B:
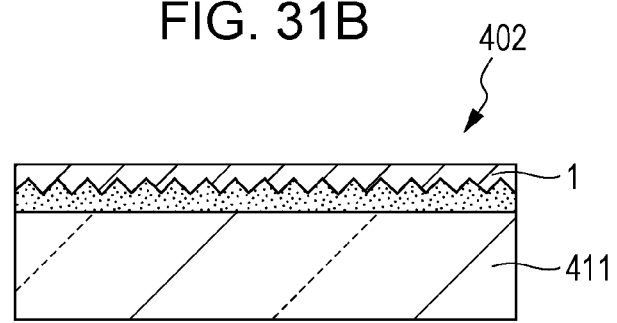
FIG. 31B is a sectional view illustrating one example of structure of an optical functional body used in the fitting.
Figure 32A:
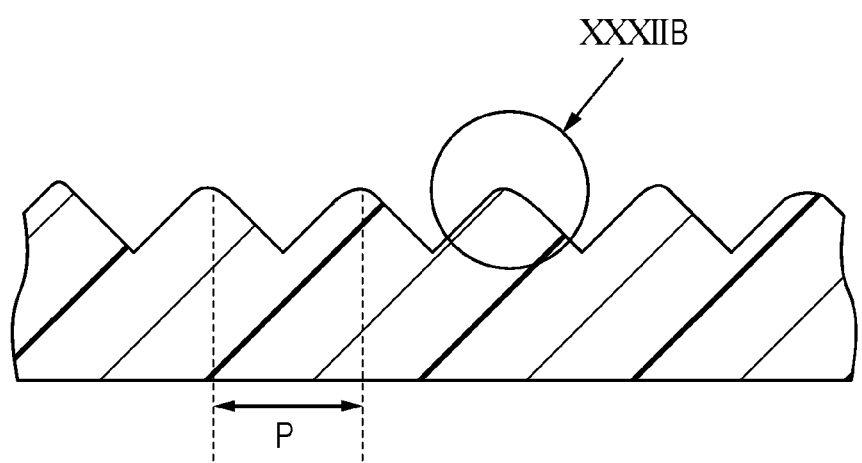
FIG. 32A is an illustration to explain a manner of determining a degree by which an actual shape is deformed from an ideal shape.
Figure 32B:
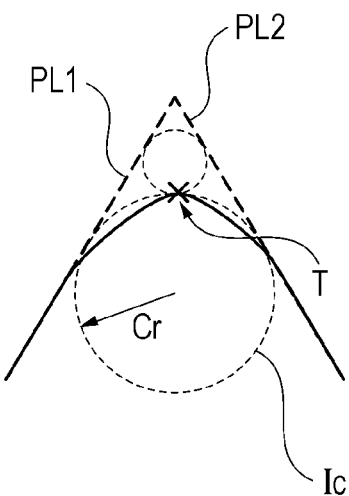
FIG. 32B is an enlarged view of a region XXXIIB in FIG. 32A.

FIG. 31B is a sectional view illustrating one example of structure of the optical functional body 402. As illustrated in FIG. 31B, the optical functional body 402 includes a base element 411 and the optical body 1. The optical body 1 is disposed on one of two principal surfaces of the base element 411, the one principal surface being positioned on the side including an incident surface on which extraneous light is incident (e.g., on the side facing the window member or outward). The optical body 1 and the base element 411 are affixed to each other with, for example, an affixing layer interposed between them. Note that the structure of the shoji (specifically the optical functional body 402) is not limited to the illustrated example and the optical body 1 may be used itself as the optical functional body 402.

The base element 411 is formed of, e.g., a sheet, a film, or a plate each having flexibility. The base element 411 can be made of, e.g., glass, resin, paper, or cloth. In consideration of the case of taking visible light into a predetermined indoor space, for example, a resin having transparency is preferably used as the material of the base element 411. As the glass, the resin, the paper, or the cloth, the same materials as those generally used in optical bodies in ordinary fittings can be used. One type or two or more types of the optical bodies 1 according to the above-described embodiment and modifications can be used alone or in combination as the optical body 1.

The structures, the shapes, the materials, the numerical values, etc. explained in the foregoing embodiments, modifications, and EXAMPLES are merely mentioned for illustrative purpose, and different structures, shapes, materials, numerical values, etc. can also be used.

Also, the structures in the above-described embodiments and modifications can be selectively combined with each other.

While the foregoing embodiments have been described, by way of example, in connection with the case where the window blind and the rolling screen device are manually operated, the window blind and the rolling screen device may be electrically operated.

The foregoing embodiments have been described, by way of example, in connection with the case where the optical film is affixed to the adherend, such as the window member. However, the adherend, such as the window member, may be constituted as the first optical layer or the second optical layer itself of the optical film. That modification can impart the directional reflection function to the adherend, such as the window member, in advance.

While the foregoing embodiments have been described, by way of example, in connection with the case of applying the present invention to the interior or exterior members, such as the window member, the fitting, the slat of the window blind, and the screen of the rolling screen device, application examples are not limited to the illustrated ones, and other interior and exterior members than the above-described ones are also included in application targets.

Examples of the interior or exterior members to which the optical body according to the embodiment is applicable include an interior or exterior member formed by the optical body itself, and an interior or exterior member formed by a transparent base element to which the optical body (directional reflector) is affixed. By installing such an interior or exterior member indoors or outdoors near a window, it is possible, for example, to directionally reflect only an infrared ray to the outdoor and to take visible light into the indoor. Accordingly, even when the interior or exterior member is installed, necessity of lighting for an indoor space is reduced. Further, since the interior or exterior member hardly causes scatter (diffuse) reflection toward the indoor side, a temperature rise in the surroundings can be suppressed. In addition, the optical body may be applied to other affixing target members (adherends) than the transparent base element depending on the desired purpose of, for example, controlling visibility and/or increasing strength.

While the foregoing embodiments have been described, by way of example, in connection with the case of applying the present embodiment to the window blind and the rolling screen device, application examples are not limited to the illustrated ones, and various solar shading devices installed on the indoor or outdoor side are also included in application targets.

While the foregoing embodiments have been described, by way of example, in connection with the case of applying the present embodiment to the solar shading device (e.g., the rolling screen device) where a degree at which the solar shading member blocks the incident light can be adjusted by taking up or letting out the solar shading member, application examples are not limited to the illustrated one. For example, embodiments are applicable to a solar shading device where a degree at which a solar shading member blocks the incident light can be adjusted by folding or unfolding the solar shading member. One example of such a solar shading device is a pleated screen device where a degree at which a solar shading member blocks the incident light can be adjusted by folding or unfolding a screen as the solar shading member in the form of bellows.

While the foregoing embodiments have been described, by way of example, in connection with the case of applying the present embodiments to a horizontal-type window blind (Venetian window blind), a vertical-type window blind is also included in application targets.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An optical body comprising:
a first optical layer;
a second optical layer having an incident surface on which light is incident; and
a reflecting layer sandwiched between the first and second optical layers,
wherein at least one of the first and second optical layer is made of a resin that contains a phosphoric compound, and the reflecting layer contains an oxide, a nitride, or an oxynitride in its surface contacting with the first optical layer or the second optical layer that contains the phosphoric compound,
the first optical layer includes a plurality of convex or concave structures formed on or in a surface thereof on which the reflecting layer is disposed, and the convex or concave structures are arrayed in a substantially cyclic structure pattern at a predetermined pitch,
ridges of the convex structures or ridges between the concave structures adjacent to each other have tip portions projecting toward the incident surface side,
the ridges have a triangular cross-section other than at the tip portions,
each tip portion has a deformation defined as a radius of a larger of two circles that:
intersect an end of the tip portion,
are on opposite sides of the tip portion, and
intersect at a single point with each of two sides of a triangle formed by the triangular cross-section of a portion of the ridge outside the tip portion,
the deformation of each tip portion is 7% or less of the array pitch of the structures, the second optical layer is transparent and has a refractive index of 1.1 or more and 1.9 or less, and the optical body selectively directionally reflects part of light entering the incident surface at an incident angle (θ, Φ) (where θ is an angle formed by a line perpendicular to the incident surface and incident light entering the incident surface or light reflected by the incident surface, and Φ is an angle formed between a specific line in the incident surface and a component obtained by projecting the incident light or the reflected light to the incident surface), which part is in a specific wavelength band, in a direction other than (−θ, Φ+180°).

2. The optical body according to claim 1, wherein the refractive index of the second optical layer is 1.4 or more and 1.6 or less.

3. The optical body according to claim 1, wherein the refractive index of the second optical layer is 1.49 or more and 1.55 or less.

4. The optical body according to claim 1, wherein the directionally reflected light is primarily near infrared light in a wavelength band of 780 nm to 2100 nm.

5. The optical body according to claim 1, wherein the reflecting layer is a semitransparent layer or a wavelength-selective reflecting layer.

6. The optical body according to claim 1, wherein the structures have at least one shape among a prism-like shape, a shape reversed to a lenticular shape, and a corner cube shape.

7. The optical body according to claim 1, wherein the structures are arrayed on the surface of the first optical layer in a one-dimensionally cyclic pattern, and a primary axis of the structure is inclined from a reference, defined as the line perpendicular to the incident surface, in a direction in which the structures are arrayed.

8. The optical body according to claim 1, wherein the array pitch of the structures is 30 μm or more and 5 mm or less.

9. The optical body according to claim 1, wherein at least one of the first and second optical layers absorbs light in a specific wavelength band within a visible range.

10. The optical body according to claim 1, wherein an optical layer is formed by the first optical layer and the second optical layer, and the optical body further includes a light scatterer in at least one location of a surface of the first optical layer, inside the first optical layer, and between the reflecting layer and the first optical layer.

11. The optical body according to claim 1, wherein the optical body further includes a water-repellent or hydrophilic layer on the incident surface.

12. A solar shading member including the optical body according to claim 1.

13. A window member including the optical body according to claim 1.

14. An interior member including the optical body according to claim 1.

15. A fitting including a lighting portion, wherein the lighting portion includes the optical body according to claim 1.

16. The optical body according to claim 1, wherein the reflecting layer includes a layer which contains zinc oxide or niobium oxide in its surface contacting with the first optical layer or the second optical layer that contains the phosphoric compound.

17. The optical body according to claim 1, wherein the reflecting layer contains a metal.

18. The optical body according to claim 17, wherein the metal is Ag.

19. An optical body manufacturing method comprising:
transferring a concave-convex shape of a mold or a die to a first resin material, thereby forming a first optical layer which includes a plurality of convex or concave structures formed on or in one principal surface thereof and arrayed in a substantially cyclic structure pattern at a predetermined pitch;

forming a reflecting layer on the concave-convex surface that has been transferred to the first optical layer; and embedding the reflecting layer with a second resin material, thereby forming a second optical layer having an incident surface on which light is incident, the second optical layer being transparent and having a refractive index of 1.1 or more and 1.9 or less, wherein at least one of the first and second optical layer is made of a resin that contains a phosphoric compound, and the reflecting layer contains an oxide, a nitride, or an oxynitride in its surface contacting with the first optical layer or the second optical layer that contains the phosphoric compound, ridges of the convex structures or ridges between the concave structures adjacent to each other have tip portions projecting toward the incident surface side, the ridges have a triangular cross-section other than at the tip portions, each tip portion has a deformation defined as a radius of a larger of two circles that:
intersect an end of the tip portion,
are on opposite sides of the tip portion, and
intersect at a single point with each of two sides a triangle formed by the triangular cross-section of a portion of the ridge outside the tip portion, the deformation of each tip portion is 7% or less of the array pitch of the structures, the optical body selectively directionally reflects part of light entering the incident surface at an incident angle (θ, Φ) (where θ is an angle formed by a line perpendicular to the incident surface and incident light entering the incident surface or light reflected by the incident surface, and Φ is an angle formed between a specific line in the incident surface and a component obtained by projecting the incident light or the reflected light to the incident surface), which part is in a specific wavelength band, in a direction other than (−θ, Φ+180°).

20. The optical body according to claim 19, wherein the reflecting layer includes a layer which contains zinc oxide or niobium oxide in its surface contacting with the first optical layer or the second optical layer that contains the phosphoric compound.

21. The optical body according to claim 19, wherein the reflecting layer contains a metal.

22. The optical body according to claim 21, wherein the metal is Ag.

* * * * *